(12) United States Patent
Merkey

(10) Patent No.: US 6,862,609 B2
(45) Date of Patent: Mar. 1, 2005

(54) REDUNDANT STORAGE FOR MULTIPLE PROCESSORS IN A RING NETWORK

(75) Inventor: Jeffrey Vernon Merkey, Lindon, UT (US)

(73) Assignee: Canopy Group, Inc., Lindon, UT (US)

( * ) Notice: Subject to any disclaimer, the term of this patent is extended or adjusted under 35 U.S.C. 154(b) by 199 days.

(21) Appl. No.: 10/092,707

(22) Filed: Mar. 7, 2002

(65) Prior Publication Data

US 2003/0070043 A1 Apr. 10, 2003

Related U.S. Application Data

(60) Provisional application No. 60/273,601, filed on Mar. 7, 2001.

(51) Int. Cl.[7] .......................... G06F 11/14; G06F 11/10; G06F 12/16
(52) U.S. Cl. .............................. 709/214; 714/6; 714/5; 709/251; 709/216; 709/250; 711/148; 718/105
(58) Field of Search ................................ 709/201, 203, 709/214, 216, 218, 225, 226, 250, 251; 711/5, 147, 148, 162; 714/5, 6, 7, 8; 718/105

(56) References Cited

U.S. PATENT DOCUMENTS

| | | | | |
|---|---|---|---|---|
| 5,805,788 A | * | 9/1998 | Johnson ......................... | 714/6 |
| 5,862,313 A | * | 1/1999 | Johnson et al. ................. | 714/6 |
| 6,185,639 B1 | * | 2/2001 | Kailash et al. ................. | 710/48 |
| 6,219,727 B1 | * | 4/2001 | Kailash et al. ................. | 710/48 |
| 6,393,485 B1 | * | 5/2002 | Chao et al. ................. | 709/231 |
| 6,601,138 B2 | * | 7/2003 | Otterness et al. ........... | 711/114 |

* cited by examiner

Primary Examiner—B. James Peikari
(74) Attorney, Agent, or Firm—Daniel P. McCarthy; Parsons Behle & Latimer

(57) ABSTRACT

A dual-axis RAID system includes a plurality of X-axis ordinal series of disks, configured to store parity data and a tape drive, and a Y-axis ordinal series of parity disks. The Y-axis series is smaller than the X-axis series, because the X-axis series contains an extra disk configured as a segment journal disk. The RAID system communicates with clients on a network a network via an SCI network interface.

30 Claims, 48 Drawing Sheets

Legend:
- ■ RAID 1 mirrors
- ⋰ RAID Y-plane check data parity disks
- ⋯ HSM tape segment archive
- ⋮ HSM disk cache storage segment journals FIG. 9A
FIG. 9B
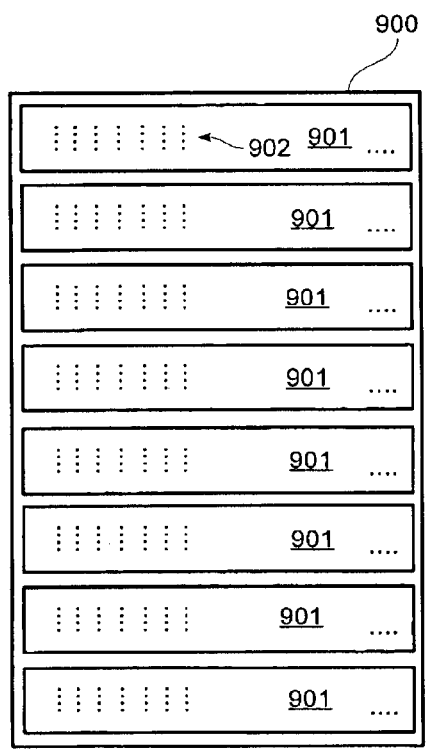
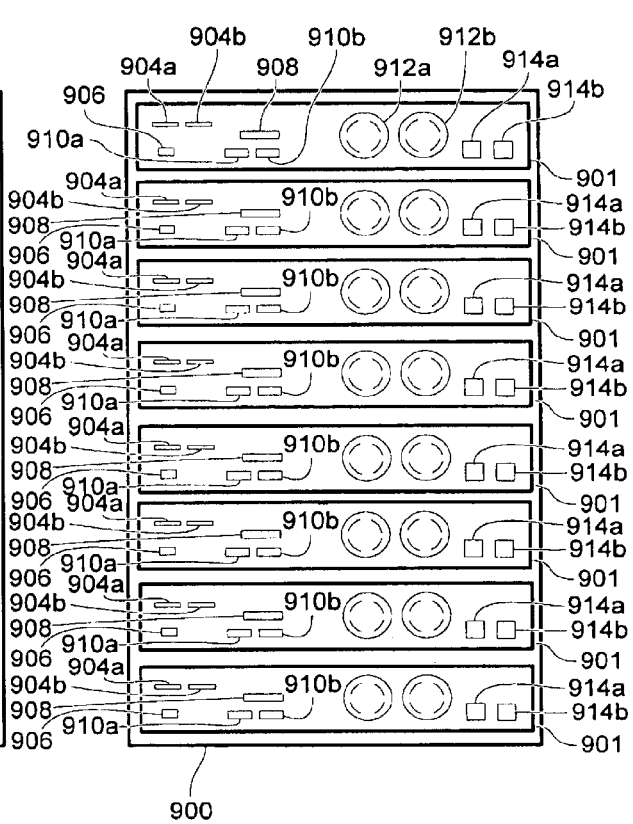

FIG. 16

| Address | Contents | |
|---|---|---|
| 0x00 | Partition/Boot sectors | 1602 |
| 0x20<br>0x40<br>0x60<br>0x80 | Mirror/Hotfix Table 0<br>Mirror/Hotfix Table 1<br>Mirror/Hotfix Table 2<br>Mirror/Hotfix Table 3 | 1604 |
| | Hotfix Data Area | 1606 |
| Hotfix Size + 0x20<br>Hotfix Size + 0x40<br>Hotfix Size + 0x60<br>Hotfix Size + 0x80 | Disk Segment Table 0<br>Disk Segment Table 1<br>Disk Segment Table 2<br>Disk Segment Table 3 | 1608 |
| | Data Area | 1610 |

1600

Logical File System Read Ahead

Sequential Read Ahead

REDUNDANT STORAGE FOR MULTIPLE PROCESSORS IN A RING NETWORK

CROSS-REFERENCE TO RELATED APPLICATIONS

This application claims the benefit of U.S. Provisional Application No. 60/273,601 filed Mar. 7, 2001.

BACKGROUND OF THE INVENTION

In 1992, the Institute for Electronics and Electrical Engineers (IEEE) established a standard for a scalable coherent interface {SCI}. SCI supports distributed multiprocessing at high bandwidth, with low latency, and providing scalable architecture. Since the 1980's, there has been continuous development of redundant arrays of inexpensive or independent drives (RAID) which provide fault-tolerant data storage and access capabilities. It is against the general background of RAID and SCI that the invention is made.

BRIEF SUMMARY OF THE INVENTIONS

The invention relates generally to high-speed fault tolerant storage systems. More particularly, the invention relates to fault tolerant storage systems utilizing RAID and/or SCI, combinations thereof, and features usable with one of both of them, or otherwise usable in a data storage or data access environment. Detailed information on various example embodiments of the invention are provided in the Detailed Description below, and the invention is defined by the appended claims.

BRIEF DESCRIPTION OF THE DRAWINGS

FIGS. 9A and 9B depict the front and rear views of one implementation of a RAID network subsystem expansion cabinet.

FIG. 16 depicts the several parts of a hot-fixable disk partition or segment.

Reference will now be made in detail to some embodiments of the inventions, example of which are illustrated in the accompanying drawings.

DEFINITIONS

For the benefit of the reader, an explanation of some terms used herein is provided.

RAID is an acronym for Redundant Array of Inexpensive (or Independent) Disks. RAID systems combine several drives together for at least one of several purposes. The first purpose is to combine the data space on the drives into a single file system space, creating a virtual disk that is larger than the component disk drives. The second purpose is to provide redundancy of storage, whereby data is stored on more than one disk to provide for recovery in the event of data corruption, disk failure or disk inaccessibility. The third purpose is related to the second, that purpose being to provide additional data for error correction. In that kind of RAID system, additional data is kept in the form of parity or hamming error codes, permitting the recovery of the originally stored data should any one disk drive fail. The fourth purpose is to improve the data throughput of the disk array, essentially by summing the throughput of each component drive.

Figure 2A:
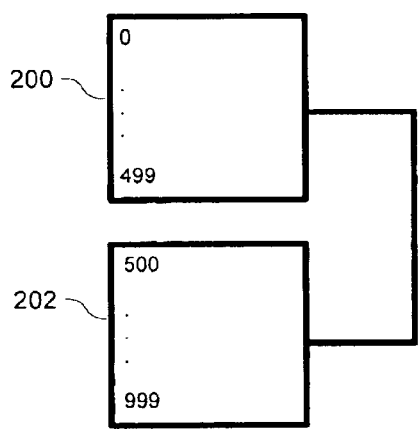
FIG. 2A depicts a two drive RAID 0 configuration.

In the industry there have become defined several levels of RAID systems. The first level, RAID-0, combines two or more drives to create a larger virtual disk. In the dual drive RAID-0 system is illustrated in FIG. 2A one disk 200 contains the low numbered sectors or blocks and the other disk 202 contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

Figure 2B:
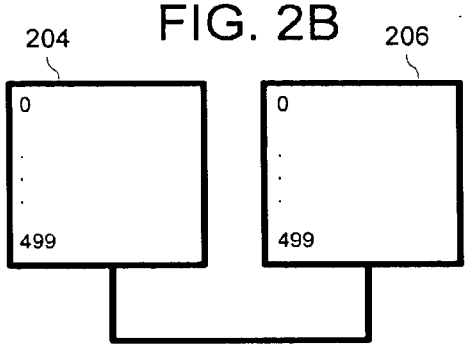
FIG. 2B depicts a two drive RAID 1 configuration.

RAID-1 systems include one or more disks that provide redundancy of the virtual disk. One disk is required to contain the data of the virtual disk, as if it were the only disk of the array. One or more additional disks contain the same data as the first disk, providing a 'mirror' of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In the dual drive RAID-1 system of FIG. 2B, disk 204 and disk 206 contain the same sectors or blocks, each disk holding exactly the same data.

Figure 2C:
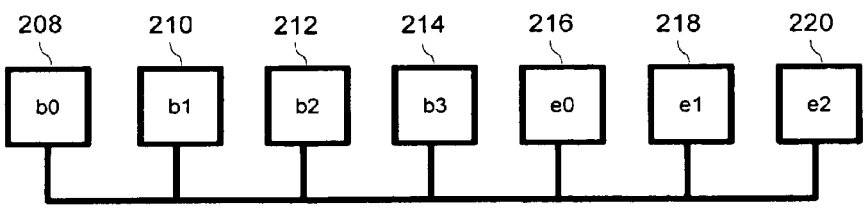
FIG. 2C depicts a seven drive RAID 2 configuration.

RAID-2 systems provide for error correction through hamming codes. The component drives each contain a particular bit of a word, or an error correction bit of that word. FIG. 2C, for example, illustrates a RAID-2 system having a constituent word of 4 bits and 3 hamming code error correction bits. Disks 208, 210, 212, and 214 contain bits 0, 1, 2, and 3 of each word of storage, while disks 216, 218 and 220 contain the hamming error correction bits. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

Figure 2D:
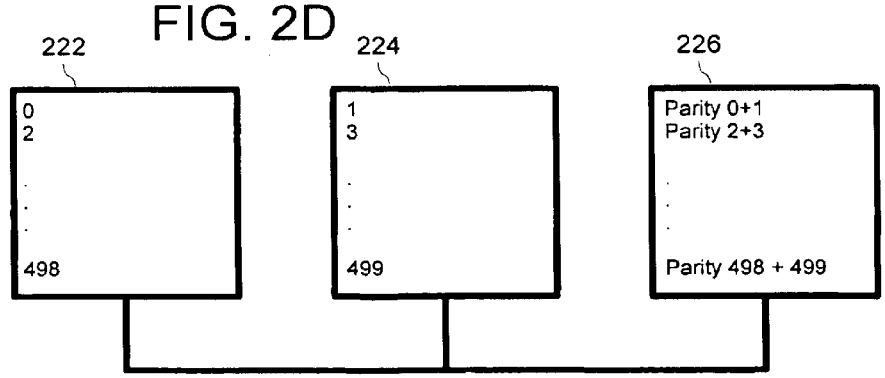
FIG. 2D depicts a three drive RAID 4 configuration.

RAID-4 systems are similar to RAID-0 systems, in that data is striped over multiple drives, as exemplified by the three disk RAID-4 system of FIG. 2D. The storage spaces of disks 222 and 224 are added together in interleaved fashion, while disk 226 contains the parity of disks 222 and 224. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact. RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

Figure 2E:
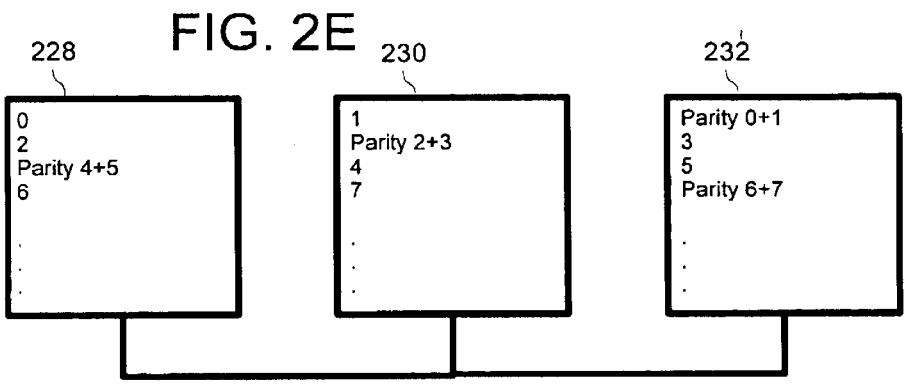
FIG. 2E depicts a three drive RAID 5 configuration.
Figure 2F:
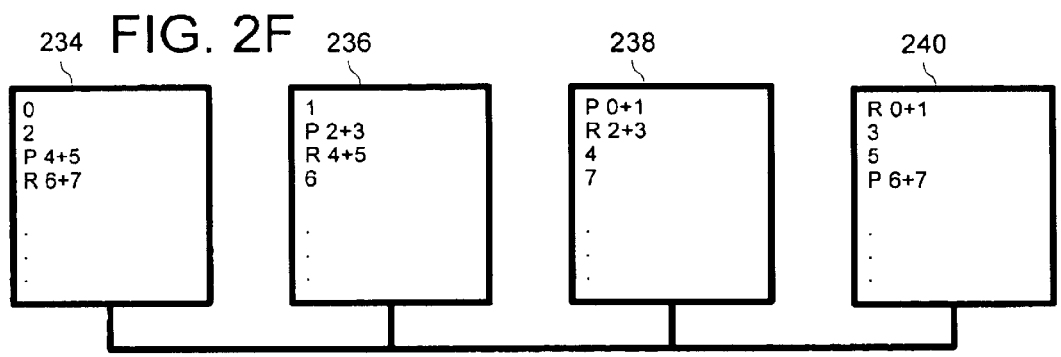
FIG. 2F depicts a four drive RAID 6 configuration.

RAID-5 systems are similar to RAID-4 systems, with the difference that the parity information is swiped over all the disks with the data, as exemplified by the three disk system of FIG. 2E. Disks 228, 230, and 232 each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives. An example of a RAID-6 system is shown in FIG. 2F. Disks 234, 236, 238, and 240 each contain data and two parity words labeled P and R.

Figure 2G:
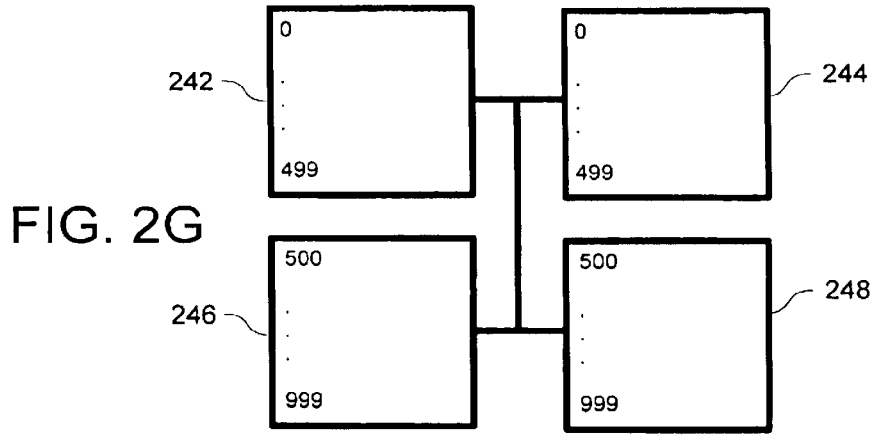
FIG. 2G depicts a four drive RAID 1+0 configuration.

Combinations of RAID systems are also possible. For example, FIG. 2G illustrates a four disk RAID 1+0 system providing a concatenated file system that is also redundant. Disks 242 and 244 are mirrored, as are 246 and 248. The combination of 242 and 244 are added to 246 and 248 to form a storage space that is twice the size of one individual drive, assuming that all four are of equal size. Many other combinations of RAID systems are possible.

Figure 3A:
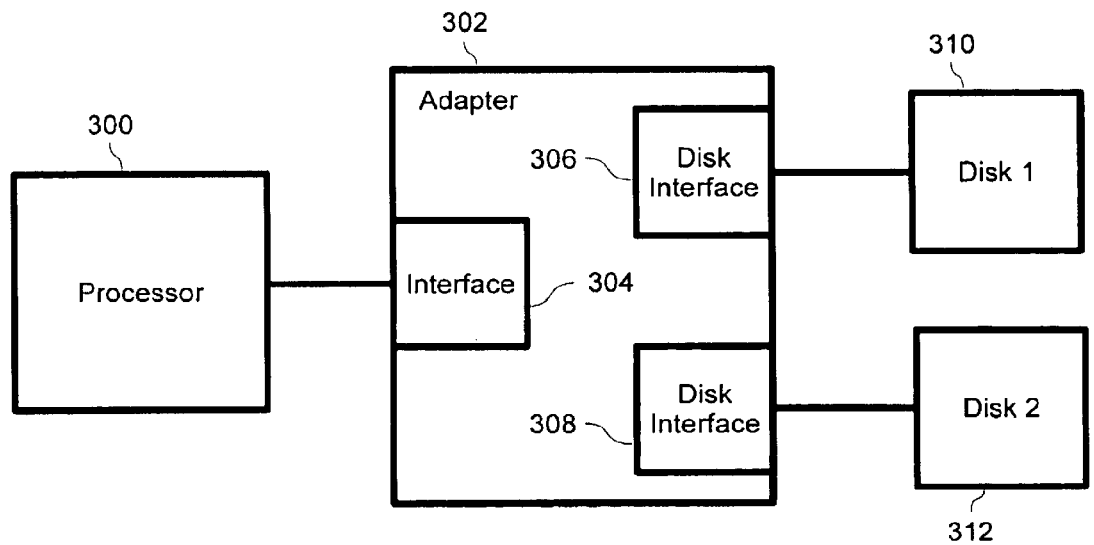
FIG. 3A depicts a hardware RAID controller connected to a processor and two disk drives.
Figure 3B:
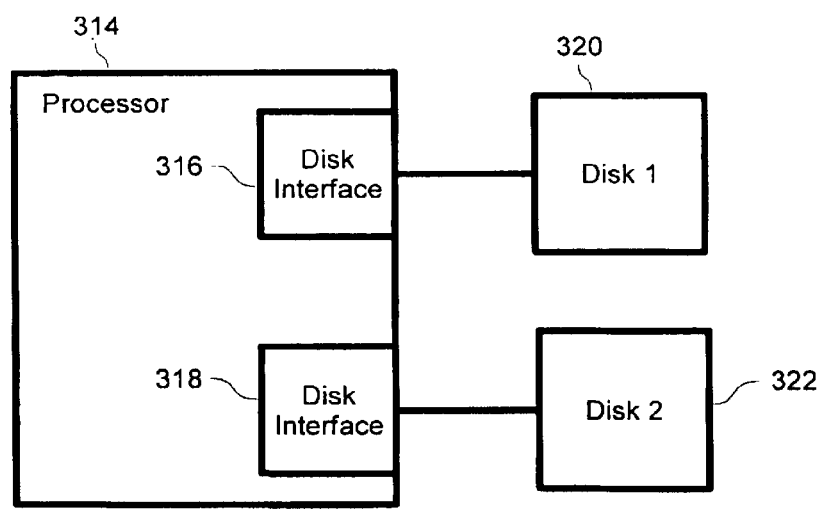
FIG. 3B depicts a software RAID controller on a processor connected to two disk drives.

Many implementations of RAID controllers exist, two types being typical. The first common RAID controller, exemplified in FIG. 3A, is hardware based, having a disk controller interfaced to a computer and several other disk controller interfaced to two or more disk drives. A processor, or other device requiring access to a RAID virtual disk is connected to an adapter 302 through an interface. Interface 304 may be a bus interface, such as PCI, or it may be a disk interface, thereby connecting the adapter as a standard disk drive. Common interfaces of today's computers are the IDE interface and the SCSI interface. Adapter 302 interfaces to disks of the RAID array, shown as 310 and 312, through other disk interfaces, shown as 306 and 308. Adapter 302 contains logic or other RAID means to present the array of disks to the processor 300 as a single disk. Hardware-based RAID controllers have the advantage of speed. The second common RAID controller is software based, exemplified in FIG. 3B. In that case, the controller is a part of the operating system of the computer, the computer having interfaces to two or more drives. A processor 314 contains software to perform RAID functions and also has disk interfaces, shown as 316 and 318, to which two or more disks, shown as 320 and 322, are accessible to the RAID software. Software based controllers are more economical than hardware based controllers, but consume a portion of the processor capacity to perform the RAID functions.

Figure 46A:
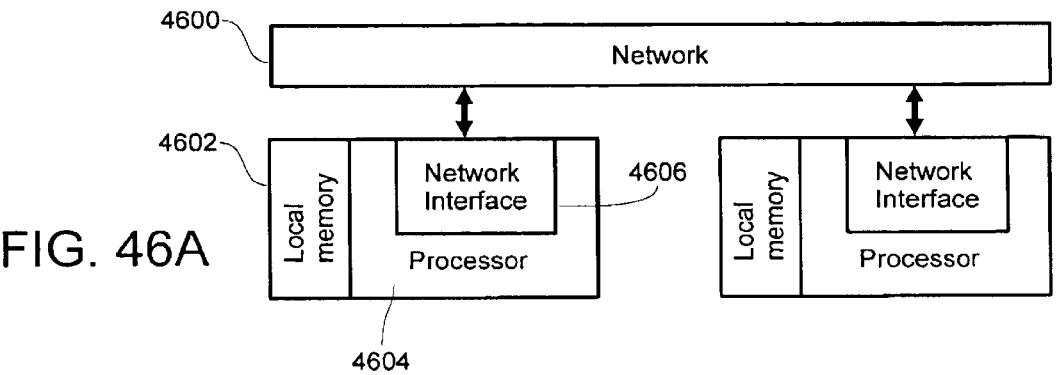
FIG. 46A depicts a simple NORMA parallel computing system.
Figure 46B:
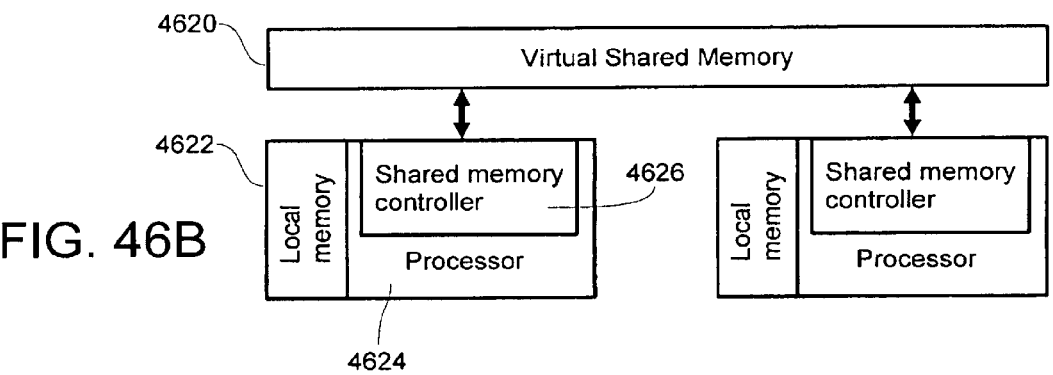
FIG. 46B depicts a simple NUMA parallel computing system.
Figure 46C:
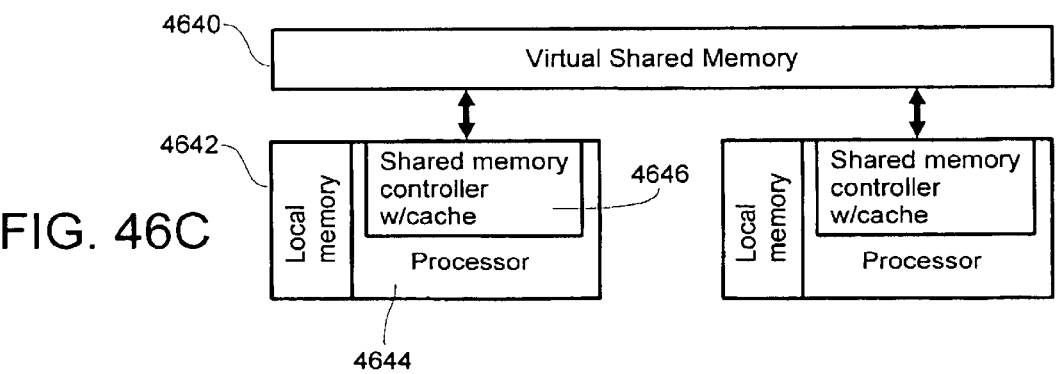
FIG. 46C depicts a simple CCNUMA parallel computing system.

The following definitions are common to the field of parallel computing and will be pertinent to some implementations of the invention herein. A NORMA (NO Remote Memory Access) system, illustrated in FIG. 46A, lacks direct hardware facilities for the access of one processor's memory by another processor in an interconnection network. Most computers fall into this category. Parallel computing may be performed over a network 2600 by message passing, provided that the processor 4604 is connected by a network interface 4604 to the network 4600. Those systems maintain all memory locally 4602. NORMA systems may provide access of memory by software applications and drivers. NORMA systems are generally unsuited for parallel computing applications due to the low bandwidths and high latencies of data transfers between processors. NUMA (Non-Uniform Memory Access) systems, illustrated in FIG. 46B, provide facilities for memory access of one processor to another by hardware. NUMA systems, in their fashion, present to software shared memory such that an application may access memory attached to a distant processor as if it were local to the processor on which the application is executing. The characteristics of a NUMA system are generally a processor 4624 having local memory 4622, but also having access to shared memory 4620 by way of a shared memory controller. The shared memory 4620 is virtual, in that it appears to be a distinct entity to processors 4624, but is actually maintained at processors in the parallel network. NUMA systems in general do not provide a memory cache of the shared memory, thus each memory access requires the full data of each read or write be passed across the interconnection fabric. CCNUMA (Cache Coherent NUMA) systems, illustrated in FIG. 46C, do provide a hardware cache of shared memory, thus eliminating the need of passing blocks of memory data across the interconnection network when the cache is coherent with the shared memory on the remote processor (and thus is coherent). The characteristics of a CCNUMA system are a processor 4644 having local memory 4642, also having access to shared memory through a shared memory controller 4646, but with caching facilities having the capability of tracking and maintaining the coherency of the cache with the other controllers on the shared memory network.

Figure 1A:
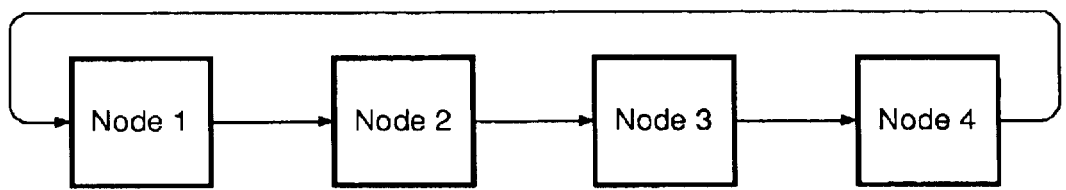
FIG. 1A depicts an SCI system arranged in a ring topology interconnection.
Figure 1B:
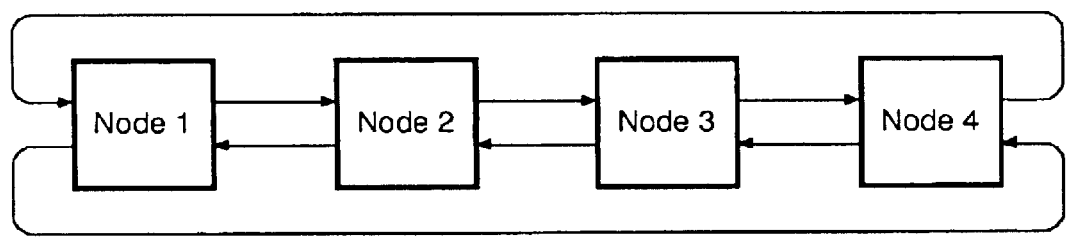
FIG. 1B depicts an SCI system arranged in a dual-ring topology with data flow in two directions.
Figure 1C:
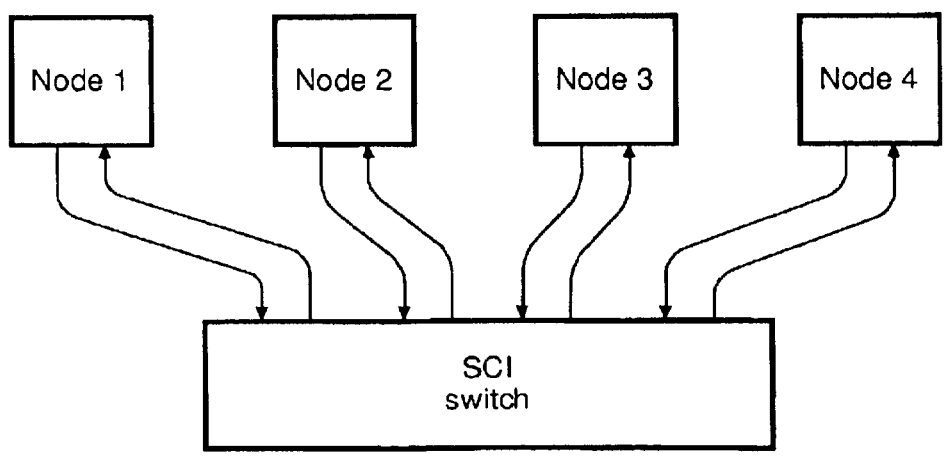
FIG. 1C depicts an SCI system interconnected by an SCI switch.
Figure 1D:
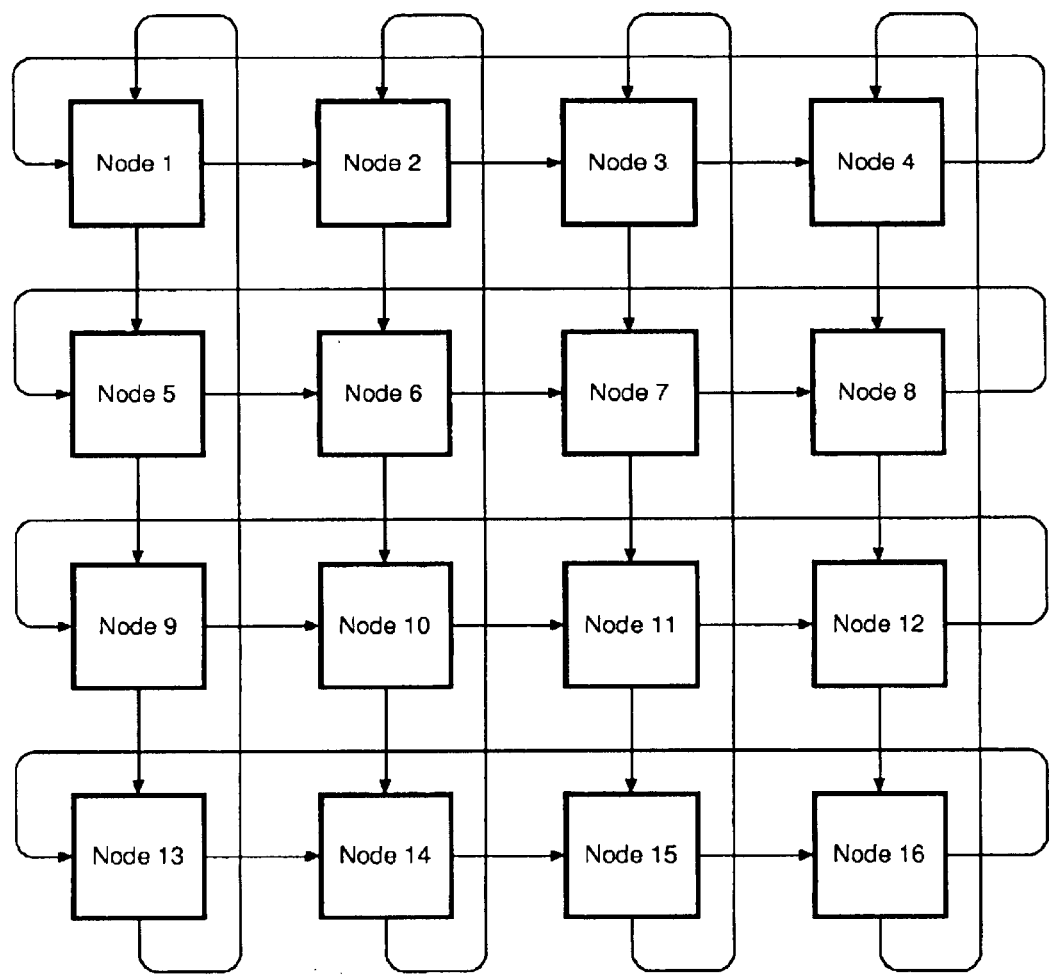
FIG. 1D depicts a dual-axis, ring based SCI interconnection network.

The Scalable Coherent Interface (SCI) is an interconnection scheme described by the standard IEEE 1596 (1992). SCI was originally intended for parallel computing applications to provide a high-speed communications channels between processors. SCI links are unidirectional to eliminate the need for bus arbitration and inherent latencies. An SCI interconnected system is generally arranged in a ring topology, as shown in FIG. 1A. In such a system data is passed from one processor element or node to the next until the data reaches its intended recipient. A multi-processor system arranged in a ring topology is susceptible to failure should any single failure occur in any communications link or node. To reduce the risk of failure, a multi-processor system may be implemented with a topology of multiple rings, as shown in FIG. 1B. A multi-processor system may also contain a switch, as shown in FIG. 1C, which may permit a part of the multi-processor system to continue operation should a node or a link fail. An SCI topology may also contain two or more axes, forming an interconnection fabric, as shown in FIG. 1D. Providing more than one topological axis also creates redundancy, while making routing of information somewhat more complex.

The SCI definition generally provides for communication of up to 1 Gigabyte per second, although some implementations provide only a portion of that bandwidth. SCI hardware manufacturers have yet to consolidate SCI hardware to a common set of connectors, cables, and operating speeds, so presently SCI systems are mainly composed of a single vendor's proprietary hardware. The SCI standard provides for addressing of up to 65536 nodes, each node providing up to 48 bits of shared address space or up to 281 terrabytes of shared memory. The SCI standard provides several atomic operations, such as read/modify/write, compare/swap, and fetch/add. SCI systems operate without remote memory caches, and thus fall under the NUMA model.

There are a number of manufacturers of SCI hardware, many offering integrated circuits that may be included in an electronic design. Other manufacturers provide adapters with software for computer systems, thereby eliminating the SCI hardware interfacing design for computer systems. A source for PCI-SCI adapter cards is Dolphin Interconnect Solutions of Westlake Village, Calif.

HSM is an acronym for Hierarchical Storage Management. HSM serves the function of removing old, unused data from a quickly accessible system, such as a hard disk, to a slower accessible system, such as a tape drive. HSM thereby ensures that the data residing on the readily accessible hardware is that data likely to be accessed in the near future, with older data being available through slower access in the unlikely event it is needed. HSM may also serve as a backup system.

DASD is an acronym for Direct Access Storage Device, which is any random-access storage device such as a hard disk. DASD devices are an improvement over sequential storage devices, such as tape drives, that must read the preceding data to the desired data to determine its location on the media.

SISCI is an acronym for Software Infrastructure for SCI, which is an API for the development of applications that use SCI.

DETAILED DESCRIPTION

Figure 4A:
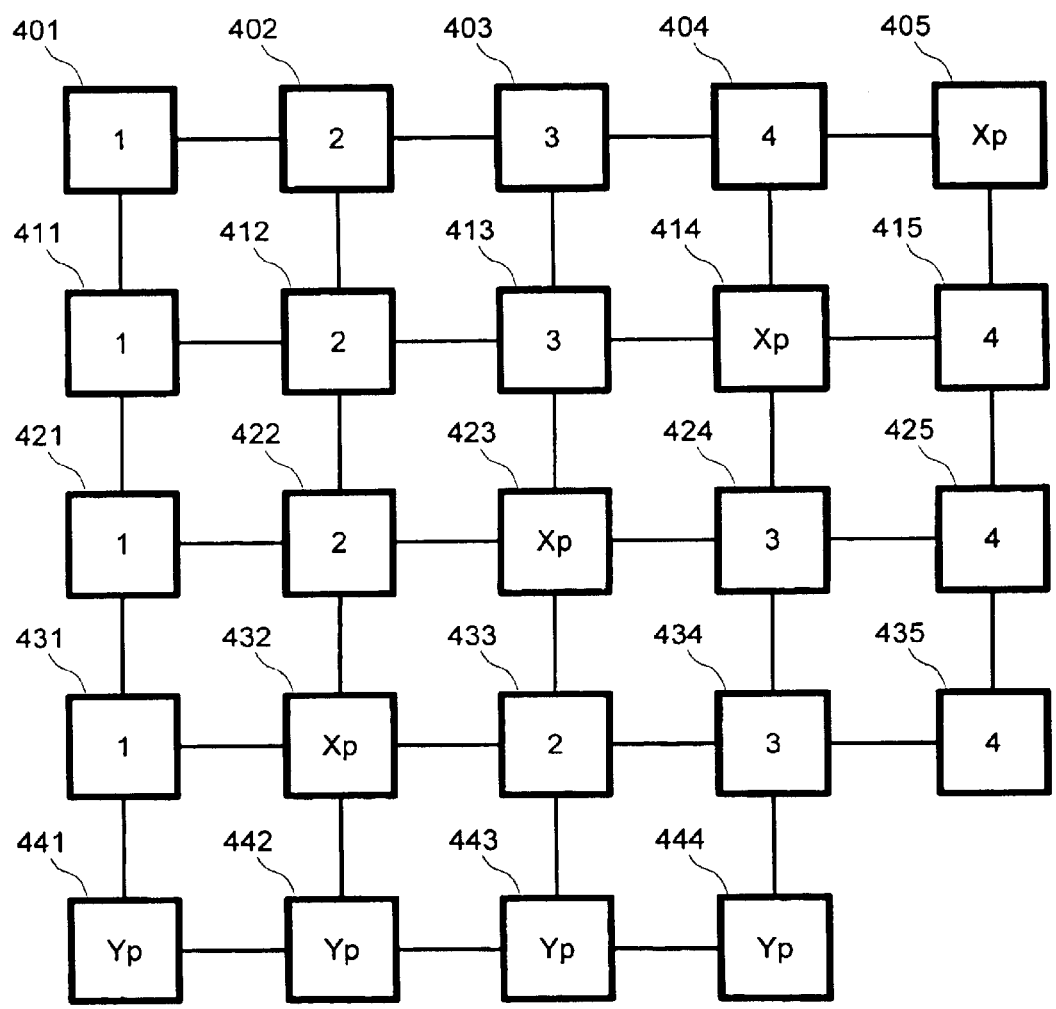
FIG. 4A depicts a RAID system having redundancy in two planes.
Figure 4B:
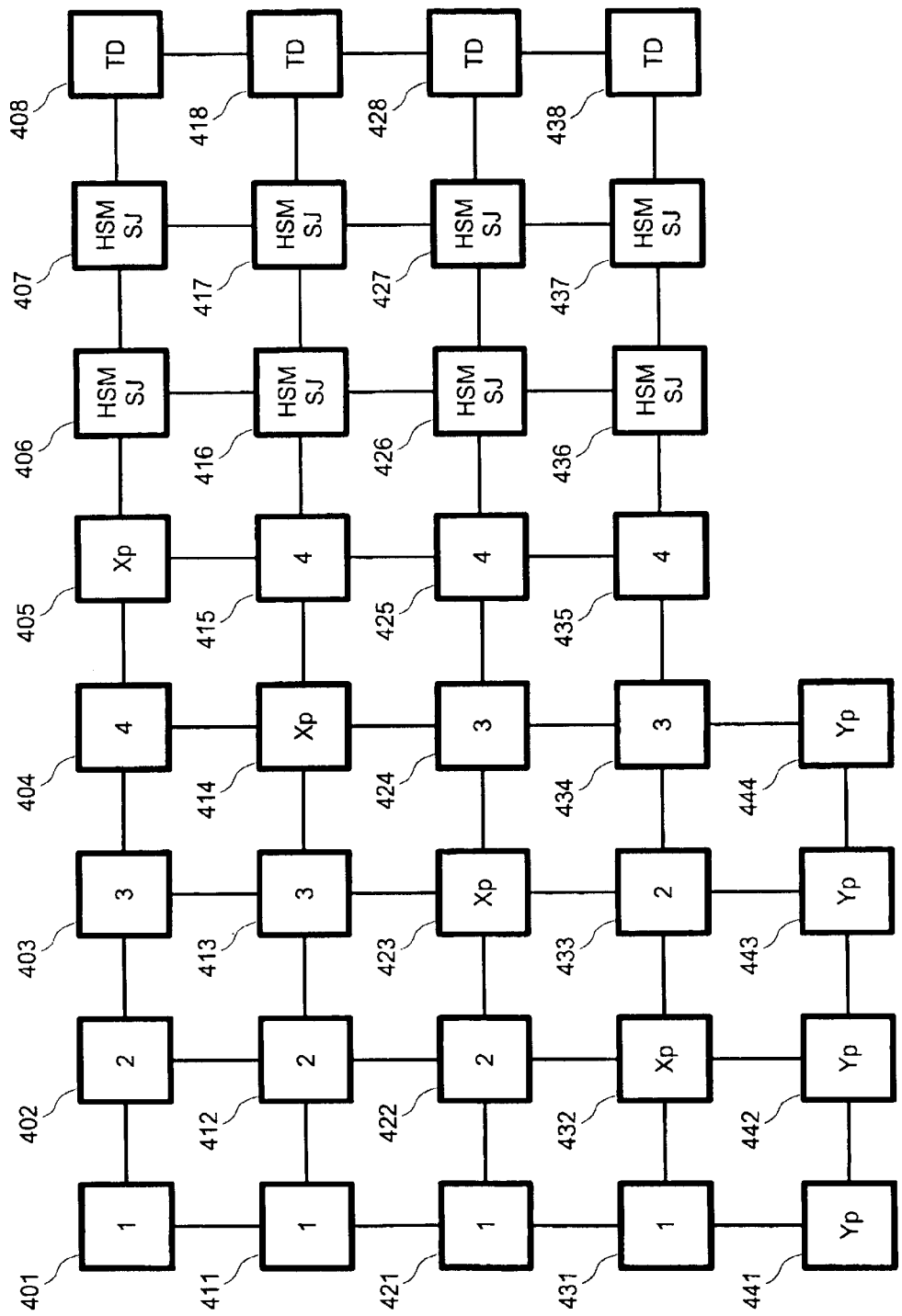
FIG. 4B depicts a RAID system having redundancy in two planes and facilities for HSM segment journaling and tape backup.

One embodiment of the invention includes a RAID subsystem having two planes, as exemplified by the system of FIG. 4A. Three or more disks form RAID-5 arrays in the X-plane, one example including 5 disks shown as 401, 402, 403, 404, and 405. Each of the disks of the X-plane RAID arrays are located in a unique Y-plane location, an example of a Y-plane being 402, 412, 422, 432, and 442. Each X-plane array is included as a virtual disk in the Y-plane, forming a RAID array at levels 0, 1, 1+0, 5, or other configuration as will be understood by those skilled in the art. Y-plane parity disks 441, 442, 443, and 444 provide for redundancy of data of the disks located in the same Y-axis, thereby forming a dual X-Y fault tolerant fabric preferably composed of inexpensive IDE and/OR SCSI disk devices. In a preferred embodiment, disks 405, 414, 423, and 432 contain the X-plane checksum data. FIG. 4B illustrates a related embodiment to that of FIG. 4A, wherein HSM Disk cache storage segment journals are provided as 406, 407, 416, 417, 426, 427, 436, and 437 to tape drives 408, 418, 428, and 438.

Figure 4C:
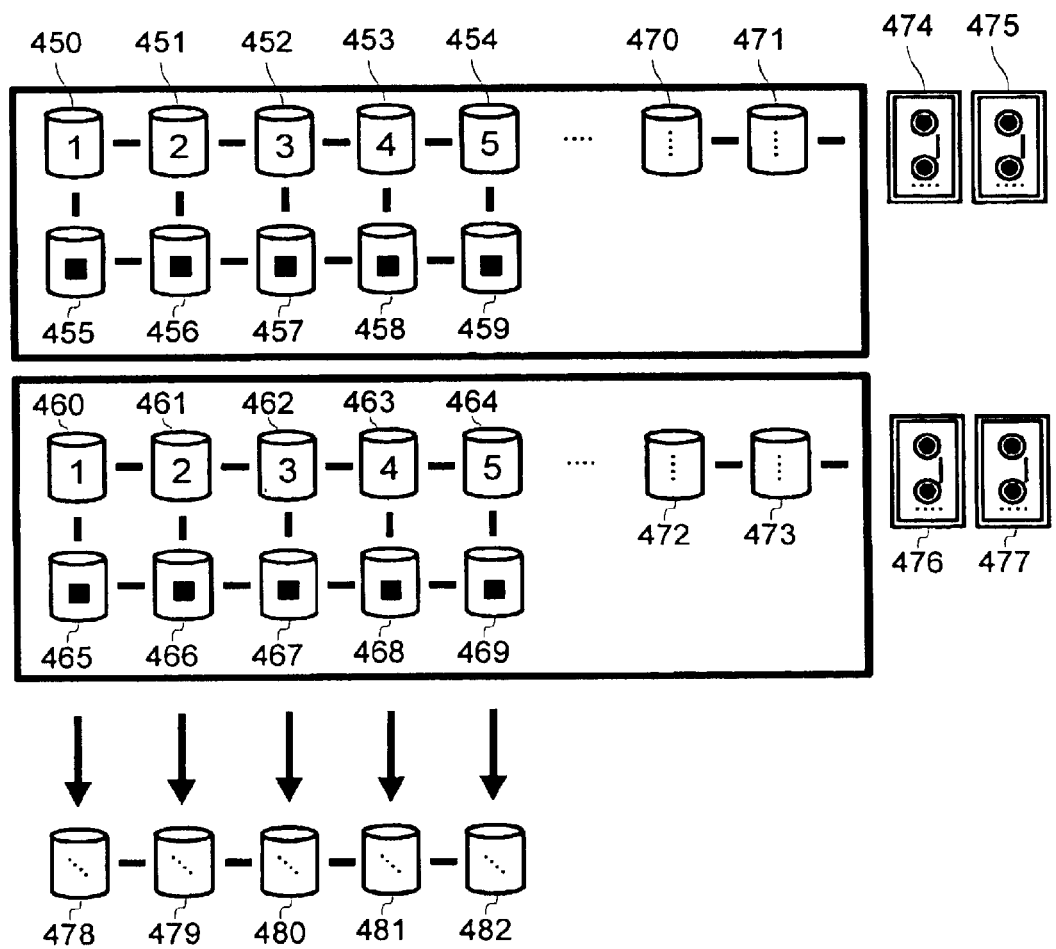
FIG. 4C depicts a dual-planar parity RAID system being configured to provide two RAID 1 HSM systems.

A related embodiment of the system of FIG. 4B is shown in FIG. 4C. Drives 450, 451, 452, 453, and 454 are combined in a RAID array, as are drives 460, 461, 462, 463, and 464. Drives 455, 456, 457 458, and 459 are configured as mirrors in RAID-1 fashion to drives 450–454, as are drives 465, 466, 467, 468, and 469 to drives 460–464. Parity drives 478, 479, 480, 481, and 482 provide a Y-axis checksum for the entire array, for example 478 contains parity for drives 450, 455, 460, and 465. HSM disk cache storage segment journals 470 and 471 and tape drives 474 and 475 are provided for the cluster of drives 450–454 to provide HSM functions. Likewise HSM cache storage segment journals 472 and 473 and tape drives 476 and 477 are provided for the cluster of drives 460–464. A parity disk, such as 482, may be omitted from the system, if a connection is not available, as the drive adds only minimal amounts of redundancy to the system.

Figure 4D:
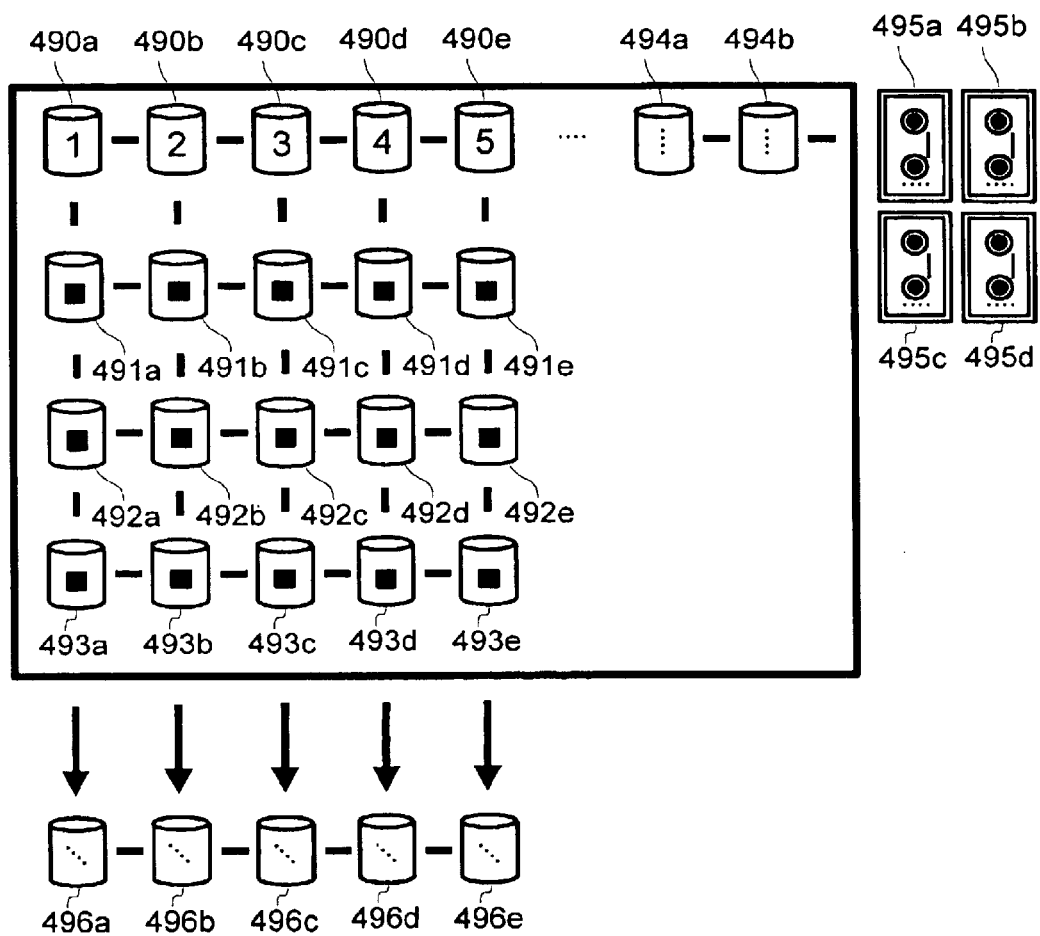
FIG. 4D depicts a dual-planar parity RAID system being configured to provide one RAID 1 HSM system with three virtual mirrored drives.

Another related embodiment of the system of FIG. 4B is shown in FIG. 4D. Drives 490a, 490b, 490c, 490d and 490e are combined in a RAID array. Drives 491a, 491b, 491c, 491d and 491e are configured as mirrors in RAID 1 fashion to drives 490a–e, as are drives 492a, 492b, 492c, 492d and 492e, and 493a, 493b, 493c, 493d and 493e to the same drives 490a–e. Parity drives 496a, 496b, 496c, 496d and 496e provide a Y-axis checksum for the entire array, for example 496a contains parity for drives 490a, 491a, 492a and 493a. HSM disk cache storage segment journals 494a and 494b are provided for the cluster of drives 490a–490e to provide HSM functions. A parity disk, such as 496e, may be omitted from the system, if a connection is not available, as the drive add only minimal amounts of redundancy to the system.

Figure 5:
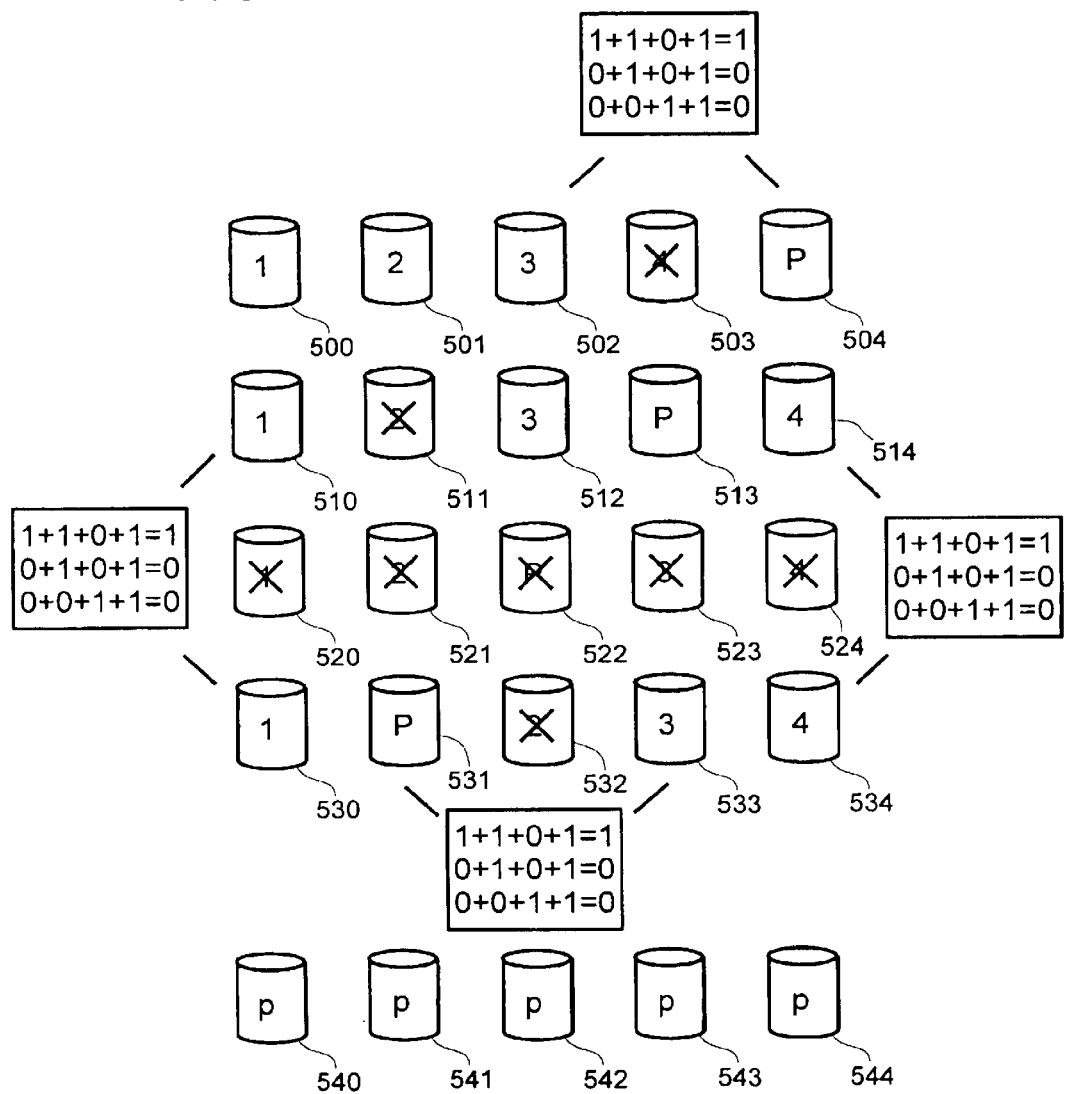
FIG. 5 illustrates the advantages of a dual-planar parity RAID system with respect to reliability and recovery of data in the event of drive failure.

In addition to supporting traditional RAID 1+0 and RAID 5 capabilities, the architecture of this embodiment provides dual planes of fault tolerance for RAID arrays. Disk devices are organized into X and Y planes. Both the X and Y planes employ parity check disks that decrease the probability that the failure of one or more disks within a single array will cause permanent data loss or system down time. With this architecture it is possible to lose an entire array of RAID 5 storage and rebuild it dynamically using the Y plane of parity check disks. The example of FIG. 5 illustrates how a dual X-Y plane system can regenerate data blocks in several directions at once in the event a large number of disks fail in the array, or are taken offline. In that figure drives containing parity for the X-axis are shown as P and for the Y-axis as p. Even though a large quantity of drives at various locations have been made unavailable, as shown with an X, the data of all unavailable drives may be recovered through the redundant parity drives. For example, even through drive 520 is unavailable, the data of that drive may be regenerated through a reverse parity calculation from drives 500, 510, 530, and 540.

The dual X-Y plane allows parity XOR generation to occur in two planes at the same time, creating a second parity check disk set. The array is presented to the external host as the same number of disk arrays of RAID 5 storage as X planes of the array. Each RAID 5 array has an additional string of parity disks on both the X and Y planes of the RAID controller. There is a performance penalty of one additional I/O operation to update the Y plane parity disk over a traditional RAID 5 array using this model. The Y-plane in this model may be implemented as a RAID 4 array with fixed positional check disks.

The architecture of that embodiment supports RAID 0+1 X plane configurations of mirrored stripes and striped mirrors. These configurations may also combine the RAID 4 Y plane with RAID 1+0, providing increased fault tolerance and reliability, while providing the performance advantages inherent in RAID 1+0 mirroring implementations over RAID 5. Due to the nature of parity-based RAID, this design allows the size of the RAID 5 arrays to be practicably larger than five disks. On traditional RAID 5 designs, including more than five disks dramatically increases the probability of multiple devices taking down the entire array. RAID 5 and RAID 1+0 configurations might use up to eight disks for mirroring, striping and parity checking in a preferred embodiment.

RAID 1+0 configurations can be combined to create more than simple two-way mirroring. The architecture of one embodiment having four X planes supports four-way mirroring, and up to eight-way distributed mirroring. A configuration might also use three-way RAID 1 mirroring, having the advantage of providing break-away mirror sets that can be split away from an active mirror group, allowing backups to be performed with a snapshot of the data set.

The use of three and four-way mirroring may increase the read performance by performing round-robin reads (load balancing) across mirror sets for incoming requests. This level of mirroring is usually not necessary for fault tolerance, but in cases where large volumes of read only data, such as web pages, are being heavily accessed, it does provide improved read performance when combined with intelligent data striping for RAID 0 data sets.

Figure 6:
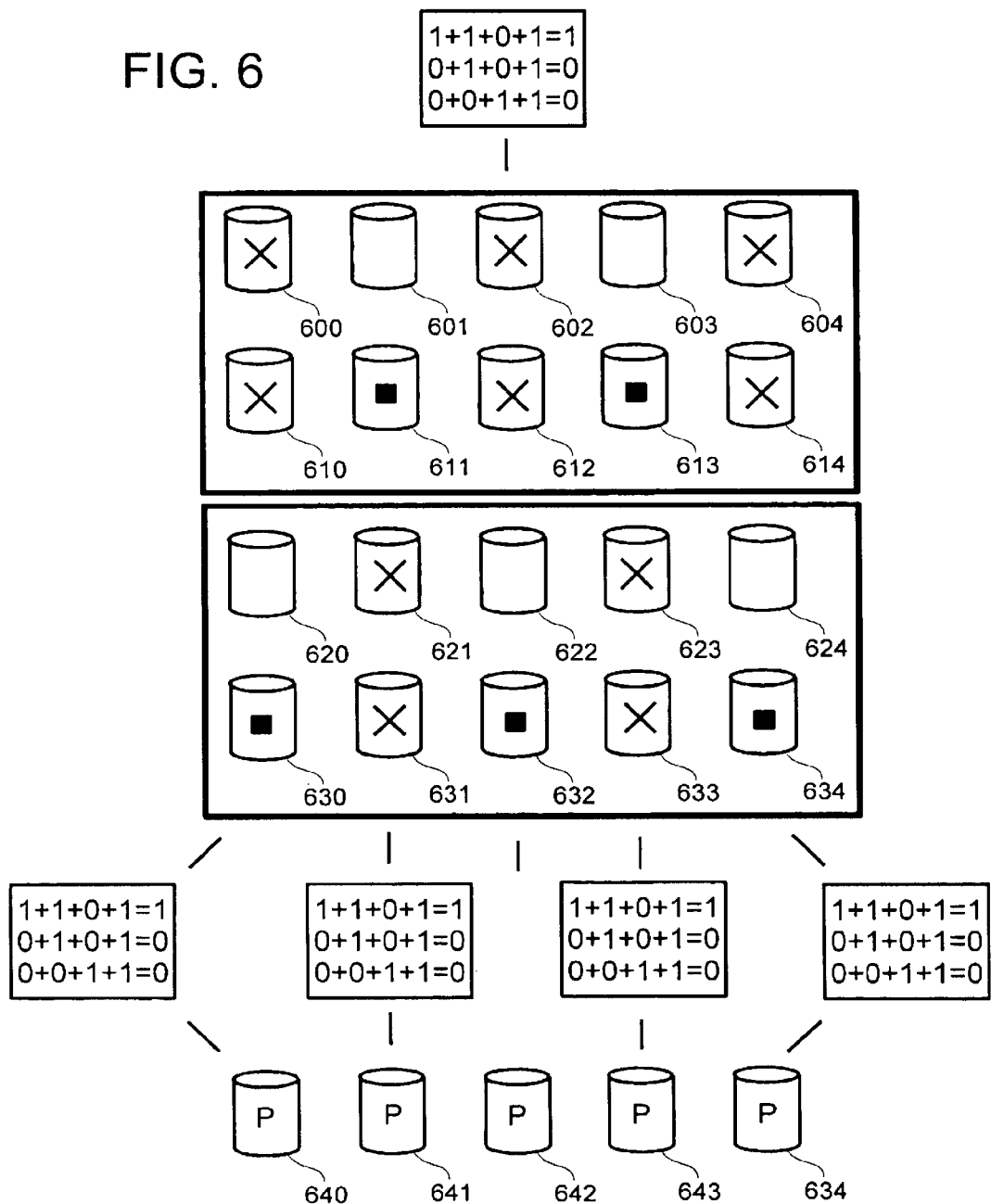
FIG. 6 illustrates the advantages of a dual-planar parity RAID system configured to provide two RAID 1 virtual drives with respect to reliability against drive failure.

Use of RAID 4 Y-parity planes allows RAID 1+0 configurations to recover from failures of multiple mirrored devices, increasing the fault tolerance over traditional RAID 1+0 array configurations. The example of FIG. 6 shows failures in an array of RAID 1+0 devices, as was shown in FIG. 4G. Drives 600–604 and 620–624 form two raid arrays, with mirror drives 610–614 duplicating the data of drives 600–604 and mirror drives 630–634 duplicating the data of drives 620–624. Y-axis parity disks 640–644 contain parity for the drives in the same Y-axis, for example drive 640 containing parity for drives 600, 610, 620, and 630. In the example of FIG. 6, failures of both the primary and secondary mirrored devices in a RAID 1+0 array can be recovered from the Y plane RAID 4 parity check disks in real time. The failure of disks 600 and 610, for example, can be recovered because 600 and 610 contain duplicate data and 620/630 and parity disk 640 contain the remaining data for reconstruction.

Figure 7:
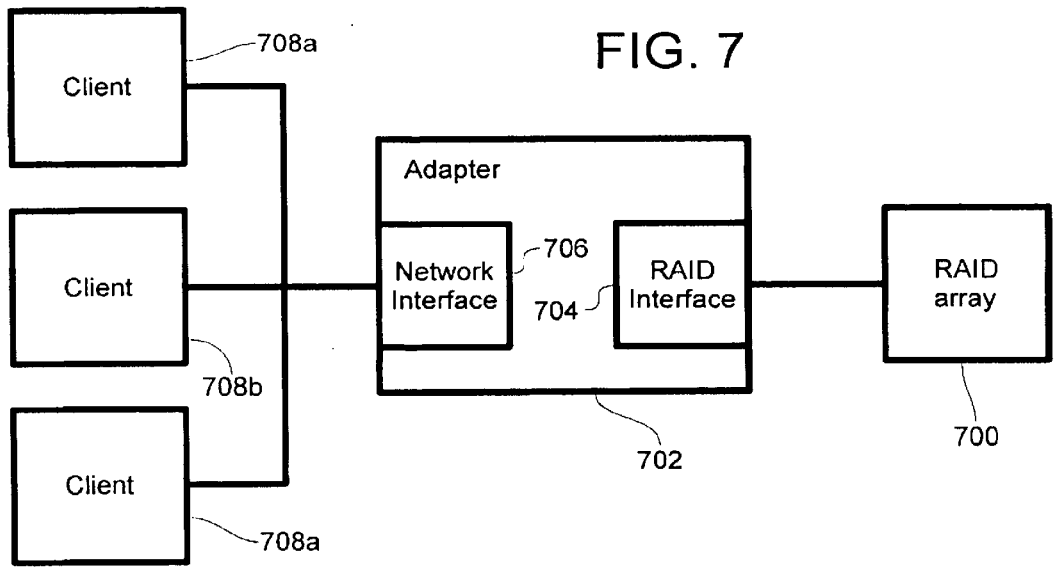
FIG. 7 depicts a simple RAID network subsystem that may provide RAID storage to clients.

In another embodiment shown in FIG. 7, a RAID array 700 is connected to a controller 702 through a RAID interface 704, which may be a number of disk controllers or other means of providing communication from controller 702 to the storage of raid array 700. A network interface 706 is provided in controller 702 through which data on RAID array 700 may be accessed by one or more clients shown as 708a, 708b, and 708c. In one embodiment, interface 706 communicates using the SCI standard. In embodiment, interface 706 is an Ethernet interface, and may facilitate array 700 being presented as a network drive over the NFS, NCP SMBFS, iSCSI or other protocols. In another embodiment, both Ethernet and SCI interfaces are provided. For the purposes of this writing, such a system having a RAID array, a controller, and a network interface will be called a RAID network subsystem (RNS).

Figure 45:
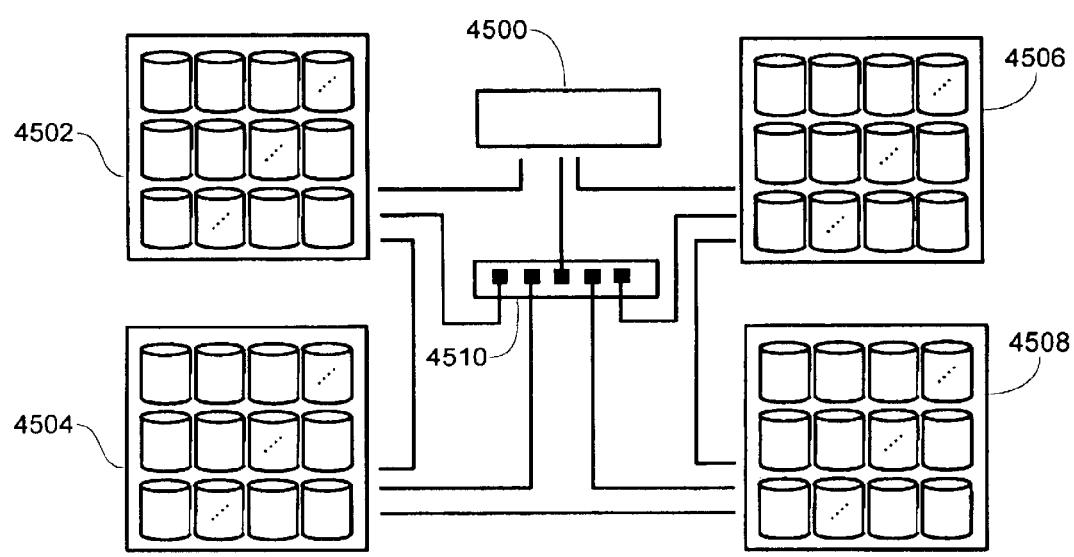
FIG. 45 depicts a system combining four RNS systems through an SCI switch to a client.

In one embodiment, an RNS provides on-demand storage journalling capability, hotfix redirection, mirrored caching, annotated storage journalling, dynamic stripe block allocation, dynamically added stripe and mirror sets, breakaway mirroring, and infinite HSM storage journalling. In that embodiment the RNS provides network attached storage capabilities via the remote NFS (Network File System), iSCSI (Internet SCSI TCP remote device support) and Novell NCP (NetWare Core Protocol) networking protocols. Those RNS arrays can also attach to an Ethernet network and function as network attached storage. Systems of those RNS arrays can be interconnected over the SCI (Scalable Coherent Interface) clustering interconnect fabric, one such configuration illustrated in FIG. 45. RNS systems 4502, 4504, 4506, and 4508 are connected through an SCI network to provide a RAID storage network. A system 4500 having an SCI interface is connected to the RAID storage network, optionally through an SCI switch 4510, whereby the storage of the RAID storage network may be accessed. Host systems may use an SCI adapter to interface to such an RNS fabric and communicate with individual RAID systems.

In both networked configurations, cabinets formed from those RNS systems can be utilized by multiple host systems, providing a highly scalable storage area networking fabric that supports distributed RAID-1 mirroring and dynamic fail over capability between RNS RAID controllers. Employing the SCI interface at the host system provides high bandwidth, low latency data transfers of block based memory between those RNS systems and their local caches, without the copying overhead typical of LAN based storage.

Figure 8:
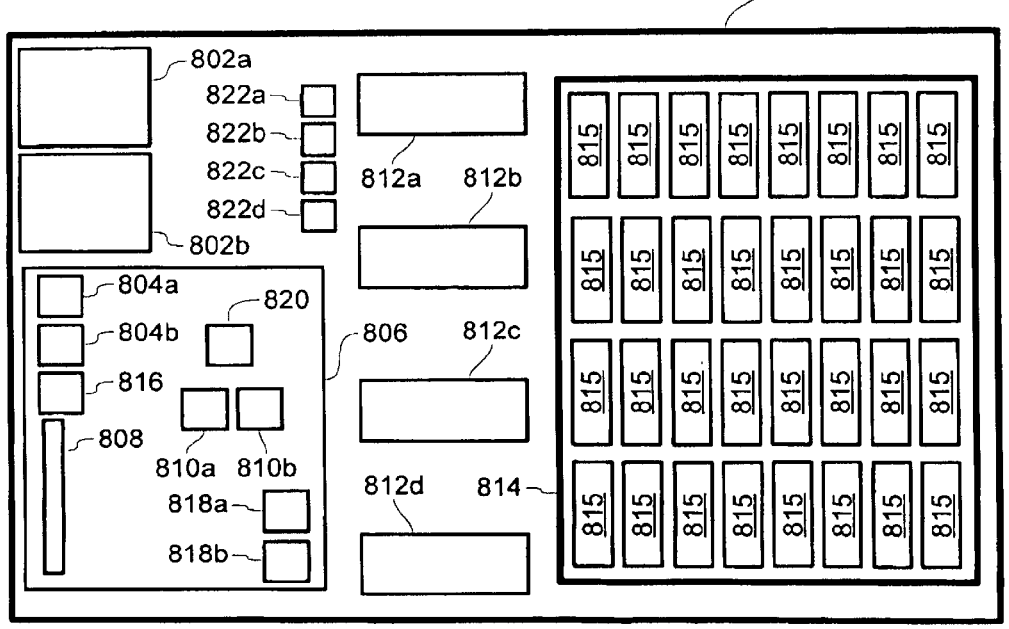
FIG. 8 depicts the components of one implementation of a RAID network subsystem.

In that embodiment, an RNS is housed in an expansion cabinet mountable to a 19 inch rack by slide rails that permits up to eight of those RNS devices to be inserted into a chassis forming a single DASD assembly. Drive bays are accessible by sliding the unit out of the cabinet and adding or removing drives into empty drive bays in the unit. The cabinet assembly allows hot swappable drives to be added to the RNS expansion cabinet. In that embodiment, shown in FIG. 8, each RNS expansion cabinet is equipped with two redundant power supplies 802a and 802b having two cooling fans each, two PCI-SCI interface adapters 804a and 804b providing dual ring or single ring SCI topologies, a Pentium II or Pentium III mezzanine card 806 with a PCI bus 808, two SCSI II on-board controllers 810a and 810b, four 3 Ware single-ended 8-way IDE controllers or four SCSI II controllers 812a, 812b, 812c and 812d, either 256 or 512MB of RAM, 32 80GB IDE or SCSI disk drives 814 (each individually labeled 815), a 10-100-1000 Ethernet interface 816, and a 19 inch cabinet chassis 800, two serial ports 818a and 818b, either 4MB or 8MB of flash memory 820 to hold the operating system, and four 32GB tape drives. The chassis 800 has two sliding rails, an array of 64 and an array of 8 LED displays for showing disk power or activity mounted to the front panel. HSM segment journal cache disks are optional. Each cabinet supports dual redundant power supplies with two cooling fans each, in the event of a single power supply failure. The mezzanine PII/PIII system board may contain integrated video, serial, and SCSI and IDE support on-board.

The system board also provides standard PCI slots and supports industry standard PCI adapters. Each cabinet provides a PCI-SCI interconnect adapter and a 10-100-1000 Ethernet interface. The operating system control software is booted from flash memory on the system board, and provides a telnet service by default via either the serial port, SCI, or the Ethernet connection over a network for initial configuration of the RNS cabinet.

RNS expansion cabinets can be assembled into strings of SCI based DASD RAID and mirrored storage. In one embodiment, a single DASD cabinet of RNS storage can accommodate eight RNS expansion cabinets, each with 32 80GB disk drives providing 2.56 terabytes, for a total of 20.48 terabytes of available disk storage per vertical DASD cabinet. FIG. 9A shows a front view of such a cabinet 900, and FIG. 9B shows a rear view of that same embodiment. In that embodiment each expansion cabinet 901 has drive indicator LEDs 902 indicating power and disk activity for a particular disk device in the array. Within a DASD cabinet RNS expansion cabinets are interconnected via SCI cables through two SCI ports, 904a and 904b. Optionally, each RNS expansion cabinet can also be connected to a standard Ethernet network through Ethernet port 906 and accessed remotely via TCP/IP, IPX/SPX, or UDP (NFS). In that embodiment, each of the eight RNS expansion cabinets have a parallel port 908, two serial ports 910a and 910b, two cooling fans 912a and 912b, and power receptacles 914a and 914b for dual power supplies.

Figure 10:
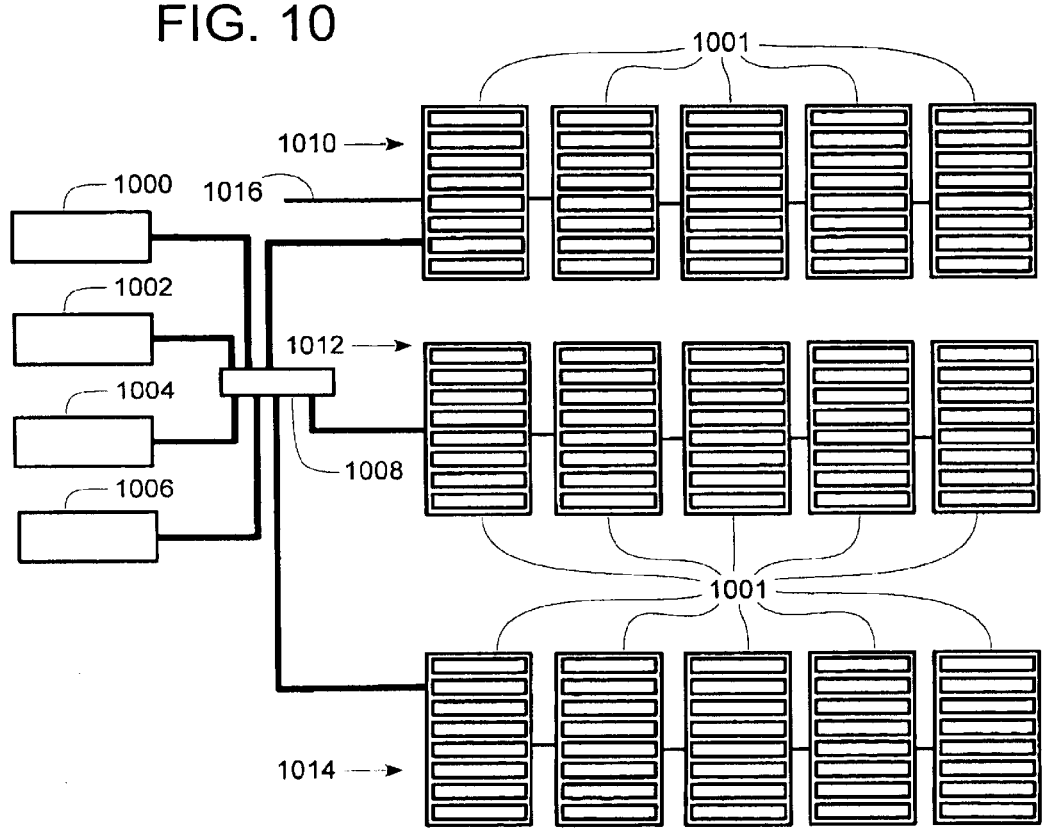
FIG. 10 depicts one interconnection configuration of RNS expansion cabinets through an SCI switch to four clients using several protocols.

RNS DASD cabinets can be interconnected via SCI into very large networks of thousands of RNS nodes, as shown in FIG. 10. DASD strings of RNS expansion cabinets 1010, 1012, and 1014 are linked by an SCI network pivoting around SCI switch 1008. SCI devices 1000, 1002, 1004, and 1006 access DASD strings 1010, 1012 and 1014 through the SCI network. Each of DASD strings 1010, 1012 and 1014 is composed of DASD cabinets labeled 1001. An Ethernet connection 1016 is provided by string 1010 in order to provide access to external devices to the DASD string through an Ethernet network. An RNS expansion cabinet can also be configured as a "head of string" and combine the adjacent RNS cabinets into large logical arrays of mirrored storage that are segregated into distinct SCI rings and ringlets. This provides the advantage of allowing host systems the ability to access several strings of SCI storage in tandem. If one of the strings fails, the SCI attached host can fail over to a mirrored string of DASD. DASD string mirroring is another level of mirroring provided by this invention and may be implemented at the SCI host's system adapter software allowing an SCI attached host system to select and mirror to one or more DASD strings in a distributed fashion.

Figure 11:
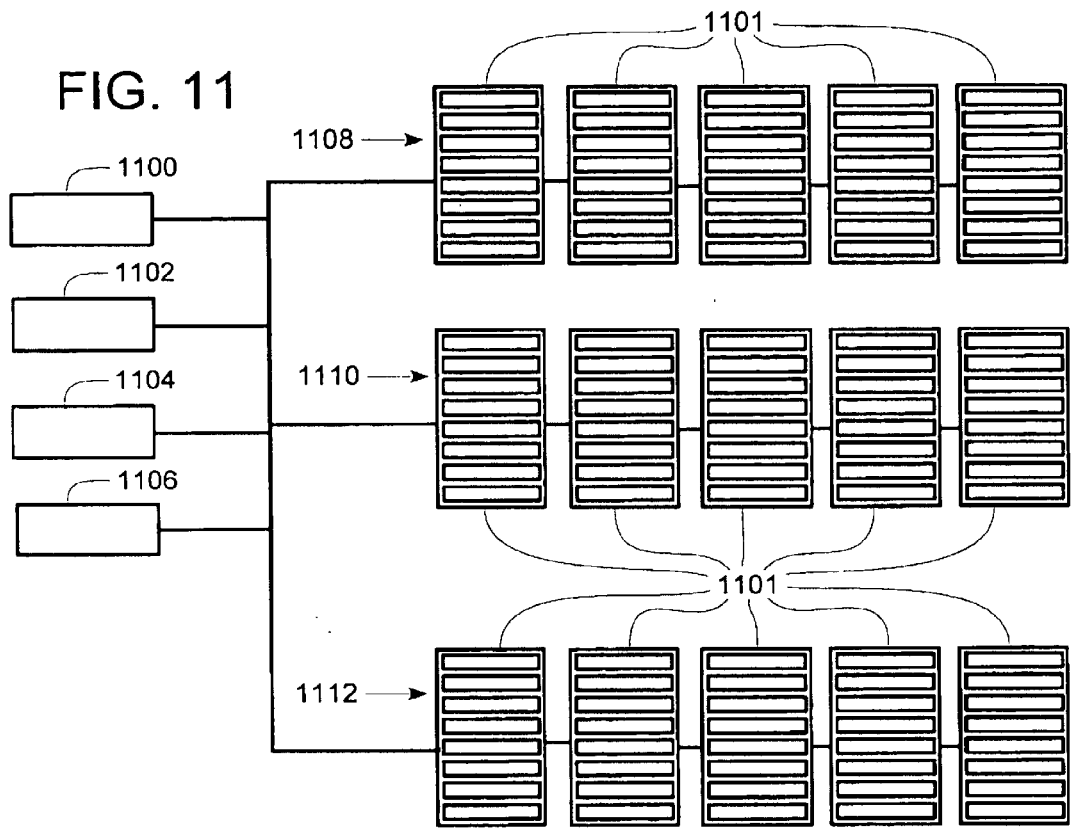
FIG. 11 depicts one interconnection configuration of RNS expansion cabinets through an Ethernet network to four clients using several protocols.
Figure 12:
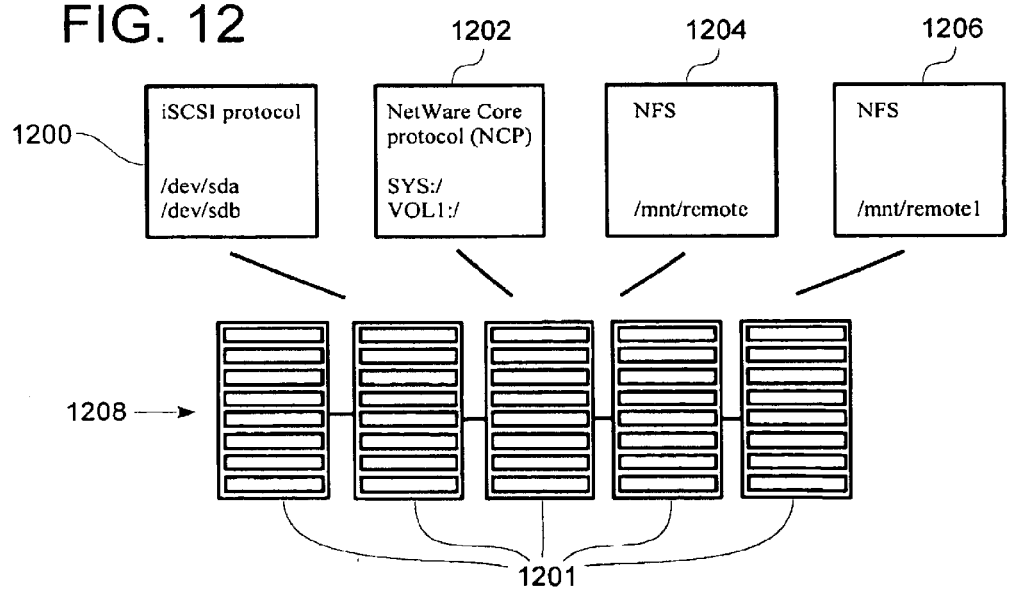
FIG. 12 depicts the logical connections of four clients to an RNS expansion cabinet through several protocols.

RNS DADS cabinets or DASD strings can also be used as large Network Attached Storage servers to provide Ethernet based storage area networks. An RNS can also be configured to host multiple NFS, NCP, SMBFS, or iSCSI clients via an Ethernet connection, as shown in FIGS. 11 and 12. In FIG. 11, DASD strings 1108, 1110, and 1112 are connected to an Ethernet network. As in FIG. 10, DASD strings 1108, 1110 and 1112 is composed of DASD cabinets labeled 1101. A client 1100 accesses the DASD strings through the NCP protocol. Another client 1102 accesses the DASD string through the NFS protocol. A third client 1104 accesses the DASD strings through the iSCSI protocol. A fourth client 1105 accesses the DASD strings through the NCP, NFS, and iSCSI protocols. In FIG. 12, a DASD string 1208 (again, composed of DASD cabinets labeled 1201) is made available through Ethernet connections 1200, 1202, 1204, and 1206 to a client. The first connection 1200 accesses the string 1208 using the iSCSI protocol, the storage being accessible under/dev/sda and /dev/sdb. The second connection 1202 accesses the string 1208 using the NCP protocol, the storage being accessible under SYS:/ and VOL1:/. The third connection 1204 accesses the string 1208 using the NFS protocol, the storage being accessible under /mnt/remote. The fourth connection 1206 also accesses the string 1208 using the NFS protocol, the storage being accessible under /mnt/remote1.

Figure 13:
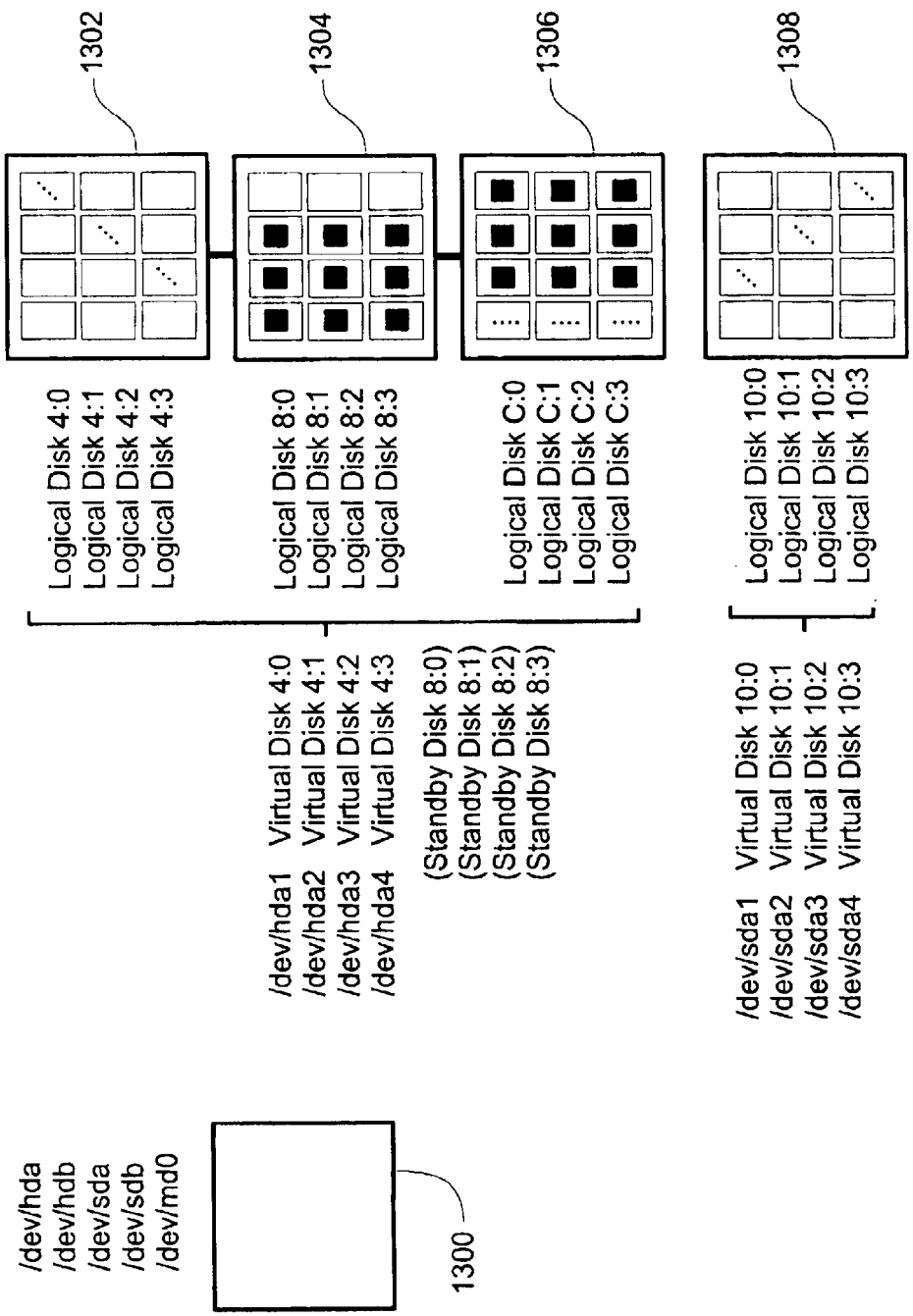
FIG. 13 depicts a configuration providing a DASD string using RAID 5+1 with failover and breakaway mirror capabilities.

Host systems utilizing an RNS may attach to the target RNS units via an SCI interconnect fabric. In one embodiment, RNS controllers expose configured units of storage as virtual disks to host systems, and then the hosts system maps these virtual disks into local device handles and presents them to the host systems as local hard disk devices. The actual methods used to create these mappings differ depending upon the host operating system. FIG. 13 pictorially illustrates how groups of RAID 1 and RAID 5 storage can be combined to map mirrored or striped storage into virtual disk windows that are exposed to SCI attached host systems. The host adapter can be configured to be aware of multiple RNS arrays, and perform automatic fail over to known RAID 1 mirrors in the event an entire RNS expansion cabinet fails. Host adapters maintain a mirror map of configured DASD strings, along with head of string location. In this architecture, it is the host adapter that elects the DASD "head of string" by initiating communication to it.

FIG. 13 illustrates a configuration providing a DASD string with failover capability. A RAID 5 array 1302 is first provided as main storage. RAID 5 mirrors 1304 and 1306 mirror 1302 in RAID 1 fashion and are connected in a DASD string. An SCI RAID controller 1300 is configured to select one system such as 1302 as a "head of string" and perform logical RAID 1 mirroring of RAID5 array storage over the SCI fabric. The SCI mount point keeps a table of all identified mirror arrays, and in the event an array box fails, failover dynamically occurs to a mirrored system. Use of this type of configuration allows the creation of cascaded mirror RAID groups, each being capable of electing a new head if an array box fails. For example, 1302 of the string including 1304 and 1306 is configured to be the default head of string. If 1302 becomes unable to communicate with controller 1300, controller 1300 may select a new head of string of either 1304 or 1306. This figure illustrates how a breakaway mirror may be included to permit ease of backups. Provided all of 1302, 1304, and 1306 are functioning in the DASD string, any one of the three can be removed from the string while providing redundant RAID 1 storage. Separate RAID 5 array 1308 may also be controlled by controller 1300 while also controlling a DASD string such as formed by 1302, 1304 and 1306.

This model simplifies array fail over. Head of string is defined as the RNS array the host is configured to send messages to for a particular array of storage. If the head of string fails, the host adapter switches to the next configured array, since they are all accessible on an SCI switched fabric, and resumes normal operations without any noticeable interruption to connected users who are accessing this storage.

By default, Linux maps RAID devices into the /dev/mdXX device layer as virtual disks, and provides a logical volume manager (LVM) interface that allows "pluggable" RAID device mappings. There are also several reserved blocks of RAID device major:minor numbers assigned to DAC, Compaq, and several other vendors of RAID hardware adapters. Any of these device numbers are available to create device nodes for virtual disks in Linux. Linux can support up to 700 disks on a single host system at present, but not all of these device handles will work well with RAID.

Figure 14:
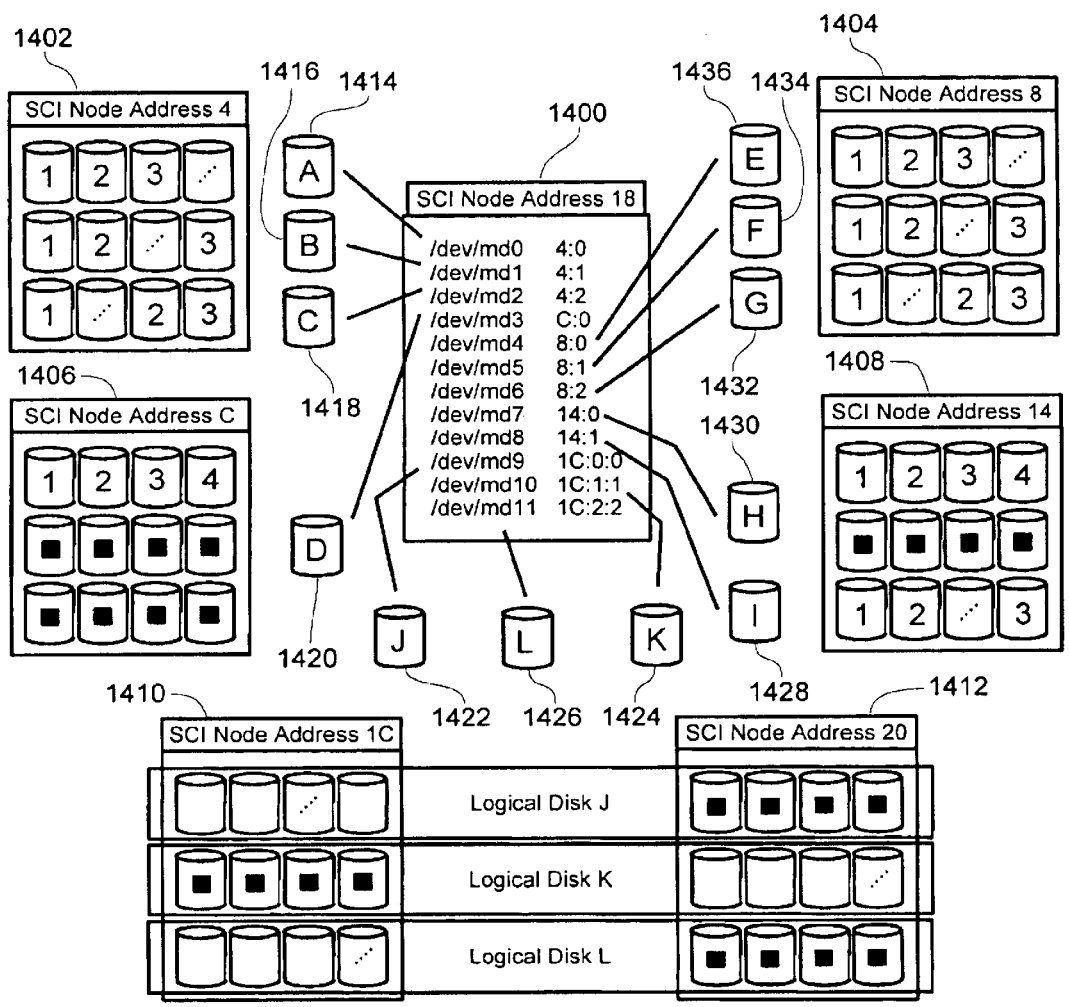
FIG. 14 depicts several Linux client configurations of connections to RNS devices of several configurations.

FIG. 14 illustrates logically a system having multiple RAID disks to a Linux system with an SCI interface. An RNS 1402 of 12 disks provides three RAID 5 virtual disks, 1414, 1416 and 1418, which are mapped to /dev/md0, /dev/md1 and /dev/md2. Another RNS 1406 of 12 disks provides one RAID 1+0 virtual disk 1420 as /dev/md3. A third RNS 1404 of 12 disks provides three RAID 5 virtual disks, 1432, 1434 and 1436, as /dev/md4, /dev/md5 and /dev/md6. A fourth RNS 1408 of 12 disks provides one RAID 1+0 array 1430 and one RAID 5 array 1428 as /dev/md7 and /dev/md8. Two additional RNS devices 1410 and 1412 are linked in distributed fashion to provide RAID 5+1 virtual disks 1422, 1424, and 1426 as /dev/md9, /dev/md10 and /dev/md11.

Mapping to Linux is relatively simple, and requires that a table of functions be passed to a disk registration function. These functions then handle read and write requests to the device. This is implemented as an SISCI module that loads into the Linux kernel, and periodically receives broadcast packets from attached RNS arrays advertising exported virtual disk devices. The major device number is also passed to this function during registration.

Device objects in Linux register via a call to register_blkdev( ) and pass a table with the attached functions. The SISCI virtual disk driver implements these functions for each registered virtual disk device. The following C language code fragment illustrates one possible set of functions and a data structure for doing so:

```
ssize_t mprs_drv_read(struct file *, char *, size_t, loff_t *);
ssize_t mprs_drv_write(struct file *, const char *, size_t, loff_t *);
unsigned int mprs_drv_poll(struct file *, poll_table *);
int mprs_drv_ioctl(struct inode *, struct file *, unsigned int, unsigned long);
int mprs_drv_open(struct inode *, struct file *);
int mprs_drv_close( struct inode *, struct file *);
struct file_operations mprs_drv_driver_ops =
{
    NULL,            /* lseek    */
    mprs_drv_read,   /* read     */
    mprs_drv_write,  /* write    */
    NULL,            /* readdir  */
    NULL,            /* poll     */
    mprs_drv_ioctl,  /* ioctl */
    NULL,            /* mmap     */
    mprs_drv_open,   /* open*/
    NULL,            /*flush*/
    mprs_drv_close,  /* release  */
    NULL,            /* fsync    */
```

```
            -continued
NULL,         /* fasync    */
NULL,         /* check_media_change   */
NULL,         /* revalidate */
NULL          /* lock      */
}
```

The Linux device object interface provides support for detecting removable media on remote RAID systems, as well as providing open( ) and close( ) semantics so the host can increment usage counts on remotely mounted virtual disk devices. Geometry, reset, and several other key functions are implemented in Linux as IOCTL calls, and use the IOCTL interface at this layer in the Linux operating system.

After this registration function is called, and if a valid device node has been created in /dev/<device> with the major:minor number corresponding to the registered block device, it is then possible to mount and dismount the file systems on these remote RNS virtual disks.

At present, Linux has reserved major device ranges for simple physical disk and RAID device support, as shown in the table below. For RAID devices, mappings can be allowed to regular disk major:minor device numbers such as the ones for IDE and SCSI, but it is preferred that the standard RAID device mappings are used. Linux allows a maximum of 384 virtual disks to be hosted on a single system.

| Device type | Major numbers |
| --- | --- |
| IDE (hda–hdt) | 0x0300, 0x0340, 0x1600, 0x1640, 0x2100, 0x2140, 0x2200, x2240, 0x3800, 0x3840, 0x3900, 0x3940, 0x5800, 0x5840, 0x5900, 0x5940, 0x5A00, x5A40, 0x5B00, 0x5B40 |
| SCSI 0–15 (sda–sdp) | 0x0800, 0x0810, 0x0820, 0x0830, 0x0840, 0x0850, 0x0860, 0x0870, 0x0880, 0x0890, 0x08a0, 0x08b0, 0x08c0, 0x08d0, 0x08e0, 0x08f0 |
| SCSI 16–127 (sdq–sddx) | 0x4100–0x4700 |
| MCA EDSI (eda, edb) | 0x2400, 0x2440 |
| XT disks | 0x0D00, 0x0D40 |
| Acorn MFM disks | 0x1500, 0x1540 |
| Parallel Port ATA disks | 0x2F00, 0x2F01, 0x2F02, 0x2F03 |
| Software RAID groups | 0x0900, 0x0901, 0x0902, 0x0903, 0x0904, 0x0905, 0x0906, 0x0907, 0x0908, 0x0909, 0x090a, 0x090b, 0x090c, 0x090d, 0x090e, 0x090f |
| I2O 0–127 (hda–hddx) | 0x5000–0x57f0 |
| COMPAQ SMART2 Array 0–127 (ida0a–ida7p) | 0x4800–0x48F0 |
| DAC960 Raid Array 0–15 (ida0a–ida7p) | 0x3000–0x37F0 |

Windows NT/2000 virtual device registration is somewhat more involved and requires several layers of mapping. Generally, the method is to create a kernel driver that registers a device object in the W2K symbolic address space, then map the newly created device object into a file based partition object. W2K file systems are very different in design in relation to Linux.

W2K does not used fixed, inflexible major:minor device designations for disks, but rather creates symbolic handles that are managed in an internal object space that can be mapped to external logical device handles, such as DOS drive letters. This is accomplished via calls to special APIs. W2K file systems always deal with disk objects as files, and all calculations are done relative to the partition rather than LBA based offsets.

This is due to the cache manager design inside of W2K. Unix based operating systems usually place file systems on top of a buffer cache LRU of some sort, W2K does it in reverse. In W2K, the cache manager sits on top of native File System drivers, and uses the file system drivers as "meta-data" drivers that push and pull logical sectors runs on and off disks.

The W2K cache manager presents logical file handles, and MDL lists that contain sector run lists for a file to applications, and not the file system drivers. The cache manager performs I/O directly to disk devices in many cases, and bypasses W2K file system drivers for most I/O operations. It helps to think of the W2K cache manager as the core file system in the OS, and file system drivers as meta-data mapping agents that provide sector relative mapping information to the I/O subsystem on-demand.

This design allows complex VM support to exist within the kernel. In fact, W2K is one of the few Oss that provide full VM memory paging support to kernel applications as well as user space applications. The cost for this flexibility is increased complexity in the interface. W2K kernel internals are very complex relative to the interaction between the W2K cache manager and the underlying file system drivers.

Figure 15:
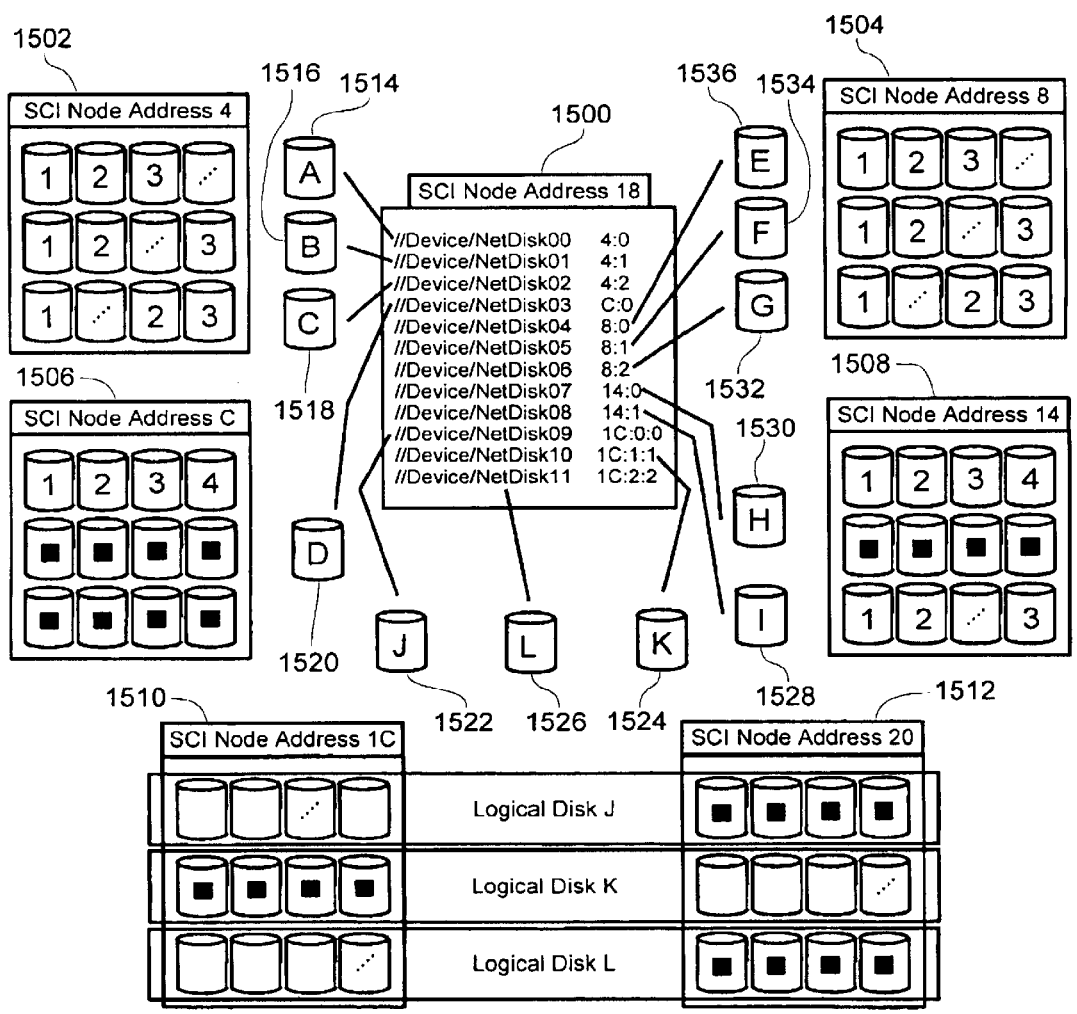
FIG. 15 depicts several Windows 2000 client configurations of connections to RNS devices of several configurations.

FIG. 15 illustrates logically a system having multiple RAID disks to a W2K system with an SCI interface. An RNS 1502 of 12 disks provides three RAID 5 virtual disks, 1514, 1516 and 1518, which are mapped to //DEVICE/NetDisk00, //DEVICE/NetDisk01 and //DEVICE/NetDisk02. Another RNS 1506 of 12 disks provides one RAID 1+0 virtual disk 1520 as //DEVICE/NetDisk03. A third RNS 1504 of 12 disks provides three RAID 5 virtual disks, 1532, 1534 and 1536, as //DEVICE/NetDisk04, //DEVICE/NetDisk05 and //DEVICE/NetDisk06. A fourth RNS 1508 of 12 disks provides one RAID 1+0 array 1530 and one RAID 5 array 1528 as //DEVICE/NetDisk07 and //DEVICE/NetDisk08. Two additional RNS devices 1510 and 1512 are linked in distributed fashion to provide RAID 5+1 virtual disks 1522, 1524, and 1526 as //DEVICE/NetDisk09, //DEVICE/NetDisk10 and //DEVICE/NetDisk11.

Virtual RNS disks are exported and device object mappings are created by calling the Device Object Registration API. The following code exemplifies a function that will create a distributed network virtual disk and map it into symbolic kernel space:

```
/*++
Routine Description:
    This is the initialization routine for the TRG NetDisk virtual disk device
    driver for W2K.
    This routine creates the device object for the device and performs all
    other driver initialization.
Arguments:
    DriverObject - Pointer to driver object created by the system.
Return Value:
    NTSTATUS - The function value is the final status from the
    initialization operation.
--*/
{
    NTSTATUS Status;
    UNICODE_STRING SymbolicLinkName;
    UNICODE_STRING DeviceName;
    //
    // Create the device object.
    //
```

-continued

```
RtlInitUnicodeString( &DeviceName,
   L"\\Device\\" NET_DISK_DEVICE_NAME );
Status = IoCreateDevice( DriverObject,
      0,
      &DeviceName,
      FILE_DEVICE_NETWORK_DISK,
      0,
      FALSE,
      &NetDiskDeviceObject);
if (!NT_SUCCESS( Status )) {
   return Status;
}
//
// Initialize the driver object with this driver's entry points.
//
DriverObject->MajorFunction[IRP_MJ_CREATE] =
(PDRIVER_DISPATCH)NetFsdSuccess;
DriverObject->MajorFunction[IRP_MJ_CLOSE] =
(PDRIVER_DISPATCH)NetFsdSuccess;
DriverObject->MajorFunction[IRP_MJ_READ] =
(PDRIVER_DISPATCH)NetFsdReadWrite;
DriverObject->MajorFunction[IRP_MJ_WRITE] =
(PDRIVER_DISPATCH)NetFsdReadWrite;
DriverObject->MajorFunction[IRP_MJ_CLEANUP] =
(PDRIVER_DISPATCH)NetFsdSuccess;
DriverObject->MajorFunction[IRP_MJ_DEVICE_CONTROL] =
(PDRIVER_DISPATCH)NetFsdDeviceControl;
DriverObject->MajorFunction[IRP_MJ_SHUTDOWN] =
(PDRIVER_DISPATCH)NetFsdSuccess;
//
// Initialize the global data structures
//
ExInitialize FastMutex( &NetDiskMutex );
NetDiskCount = 0;
NetDiskDeviceObject->Flags &= ~DO_DEVICE_INITIALIZING;
//
// Create a symbolic link so that the user mode program can get a handle
// to the just created device object.
//
RtlInitUnicodeString( &SymbolicLinkName,
   L"\\??\\" NET_DISK_DEVICE_NAME);
Status = IoCreateSymbolicLink( &SymbolicLinkName,
   &DeviceName );
return Status;
}
```

A unique IOCTL is used under W2K to remotely mount the virtual disks into the W2K operating system, then map a logical DOS drive letter to the device. The IRP_MJ_READ, WRITE, CREATE, CLOSE, SHUTDOWN, and other functions must be provided in the body of the device driver code that provides remote communication via SISCI APIs in W2K.

The following code will register a virtual disk device under NT/W2K, then map it to a drive letter:

```
if ((Device = CreateFile( NET_DISK_DEVICE_NAME_W32,
               GENERIC_READ | GENERIC_WRITE,
               0,
               NULL,
               OPEN_EXISTING,
               0,
               0 )) == INVALID_HANDLE_VALUE)
{
   printf("Error %d attempting to open the device.\n", GetLastError());
   return;
}
//
// Now attempt the actual mount.
//
if (!DeviceIoControl( Device,
         (DWORD)IOCTL_DISK_MOUNT_FILE,
         &MountData,
         sizeof(MOUNT_FILE_PARAMETERS),
         DeviceName,
         MAX_DEV_NAME_LENGTH,
         &BytesReturned,
         NULL ))
{
   printf("Error %d from DeviceIoControl().\n", GetLastError());
}
//
// Finally, if the user specified a drive letter, set up the symbolic link.
//
if (!DefineDosDevice(DDD_RAW_TARGET_PATH, DriveLetter,
   DeviceName))
{
   printf("Error %d attempting to create the drive letter\n",
      GetLastError());
}
return;
}
```

Symbolic device names are free form under W2K, and can contain any value provided they are unique and do not conflict with other registered device objects. In the representation of FIG. 15, \\Device\NetDisk XX handles are created for each detected logical drive. These handles are then mapped via the function call to DefineDOSDevice( ) and map logical drive letters to the device, making them accessible to W2K applications. If on the platform, there is a local hard disk, and two logical drives are available for detection, the local hard disk would be mapped to C:, the first logical drive \\Device\NetDisk00 would be mapped to D:, and the second logical drive \\Device\NetDisk01 would be mapped to E:.

RNS disks may use a special on-disk format that allows the disks to be divided into segments. This architecture also allows a portion of the disk to be reserved for hotfix redirection. Mirroring and RAID configuration information is stored in cylinder aligned stripe tables to enhance fault tolerant recovery, as exemplified in FIG. 16, discussed below. The actual partition format employed is the M2FS partition layout. M2FS supports a distributed mirroring and clustered file system support. M2FS is divided into two layers, a partition and a disk management layer, M2CS, and a distributed file system, M2FS. An RNS may use the M2CS partition management layers to provide logical management of RAID data segments within an RNS array.

M2CS partitions are divided into two sections, a local hotfix redirection table with a boot area, and mirroing and configuration tables, and a logical data area that can hold up to 8 segment configurations. Each disk device can host up to 4 M2CS partitions per drive.

Each disk device can support 4 partitions, 4 hotfix redirection tables, 4 logical data areas, and 8 logical segments per partition, for a total of 32 RAID segments per disk.

Hotfixing allows bad sectors to be transparently remapped into a reserved hotfix table without interrupting user access to a device. For most devices, reserving 0.2% of the available sectors for hotfixing of the total disk space is more than sufficient. Modern disk devices do not typically fail at once, but gradually start losing sectors as the device begins to fail, and media defects begin to develop.

"Spindle crashes" are not the only error cases a RAID must solve. Disk failures are typically preceded by the device slowly losing sectors over time until the device fails completely, a condition most RAID arrays do not handle very well. There are some rather complex issues to deal with during hotfix recovery for reads if mirroring or parity checking is enabled.

In the example of FIG. 16 of an M2CS partition, 4 copies of the hotfix/mirror tables 1602 are placed at offsets 0×20, 0×40, 0×60, and 0×80 at the head of the partition. They are laid out in this manner to ensure that at least two tables will be available in the event an entire spindle fails for a particular device. These tables define the size of the hotfix redirection table. Following the hotfix data area 1606 is the segment table for the partition 1608. As in the case of the hotfix/mirror tables, the segment definition tables are striped in four copies across 0×20, 0×40, 0×60, and 0×80 sector offsets within the partition, also to protect against a spindle failure within a device. The segment definition tables describe the sizes of data segments defined within the data portion of the M2CS partition. Following the segment tables 1608 is the data area 1610, which holds the logical segments of the partition.

Only the data areas of M2Cs partitions are mirrored, and RAID 1+0 configurations are required to configure any mirroring storage to be the same size across devices. It is possible to perform mirroring with this model across disks of different sizes. This is accomplished by adjusting the hotfix data area size between any primary and secondary mirrored devices to make them the same size.

Figure 17:
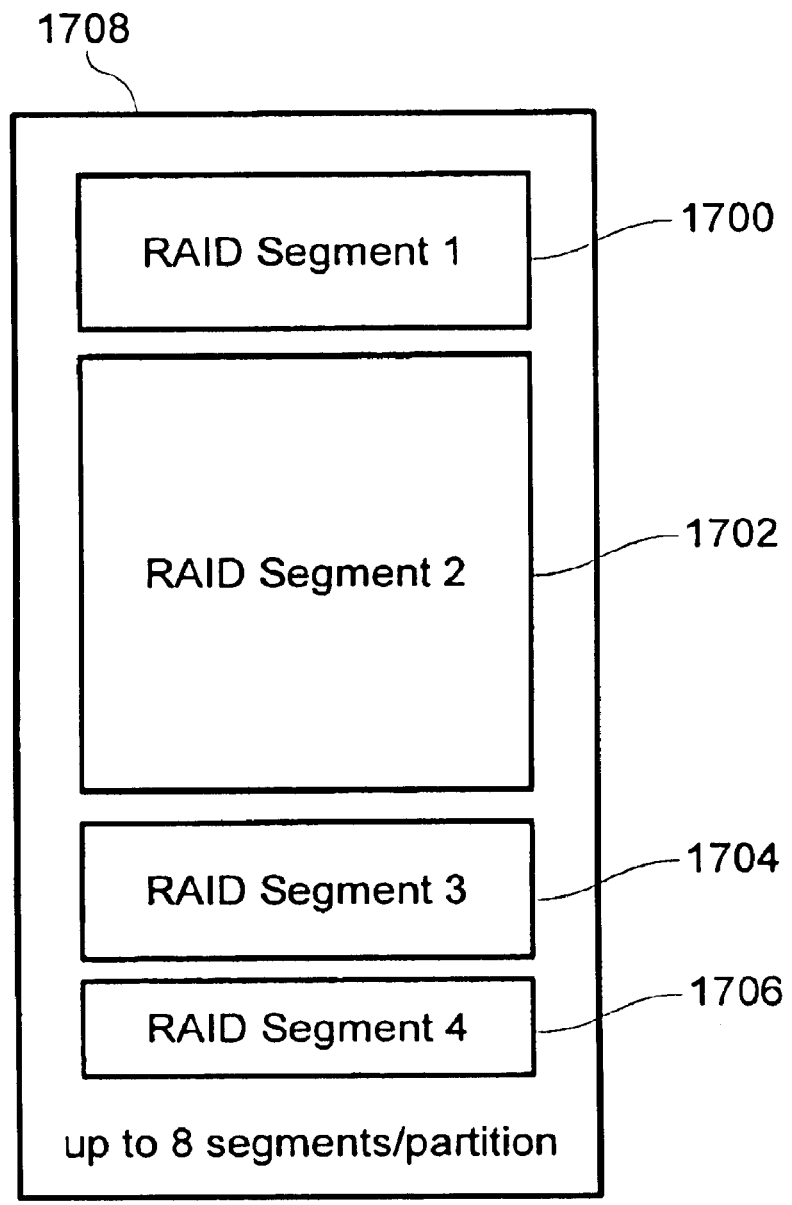
FIG. 17 depicts the configuration of RAID segments within an M2CS partition.

FIG. 17 illustrates the organization of a segment 1708 within a RAID partition. Segments defined within the data area of an M2CS partition, shown in FIG. 17 as 1700, 1702, 1704, and 1706 can be of variable sizes. It is even possible to create RAID stripes that include variable length segments provided that the parity segment is as large as the largest segment of the RAID array.

With variable length segmented RAID arrays, parity is calculated as 0 relative for any disk extents that span beyond the end of smaller member segments during parity checking.

Figure 18:
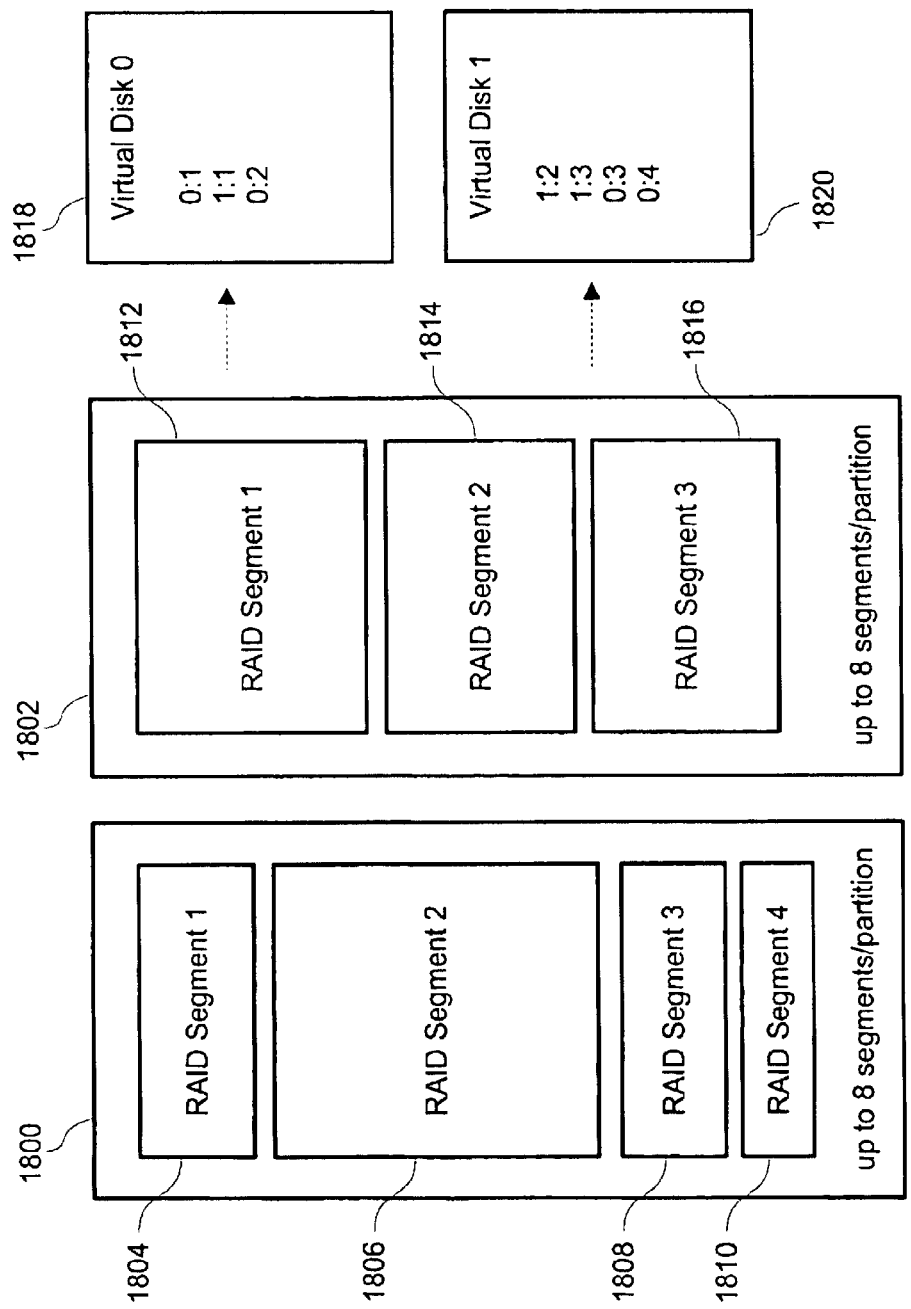
FIG. 18 depicts a logical combination of two M2CS partitions to form two virtual disks.

In one embodiment, RAID segments are logically combined into virtual disks by the RNS controller software, as pictorially exemplified in FIG. 18. Virtual disks are created by combining logical disk segments into a logical storage "object" that is exported to the SCI attached host adapter as a "virtual disk". The RAID array remaps this logical representation to its internal disk array. In FIG. 18, two physical disks 1800 and 1802 are provided whereby virtual disks are to be hosted. Disk 1800 has four logical segments 1804, 1806, 1808 and 1810. Disk 1802 has three logical segments 1812, 1814 and 1816. Virtual disk 0 is configured to combine the storage space of 1804, 1812, and 1806 in that order to form a storage space the size of the sum of the three. Likewise virtual disk 1 includes 1814, 1816, 1808, and 1810 in that order. The mapping information is stored in the segment definition table records contained in each partition. Each segment has a logical name of 1 to 15 characters, a read ahead block size, and a field describing the length of the segment.

A RAID segment record might be represented according to the following C language structure:

```
typedef struct _SEGMENT_TABLE_ENTRY
{
    BYTE SegmentName[16];
    ULONG LastSegment;
    ULONG SegmentTimestampSignature;
    ULONG SegmentRoot;
    ULONG SegmentSectors;
```

-continued

```
    ULONG VolumeClusters;
    ULONG SegmentClusterStart;
    ULONG SegmentFlags;
    ULONG SegmentStateTable[4];
} SEGMENT_TABLE_ENTRY;
```

Figure 19:
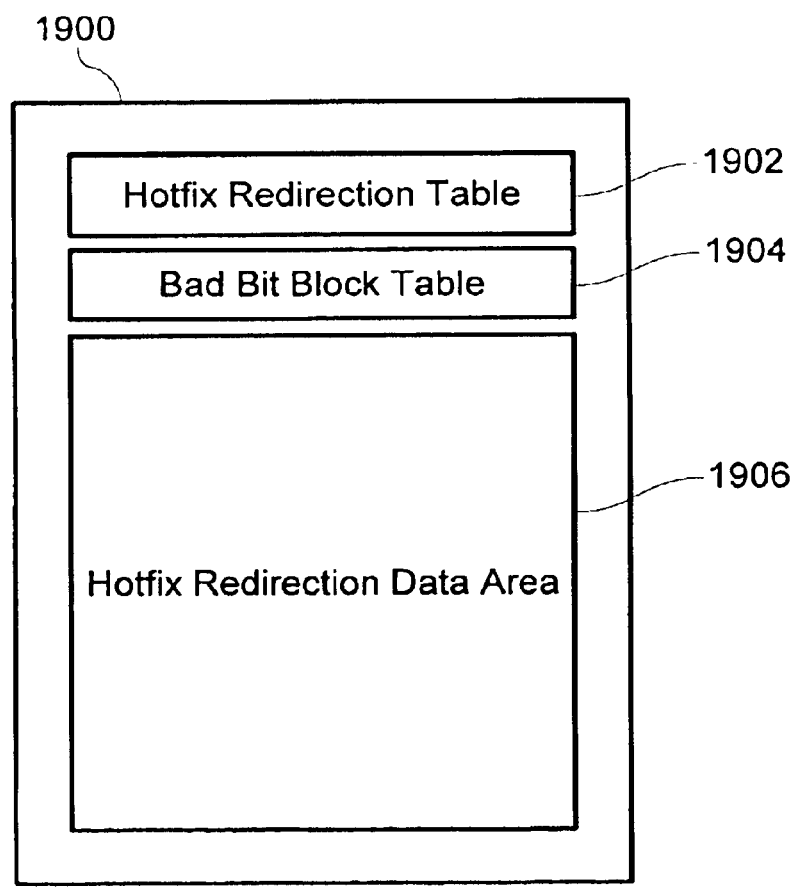
FIG. 19 depicts the hotfix table area of a segment or partition.

Pictorially illustrated in FIG. 19 is the hotfix table area 1900 of a partition divided in three tables: the hotfix redirection bitmap table 1902, the bad bit block table 1904, and the hotfix redirection data area 1906. In a preferred embodiment, the hotfix redirection table is a bitmap of 4K blocks comprising a logical representation of the data area of an M2CS partition. Redirected blocks are tagged in the hotfix redirection table and lookups to the data area of an M2CS partition check this bitmap to determine if the block has been hotfixed into the hotfix sector table. The bad bit block table is used solely for read hotfixing. The use of this table is explained below. Hotfixing of this embodiment always views the disk as a collection of 4K (8 sector) blocks and maps storage accordingly at this layer.

The hotfix redirection data area is a large table of free sectors that is used to redirect read and write data to known good sectors. The hotfixing subsystem is self-healing and self-describing. This means that if the hotfix table is attempting to write to itself, and gets a read or write error, it has the capability of hotfixing the hotfix table, and creating self-describing entries that allow it to re-map its own sectors in the hotfix data area.

This recovery method on a disk device that is manifesting numerous failures would continue to attempt to re-map itself until the device finally hard fails or the hotfix table exhausts all available redirection space. To avoid this problem of infinitely hotfixing a severely malfunctioning drive, the software may assume the drive is no longer working properly after a fixed number, such as 5, of operations of the hotfixing layer to self-heal the hotfix table. The software may then deactivate/off-line the device and signal a device failure. Most disk failures will be signalled by the RNS from the hotfixing subsystem, since this layer is the one likely to deactivate a failing device that is slowly losing sectors as the surface media deteriorates over time.

Write hotfixing is typically an easy case to handle, since the pending write generating an I/O error will have the associated data block available for retry operations already present in memory. This is not the case with read hotfixing that must handle redirection of read errors to an array of disks, and may not have the missing data where it can be retrieved.

Figure 20:
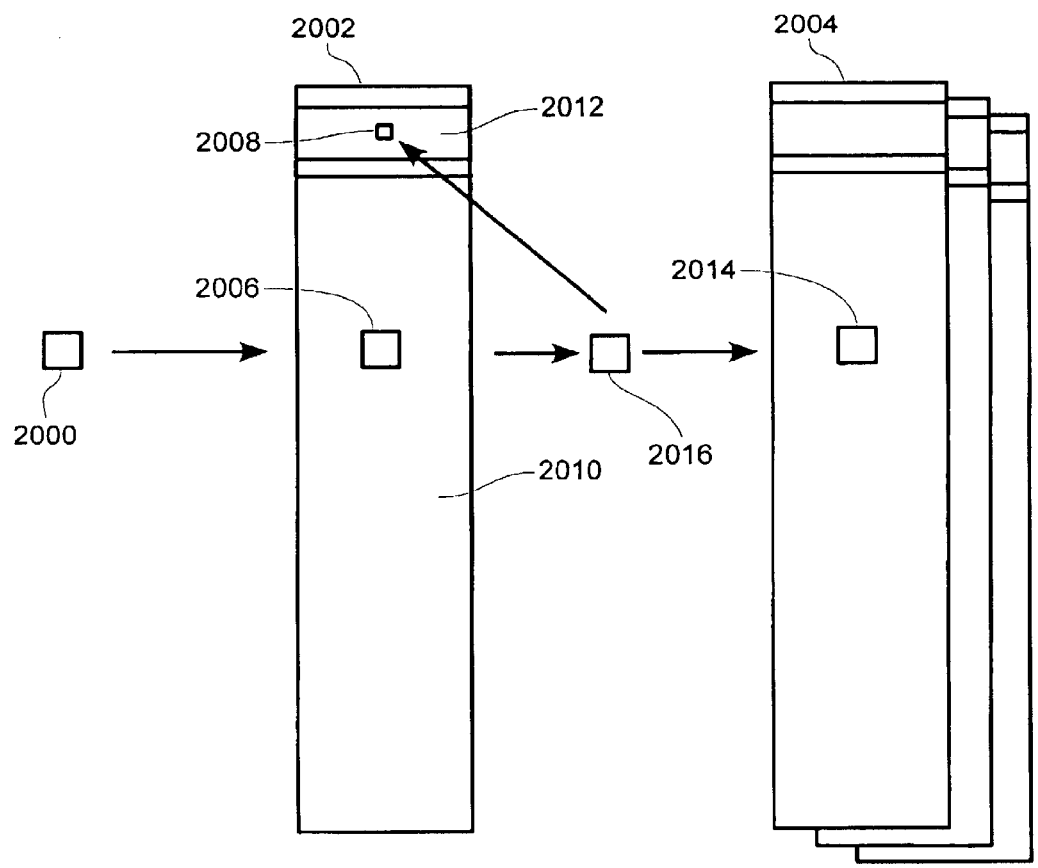
FIG. 20 depicts a hotfix recovery method using a RAID 1+0 system.

The first hotfix recovery scenario, as illustrated in FIG. 20, assumes a RAID 1+0 configuration of simple mirroring of segments, the first disk 2002 being mirrored by disks 2004. A read or write request 2000 is submitted to a block 2006 in the logical block area 2010. If a write I/O error occurs, the control software will retry the write operation several times, and if it continues to fail, then the write is remapped into the hotfix data area 2012. A bit 2008 is set in the hotfix redirection table indicating that the 4K block has been remapped, and the operation returns success.

If a read error occurs, the scenario is different. This is because the data is not available in a buffer, as is the case with a write I/O error. When a read I/O error occurs, the control software will first attempt to re-read the data block several times, then retry the read operation with variable sector interleaving in an attempt to recover the data. If the data cannot then be recovered, the control software will check if any mirrors are available and IN_SYNC. If a mirror is located, the data is read from the mirror if the RNS array is configured as RAID 1+0.

Figure 21:
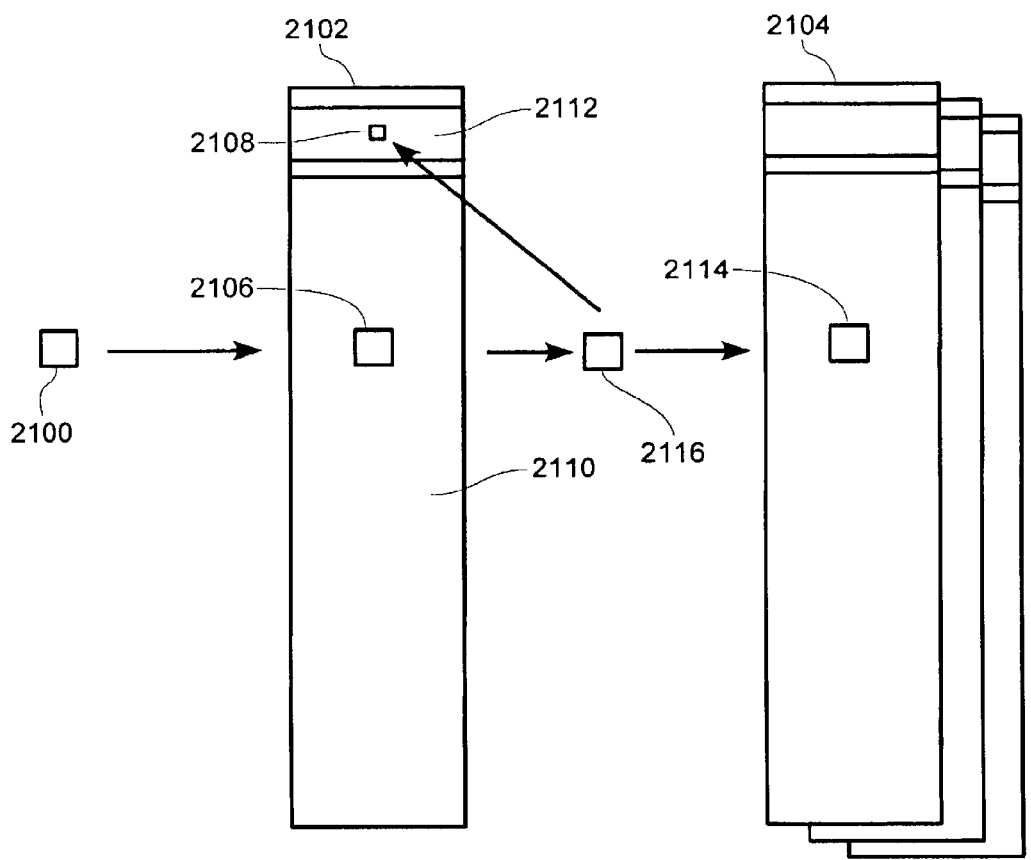
FIG. 21 depicts a hotfix recovery method using a RAID 5 system.

If the RAID array is configured to support RAID 5, at this point in the read I/O error example, the control software will regenerate the missing block from the parity check disks and remaining array members, and write the new data into the hotfix redirection table, as pictorially illustrated in FIG. 21. In both cases, if the data can be recovered from either a RAID 1+0 mirror or through RAID 5 parity check data block regeneration, or other RAID recovery means, the data will be written into a free block in the hotfix data area and a bit entry created in the hotfix redirection table.

If the data could not be located on an IN-SYNC mirror, could not be re-read via sector interleaving, or could not be regenerated from the parity check disk, bit entries are made into the bad bit table indicating which individual sectors within the 4K block could not be recovered. If any mirrors are present in the array, this is the only case where an artificial hotfix will be applied to all mirror members in an array. This is an extremely rare case, and would only occur in pure RAID 0 configurations without RAID 1, RAID 4, or RAID 5 recovery, and with newly added mirrors that may be out of sync.

Subsequent reads into areas defined in the bad bit block table will generate hard I/O errors back to the user, indicating that data may have been lost. Even though the data has been remapped to good sectors on the device, this error is returned so a user will know the affected file or files have a problem. The bad bit block table is cleared the first time a user writes to any areas defined by these bits. Once the first write occurs to the affected block, the system stops reporting the hard I/O error.

In FIG. 21, a RAID 5 system includes a first disk 2102 and additional disks 2104. A read or write request 2100 is submitted to a block 2106 in the logical block area 2110. If a write I/O error occurs, the control software will retry the operation several times, and if it continues to fail, then the write is remapped into the hotfix data area 2112. A bit 2108 is set in the hotfix redirection table indicating that the block has been remapped, and the operation returns success. If request 2100 is a read request, missing data at 2106 is regenerated through a reverse parity calculation from data 2114 on disks 2104.

Figure 22:
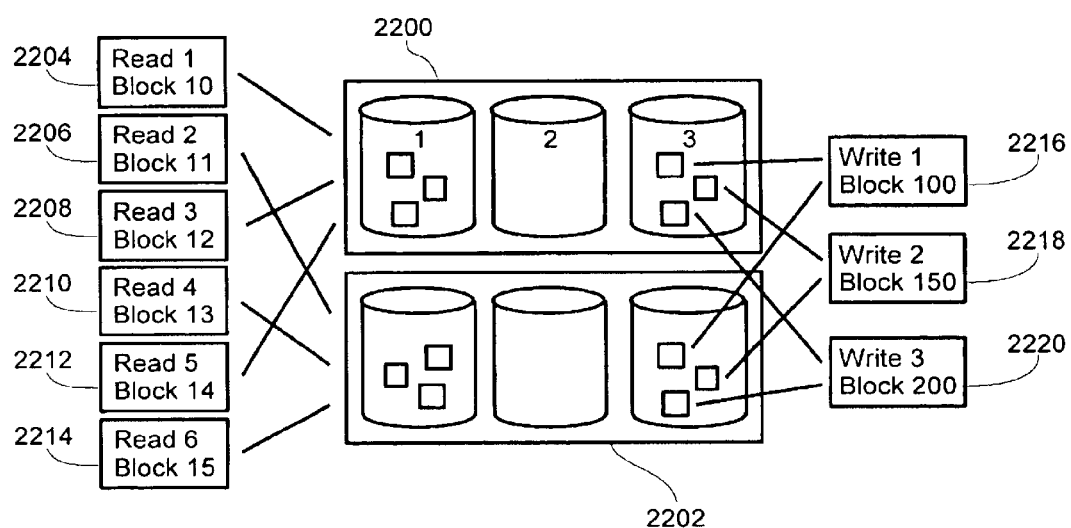
FIG. 22 depicts a method of distributing read operations to a mirrored RAID array.

In another embodiment, RNS arrays using RAID 1 mirroring perform round robin reads across mirrors to load balance and improve overall disk performance. The example of FIG. 22 illustrates a method that may be used by an RNS to provide load balancing with RAID 1 mirroring. Two RAID 0 arrays 2200 and 2202 are connected in RAID 1 fashion to provide a RAID 1+0 array. A sequential read is requested of blocks 10–15. First block read 2204 reads block 10 from array 2200. The second block read 2206 reads block 11 from array 2202. The third block read 2208 reads block 12 from array 2200. The fourth block read 2210 reads block 13 from array 2202. Fifth block read 2212 reads block 14 from array 2200. Sixth block read 2214 finally reads block 15 from array 2202, the entire operation having alternating reads between arrays 2200 and 2202 to improve throughput. A write operation is requested of blocks 100, 150, and 200. For each block write 2216, 2218 and 2220, each block write must be submitted to both arrays to keep them in synchronization.

RAID 5 arrays can also be mirrored, and the use of this method with dual RAID 5 parity arrays can increase system performance significantly. Load balancing assumes a logically configured read-ahead block size, since performance is not improved if interleaving reads across mirrors of contiguous sector runs is allowed. It is typically better to use large block sizes for load balancing across mirrors. This is described more fully below.

Re-mirroring is an infrequent event and occurs when a new device or array of devices is added to an existing array, or when a device is being re-mirrored due to a previous failure of a disk device. Mirroring relies on asynchronous I/O behavior in the disk I/O subsystem, and in one embodiment mirrored writes are issued in parallel across an array of disks. Those mirrors are organized in to "mirror groups" which are collections of mirrored storage. Those mirrors can assume differing states, depending on the current state of a given mirror member.

By default, the control software keeps a status map of all mirror members in a mirror group. If a device is being re-mirrored or is out of sync, requests for valid read mirrors will return a list of IN_SYNC members of a mirror group available for round robin reads. Therefore, reading from a RAID 1 mirror array with an out of sync member will result in load balancing reads skipping the NO_SYNC members. Write requests may generate writes to all members of a mirror group and return a list of all present mirror group members. It may be assumed that if a device is being re-mirrored, allowing pass-through writes to the device is legal since re-mirroring will eventually coalesce all disk changes as complete when the mirror status bits are updated.

Figure 23:
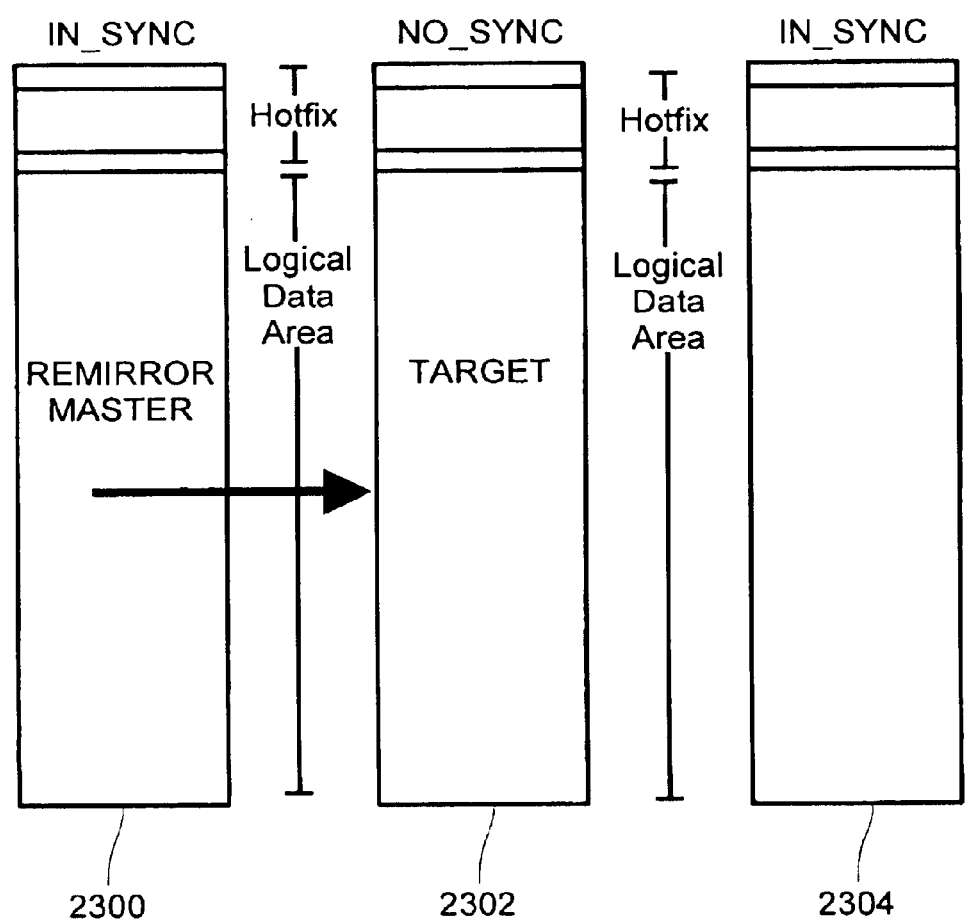
FIG. 23 depicts a method of re-mirroring a RAID 1 array for inclusion.

For a preferred embodiment illustrated in FIG. 23, during re-mirroring one IN_SYNC partition 2300 is selected from the group of IN_SYNC partitions of 2300 and 2304 and used as the master to re-mirror any NO_SYNC partitions 2302. Re-mirroring can be I/O intensive. When the partition 2302 has been remirrored then its state is updated to IN_SYNC. Newly added disks to a RAID 1 array are normally automatically re-mirrored. Only the Logical Data Area of a partition needs to be mirrored. The hotfix redirection tables are local to each disk, since they hold local redirected bad sectors for each drive.

| #define | MIRROR_NEW_BIT | 0x00000001 |
|---|---|---|
| #define | MIRROR_PRESENT_BIT | 0x00000002 |
| #define | MIRROR_INSYNCH_BIT | 0x00000004 |
| #define | MIRROR_DELETED_BIT | 0x00000008 |
| #define | MIRROR_REMIRRORING_BIT | 0x00000010 |
| #define | MIRROR_READ_ONLY_BIT | 0x00000020 |
| #define | MIRROR_GROUP_ESTABLISHED_BIT | 0x00010000 |
| #define | MIRROR_GROUP_ACTIVE_BIT | 0x00020000 |
| #define | MIRROR_GROUP_OPEN_BIT | 0x00040000 |
| #define | MIRROR_GROUP_MODIFY_CHECK_BIT | 0x00080000 |
| #define | MIRROR_GROUP_REMIRRORING_BIT | 0x00100000 |
| #define | MIRROR_GROUP_CHECK_BIT | 0x00200000 |
| #define | MIRROR_GROUP_READ_ONLY_BIT | 0x00400000 |

To avoid elevator starvation during re-mirroring, re-mirroring may be performed backwards from blocks N to 0 with each pass moving up the device in 64K windows. Re-mirroring from blocks 0 to N has been demonstrated to create cases of starvation when an elevator is employed between the LRU and disk layers of most commercial operating systems.

A description of a system and methods that may be used to create and operate an infinite "write once" HSM journalling system that may be used with an RNS. The basic premise is simple and straightforward. A virtual disk is viewed as a collection of blocks that accumulates updates over time, gradually replacing older sectors on the device. As these sectors are changed, the previous sector contents in a device are overwritten.

Figure 24:
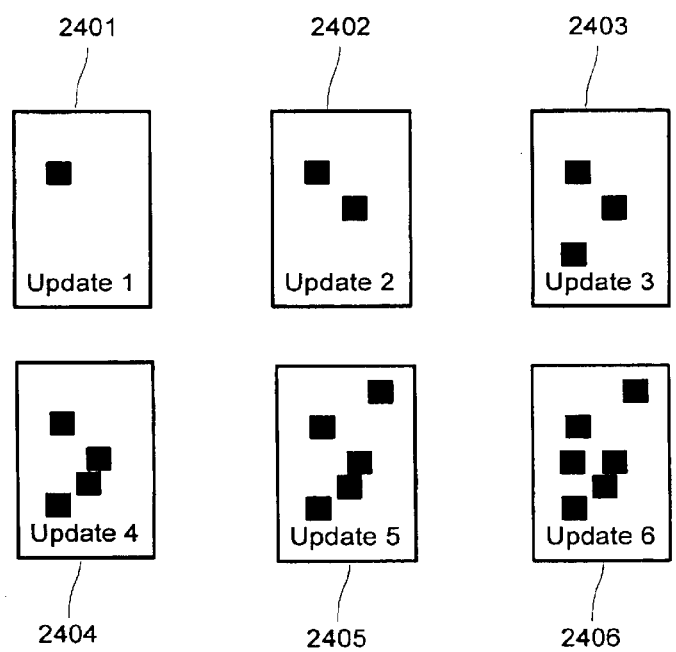
FIG. 24 depicts snapshots of a journalled disk.

FIG. 24 illustrates this process. Snapshots 2401, 2402, 2403, 2404, 2405, and 2406 of a virtual disk window are shown at successive times. Each successive snapshot shows the previously changed sectors and one additionally changed sector.

For purposes of illustration, the analogy of a seismograph is a close parallel to the concept of infinite storage journalling. A seismograph is a device with a paper roll that runs across a drum, and records vibrations in the Earth's surface by allowing a swinging stylus to write detected vibrations as a line that traverses back and forth across the page, depending on the magnitude of the vibrations being measured. The seismograph paper roll is viewed as infinite—it is recording observations of the earth's seismic activity over a domain of time.

The roll of paper could be endless, and were it long enough, could record changes for the next several million years (that is if we have enough paper, and the geologist monitoring the device has instructed his descendents to always keep it stocked with paper).

The same concept may be employed to create infinite storage addressing. Previous sectors are written into disk cache segments, and stored in chains in a "write once" fashion using one of two methods, "time domain" or "snapshot" segment journalling, and "real time" segment journalling.

Figure 25:
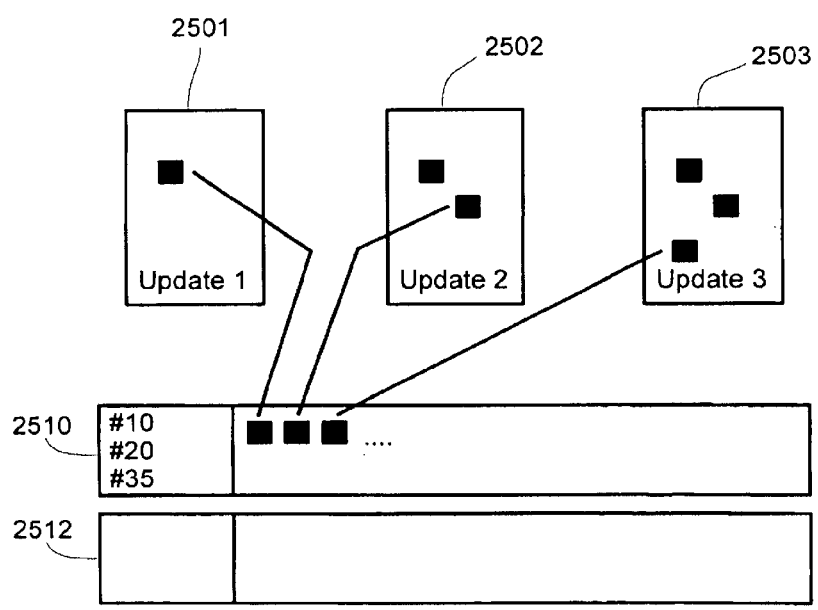
FIG. 25 depicts a method of recording disk snapshots to a journal of journal segments.

FIG. 25 illustrates a method of infinite journalling. Changed sectors are written into special disk segments on reserved "rubber disks". The concept of a rubber disk is not new, and has been employed in various storage architectures to overcome congruence problems with data overflow related to real time storage compression.

The segment journal disks are viewed by the control software not as traditional disks, but as a specialized form of cache. With this architecture, memory is viewed as "volatile cache memory" and rubber disks are viewed as "non-volatile cache memory". Rubber disks may be logically divided in 16 MB storage segments and allocated and managed as an on-disk LRU cache of segments. This architecture makes it very simple to manage delta changes of altered sectors in time domains, and to age out stale segments and push them out to tape.

In FIG. 25, segment journals 2510, 2512, etc. are provided for recording the changes of a virtual disk window, three incremental snapshots being shown in 2501, 2502, and 2503. As disk updates occur, the previous sector contents are copied into an allocated and time stamped disk cache segment 2510, 2512, etc. Each disk cache segment has a linear table of sector addresses and a device number field to identify its parent segment. Disk segment caches can store multiple instances of the same sector number for real time journalling. The segment sector table may be enabled to grow in a linear fashion over time, with newer sector updates always appearing lower in the table. As segment journals fill new records are written to the succeeding segment journals.

A disk segment is "opened" when journalling commences on an active array of devices. It is generally closed when the system performs a shutdown, or when a snapshot time domain window is reached. For most applications, snapshot journalling will be much faster and more efficient, since segments are closed within a given time domain, and much less segment cache space is required to hold delta changes to the devices.

When the entire rubber disk fills with disk cache segments that have been closed, older cache segments can then be pushed out onto tape via a tape catalog, providing an automated, journaling backup capability that may be used by an RNS. In a preferred embodiment of the invention HSM journaling behavior is configurable, and if no tapes are present or available, then the system can be configured to only retain disk cache segments on disk, allowing the oldest segments to be reallocated and rewritten.

Figure 26:
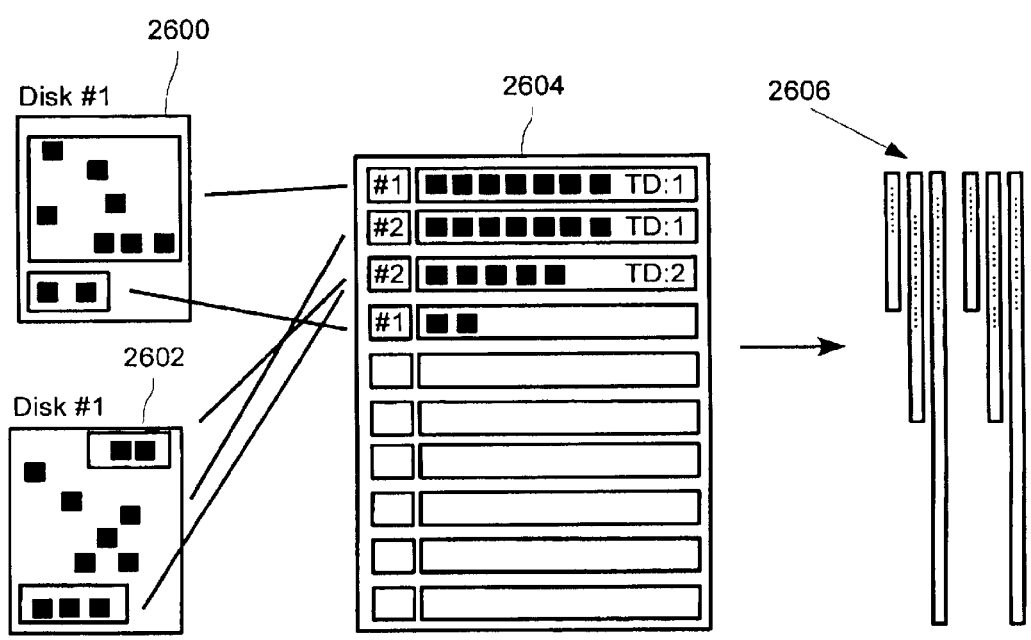
FIG. 26 depicts real time infinite segment journaling on a dual-disk system.

FIG. 26 illustrates by example a real time infinite segment journalling system on a dual-disk system. A disk array includes disks 2600 and 2602. A real time infinite HSM segment journal 2604 receives cache change records. Real time updates allow changed sectors to fill an allocated segment. Time domain boundaries occur when a segment fills. Disk segment journals are managed as a disk LRU cache by time domain date stamp. Oldest segments are pushed out onto tape archive 2606 when the disk cache fills. Journal segment caches on disk are allocated and managed like LRU cache memory.

This method allows data mining and device reconstruction of delta changes at any point in time for a given device. HSM software has the ability to peruse tape and disk cache segment archives and dynamically reconstruct array storage real time or at snapshot intervals.

Figure 27:
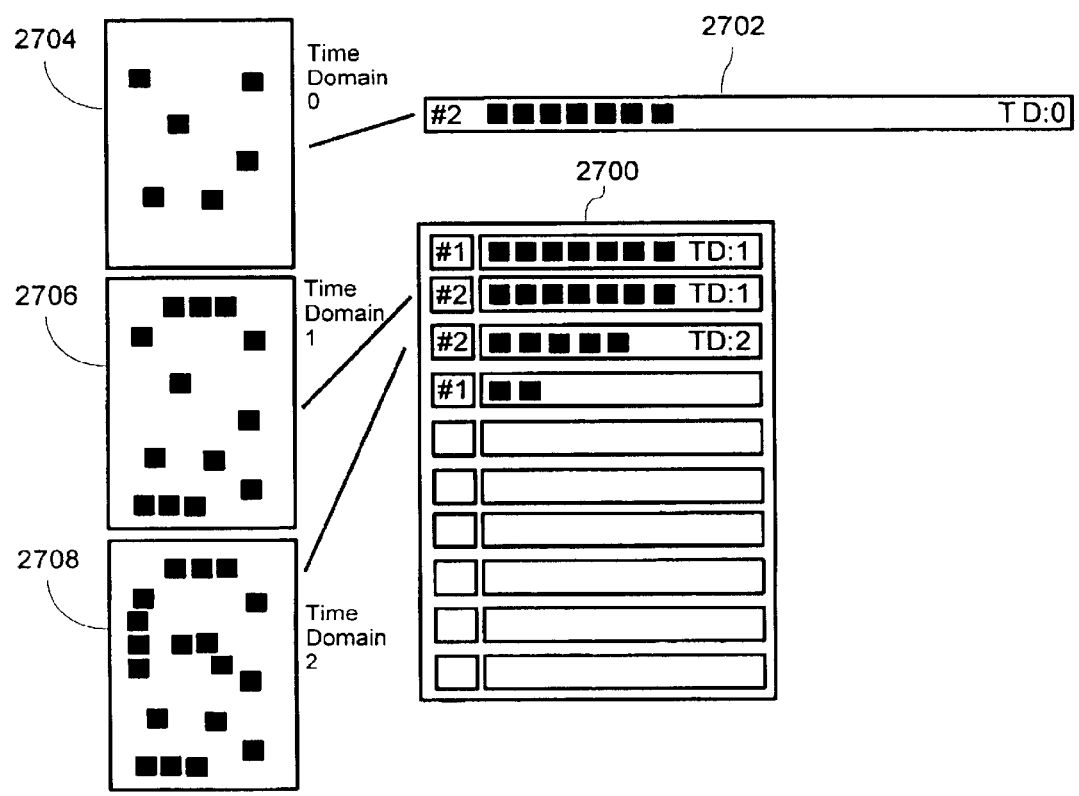
FIG. 27 depicts disaster recovery using an infinite HSM segmented journal.

This journaling method also allows disaster recovery operations for a failed array, as illustrated in FIG. 27. An infinite HSM segment journal 2700 has received records from a disk shown in three consecutive snapshots 2704, 2706, and 2708. Journal segments are considered from the journal 2700 and from tape 2702, potentially going back to the time of the journal initialization. Records in newer segments, such as segments in the journal 2700, take precedence over older ones, such as segments recorded to tape 2702, thus reconstructing the drive to its most recent state.

Figure 28:
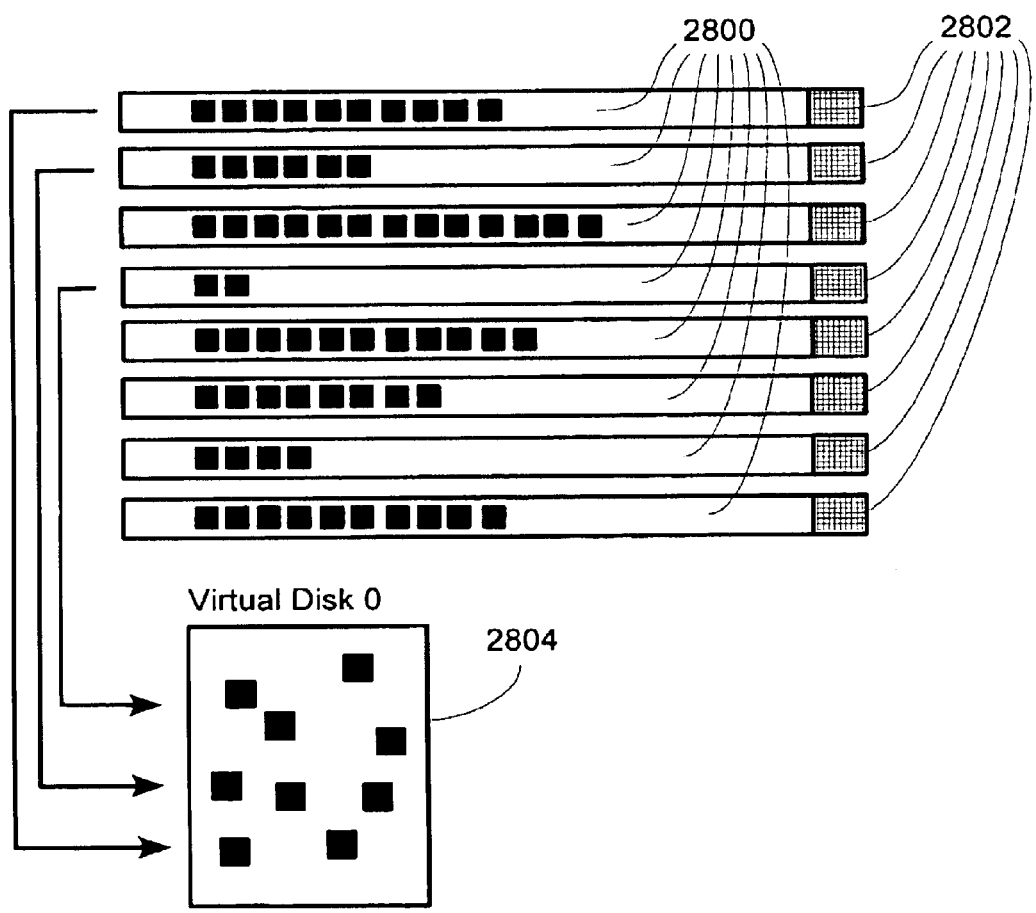
FIG. 28 depicts the use of a checkpoint bitmap to determine the finality of a disaster recovery using an infinite HSM segmented journal.

Drives can be entirely reconstructed to any given checkpoint time boundary from tape archives or disk cache segments of annotated storage records. As shown in FIG. 28, disk and tape cache segment records 2800 may contain a checkpoint bitmap 2802 that may be used to update a current bitmap 2804 to determine whether the current checkpoint boundary has assembled a complete delta of all changed sectors. Virtual disks can be dynamically reconstructed for disaster recovery if either the checkpoint bitmap covers a full device map of sectors or a breakaway mirror is available and IN_SYNC that can be used for any missing sectors in the HSM archive.

HSM management software may allow creation of baseline cache segment records for all active data on a device. This ensures that a complete map of sectors will present in the archive in the event an entire array and all mirrors of data is ever lost, and only HSM segment tapes are available to reconstruct an array of devices. A breakaway mirror group is typically all that is required to perform data mining and array reconstruction from an infinite HSM segment archive.

The term "write once" implies that for every delta change of a disk device, previous sectors are only written once into the segment journal, without the need for locks or synchronization between devices. Most journaling methods perform extensive serialization through a common journal log for both reads and writes. Log-based journaling methods limit parallelism because both read and write transactions must be serialized through a journal log file. Most journaling models, such as those implemented by Oracle with rollback segments, actually re-map writes directly into the journal log in order to ensure data coherency between upper level processes that may be sharing data blocks.

NTFS on W2K journaling gets around the performance problems associated with a journal log file by transacting writes against the MFT (master file table) in real time, and use a "write once" architecture to update the NTFS journal log file in the background, dramatically increasing file system performance. The journal is only accessed when an NTFS volume is mounted and needs to perform restart rollback. However, NTFS only journals volume meta-data, and does not journal any file system writes to file data, unlike the model of the invention described above, which can journal all delta changes to a device.

In one embodiment, real time segment journalling records each and every previous sector into an allocated disk cache segment made over time to a particular device. When an allocated disk cache segment is full, it is closed and dated, and a new disk cache segment is allocated and filled.

The disadvantage to using real time segment journaling relates to available disk cache segment storage capacity. A heavily written disk device would generate a large amount of real time data and use a large amount of disk space on the rubber disks. However, provided enough disk space is available, real time journaling does allows sector-by-sector drive reconstruction of a particular device, and since it employs a write once architecture, performance impacts are minimal in comparison to traditional log structured file system models that provide journaling capability.

Infinite HSM snapshot journaling allows updates within a time specific domain. In this model, preferred time domains might be configured from a few seconds to once per day. Segment journaling within a time domain allows previous updates of changed disk sectors to be overwritten in a disk cache segment within a given window of time. In essence, this mode, allows "snapshots" of update deltas to be journalled at regular intervals rather than journaling every sector update that occurs on a particular device.

In that model, when a time domain boundary is reached, the current segment journal is closed and a new segment journal is allocated for the disk. Snapshot journaling will use significantly less disk cache space than real time segment journaling, and is more practical as a backup and restart solution. An RNS may support either or both models. As previously mentioned, disk caches can also be configured to drop the oldest segments and not push them out onto tape if an administrator does not desire to maintain an HSM tape archive.

Figure 29A:
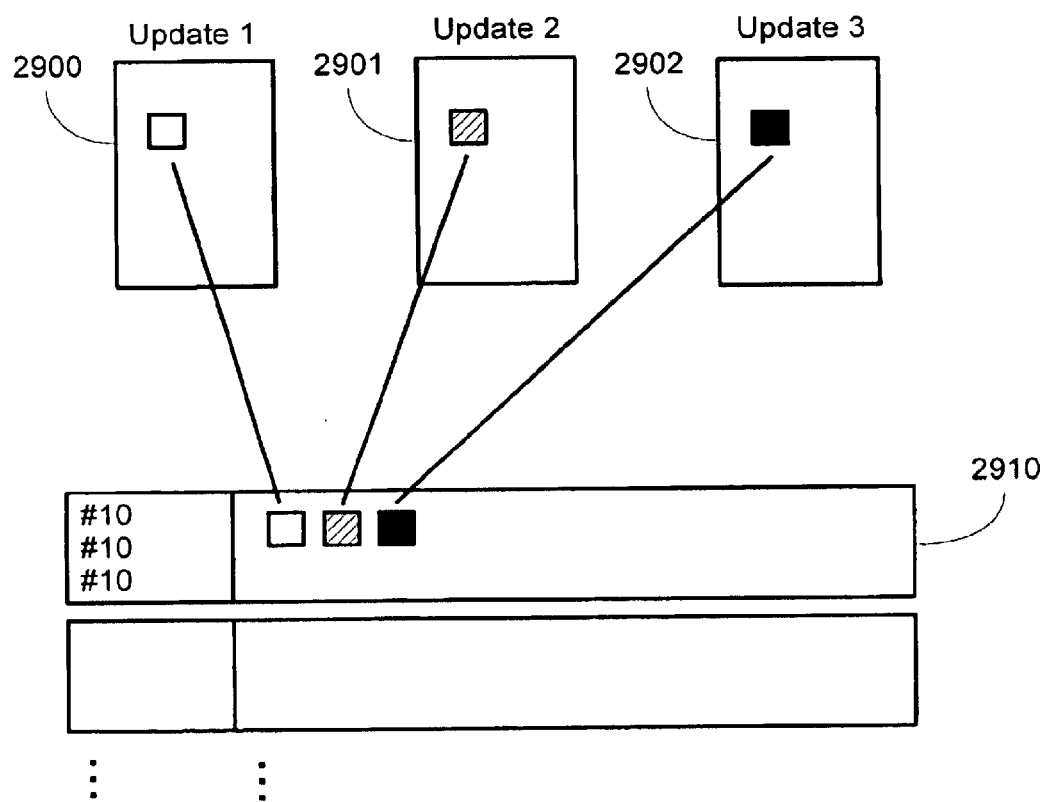
FIG. 29A illustrates a real time journaling method.
Figure 29B:
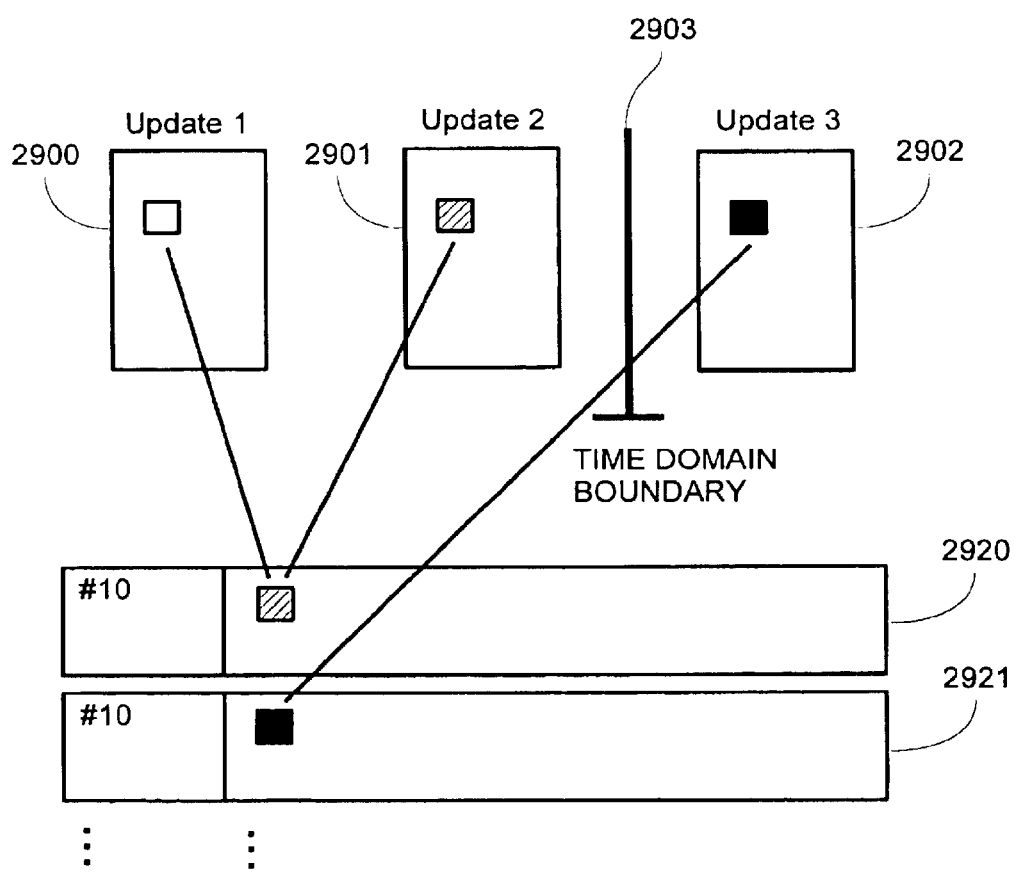
FIG. 29B illustrates a snapshot journaling method.

FIGS. 29A and 29B illustrate the difference between real time journalling and snapshot journalling in an infinite HSM journal. Three changes are made to the same block on a virtual disk 2900, 2901 and 2902. In FIG. 29A real time journalling is used. As each change occurs a new record is written to journal segment 2910, thereby illustrating that all incremental changes to the virtual disk are written to the journal segments. In FIG. 29B snapshot journalling is used, with a time domain boundary 2903 occurring between snapshots 2901 and 2902. The first journal segment 2920 recorded events before the time domain boundary 2903, but new records overwrite older records of the same block. Thus the earlier change of 2900 does not appear in 2920, but the last change of 2901 does. After the segment journal 2920 is closed at time domain boundary 2903, new change records are written to the successive segment journal 2921, where the change of 2902 after time boundary 2903 appears.

Both real time and snapshot journaling could be configured to run across RNS arrays over an SCI fabric. These journaling models are not limited to the constraints of the storage contained in the local RNS array. It is possible to configure an entire separate cabinet of RNS devices (or an array of cabinets) to act as a distributed segment disk cache accessible by other RNS arrays attached to the SCI fabric.

When disk caches fill and need to push older segments onto tape, disk cache segment writes can be redirected to a central array of RNS disk cache storage, and managed from a single location, rather than pushing each segment onto local tapes. Snapshot disk cache updates can be configured to transfer segment caches to a central repository at specified times, rather than real time, providing an automated method to perform system wide backup of disk arrays.

Figure 30:
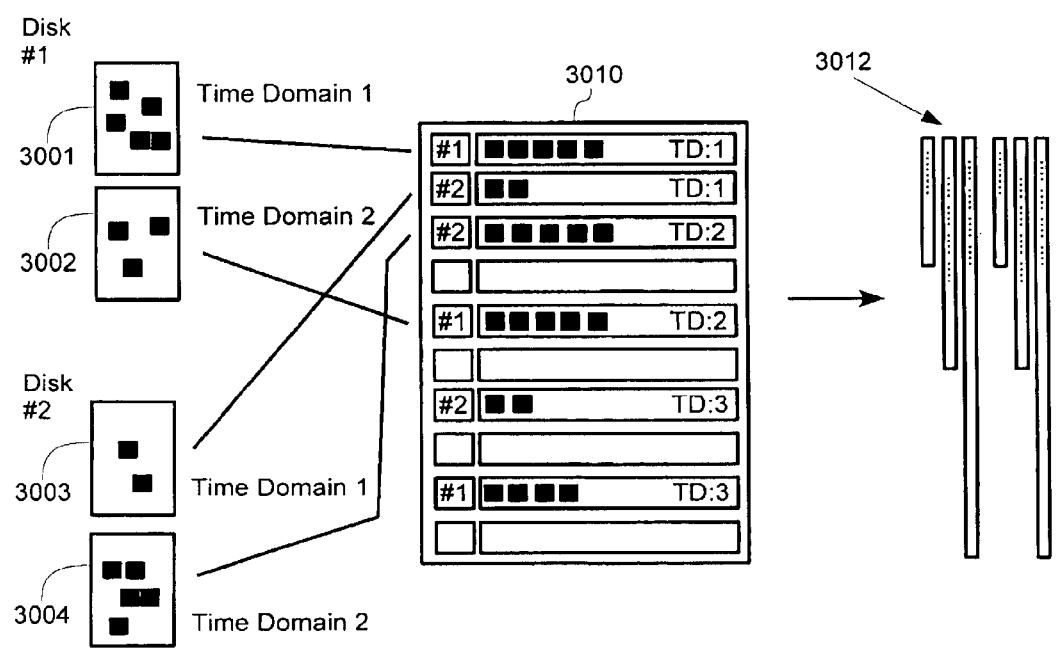
FIG. 30 depicts the operation of a real time infinite segment journaling system having two virtual RAID disks.

FIG. 30 illustrates by example a real time infinite segment journaling system on a two virtual-disk RAID system. A disk array includes two disks, the first disk shown in two time domains 3001 and 3002, the second disk shown in the same two time domains 3003 and 3004. A real time infinite HSM segment journal 3010 receives cache change records. Real time updates allow changed sectors to fill an allocated segment. Oldest segments are pushed out onto tape archive 3012 when the disk cache fills.

Figure 31:
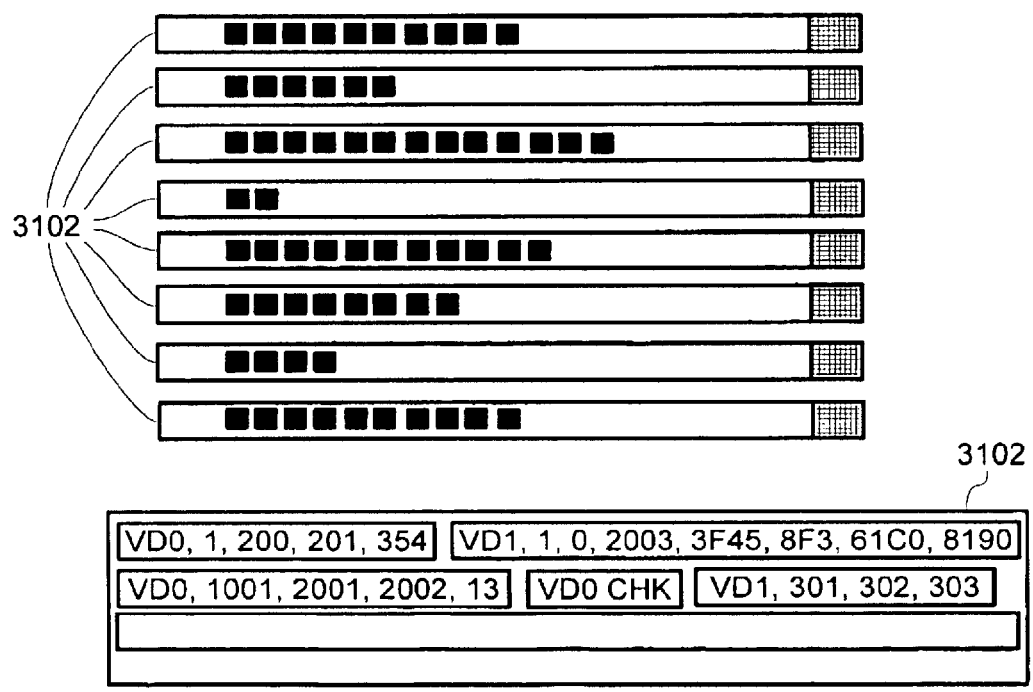
FIG. 31 depicts a tape master catalog with respect to tape segments.

In one embodiment illustrated in FIG. 31, tape segments 3100 are managed via a master catalog 3102 that maintains an index of tape locations for device segments based on time. Older segments are towards the beginning of a set of tapes, with newly written segments being closer to the end. In a related embodiment tape devices can be configured to perform mirror updates on up to 4 tape decks in tandem, producing local and off-site tape sets during a single backup session.

HSM segment journaling can be used for disaster recovery in the event an entire array is lost and only the HSM tapes remain. In order to accomplish this one of two conditions must be satisfied. Either a breakaway mirror for the device is available for any sectors not present in the HSM archive or the checkpoint bitmap contains a complete tally of sectors for the virtual disk being rebuilt. In a preferred embodiment, the HSM will maintain a tape catalog on one of the HSM segment disk caches. If this drive is not available, the HSM will attempt to rebuild the catalog from tape, which could take longer to complete.

In another embodiment of the invention, tape segments use the same format as disk cache segments with one exception. Tape segments also employ a special check pointing record that indicates where in a set of segments a full drive reconstruction can begin. Checkpoints can be configured by the administrator, then will occur automatically when the checkpoint bitmaps for a set of segments indicate a full device "window" of sectors has been reached. The tape catalog contains a listing of all storage segments stored on a set of tapes. Tapes are labeled by a timestamp in the tape header when the first segment is written.

In a preferred embodiment, when an array of drives is first configured by an administrator, an initial checkpoint record is created indicating that the device is "blank". All changes that occur on the virtual disk from that point forward constitute a complete segment set that can be used to dynamically recreate a virtual disk device should the entire device fails. If a segment cache is lost, or a portion of a segment cache is lost, HSM software can mine tape and disk caches and reconstruct a logical checkpoint value to the last known mirror based on date stamp. Mirrored devices are date stamped on every update, and are synchronized to disk segment journal updates. Segment journals may read this date stamp from the host mirror or raid segment being updated and use it as the time domain stamp for closing a segment on the last write operation prior to releasing an allocated disk cache segment.

Figure 32:
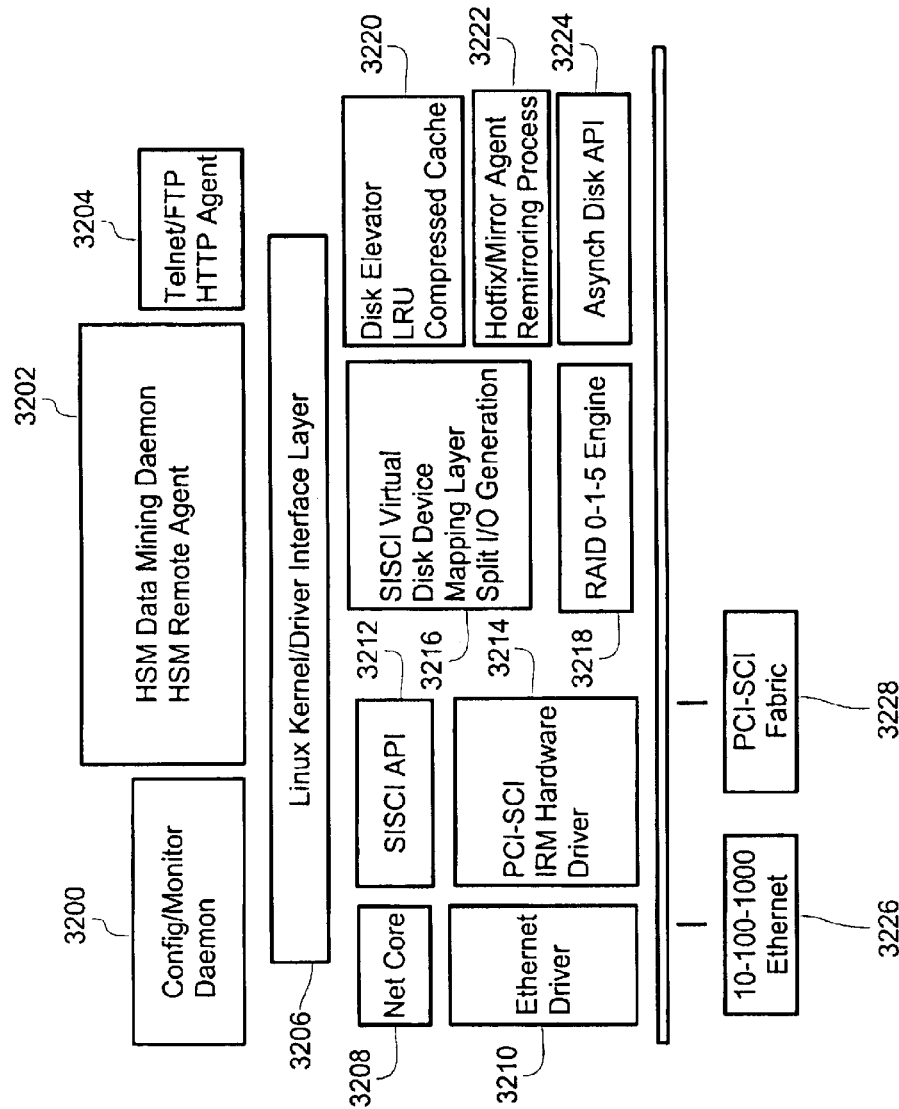
FIG. 32 depicts an RNS system that includes the Linux operating system.

In one embodiment, the RNS control software is a modified Linux kernel that incorporates a specialized mirrored and compressed LRU cache architecture, full SMP asynchronous disk subsystem, write/read combining elevator, re-mirroring subsystem, and a virtual segment mapping layer that provides hotfixing and mirroring support in-kernel. The standard Linux kernel uses a single threaded (non-SMP) buffer cache, and supports software RAID only. FIG. 32 illustrates the software components of that embodiment. An Ethernet interface 3226 and an SCI interface 3228 are provided for communication with other RNS devices and devices that access virtual disks. A number of components are included in the Linux kernel, such as net core 3208, Ethernet driver 3210, an SISCI API 3212 to provide interaction between processes and the SCI drivers and hardware, a PCI-SCI IRM hardware driver 3214 for operation of a PCI-SCI adapter card, a SISCI virtual disk device mapping layer providing split I/O generation 3216, a RAID engine 3218 supporting at least RAID levels 0, 1 and 5, a disk elevator and LRU compressed cache module 3220, a hotfix and mirroring agent with remirroring processing 3222, and an asynchronous disk API 3224. An interface layer 3206 is provided in the kernel for applications and daemons running on the RNS device. Daemons and processes running on the device are a configuration and monitoring daemon 3200, an HSM data mining daemon with an HSM remote agent 3202, and telnet, FTP, and HTTP agents 3204.

The SISCI virtual device mapping module creates virtual disk objects and exports them to SCI attached hosts devices. The mirroring, hotfixing, and segment journaling is implemented in the mirroring subsystem modules (M2CS and NWVP). The configuration monitor daemon provides TCP service ports that can be used to configure an RNS array over Ethernet via telnet or the RNS configuration utility. The HSM data mining daemon creates "ghost mirrors" in user space of virtual disks for dynamic device reconstruction and also performs array reconstruction from disk segment cache and tape archives for disaster recovery. This daemon provides HSM specific TCP service ports that allow data mining operations to be performed remotely from either an SCI interconnect or an Ethernet network. The HSM daemon is the server side component of the HSM management and configuration console.

Figure 33:
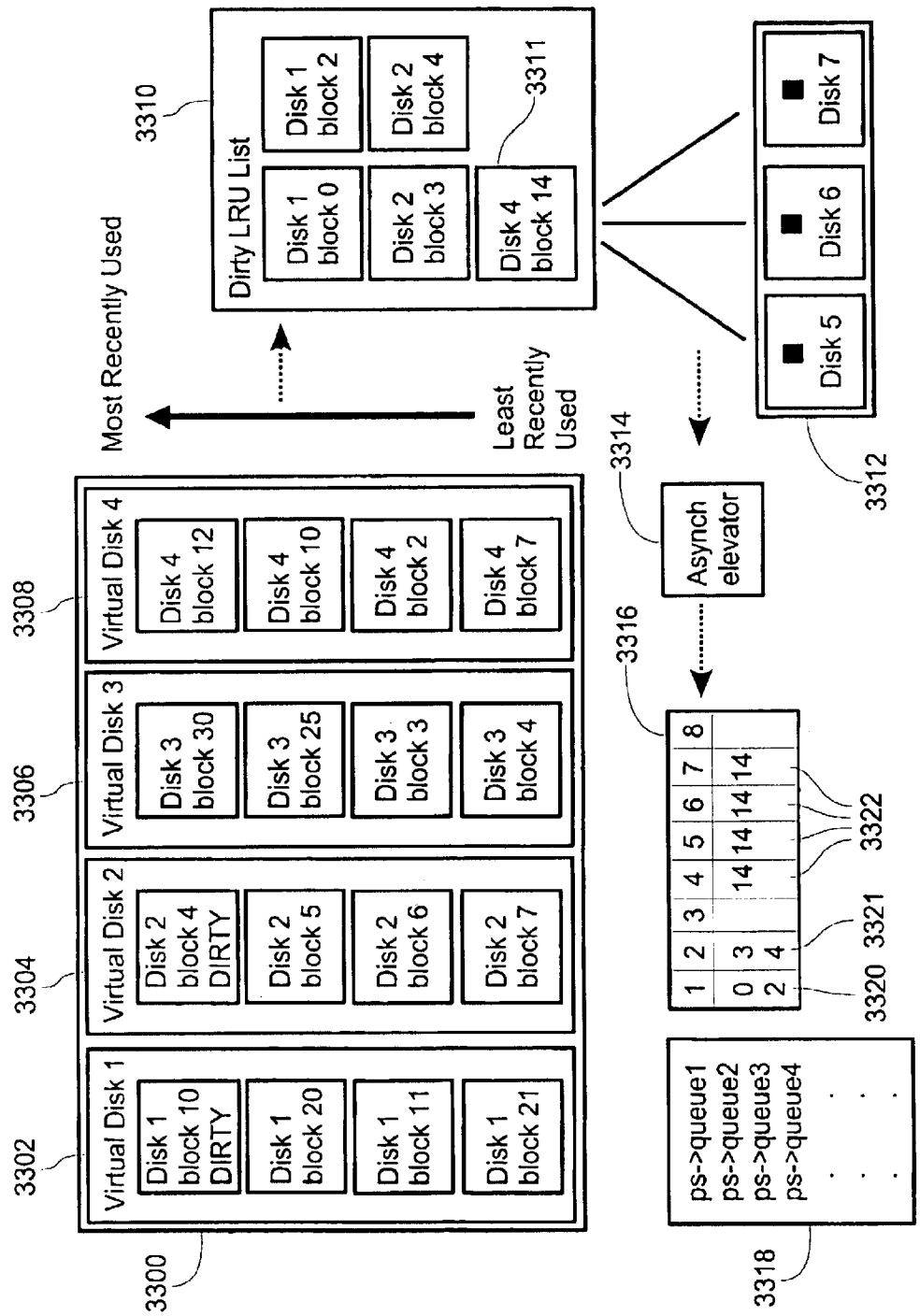
FIG. 33 depicts an LRU cache, a dirty LRU list, a disk elevator, and process queues forming part of an RNS system.

The heart of that system is the NWVP/M2CS mapping and re-mirroring agents, LRU Cache, and asynchronous elevator and I/O subsystem. The LRU (Last Recently Used) cache, illustrated in FIG. 33, is implemented as a virtual device object cache with a unique LRU list per virtual disk object. Each LRU header block allows up to 8 mirrored I/O request blocks to be transacted in parallel for a single cache block of memory to support mirrored writes. Physical block buffer cache designs, like the buffer cache in Linux, use a physical disk:LBA pair for each LRU chain, resulting in double, triple, etc. buffering of mirrored writes. In that preferred embodiment, the RNS LRU is designed to support native mirroring without this overhead. In FIG. 33: a cache 3300 contains separate LRU chains 3302, 3304, 3306 and 3308 allocated from a system-wide pool of free blocks. Each of chains 3302, 3304, 3306, and 3308 is associated to a single virtual disk and contains a list of blocks that may contain a cached virtual disk block. A dirty LRU list 3310 contains a list of blocks of cache 3300 that are dirty, i.e. contain an update to a virtual disk block that has not yet been written. This LRU supports mirroring and each LRU block has a table of RAID 1 mirrors associated with a logical virtual disk block, avoiding the problem of caching data multiple times for mirrored devices. Each block of list 3310 maintains a "mirror map", containing a list of disks that represent all mirrors of the virtual disk of the data block. For the example, block 3311 is to be written to virtual disk 4 at block 14, disk 4 being mirrored on disks 5, 6, and 7 as given in list 3312. Therefore a single copy of each virtual disk block is maintained in list 3310 for a mirrored disk, requiring less memory to store. An asynchronous write is performed across the mirrored multiple disks when a virtual block is written from the LRU list 3310. An asynchronous elevator 3314 writes dirty blocks to disk, as described below. Process queues 3316 receive write requests from elevator 3314. A process queue representation is given in 3318. In the example, data blocks destined to be written to disk 1 3320 are placed in process queue 1's buffer. Data blocks destined for disk 2 3321 are placed in process queue 2's buffer. Blocks destined for disk 4 and mirrors 5, 6, and 7 3322 are placed in the process queues of 4, 5, 6 and 7.

In that embodiment the RNS LRU is also fully SMP enabled, and provides multi-threaded scaling on SMP based systems. Mirroring is actually performed from that RNS LRU, and not at the block level device interface. That RNS LRU also supports compressed caching, and will read and compress cached data blocks, and may increase caching capacity by a factor of 6 to 8, depending on the type of data being stored.

Figure 34:
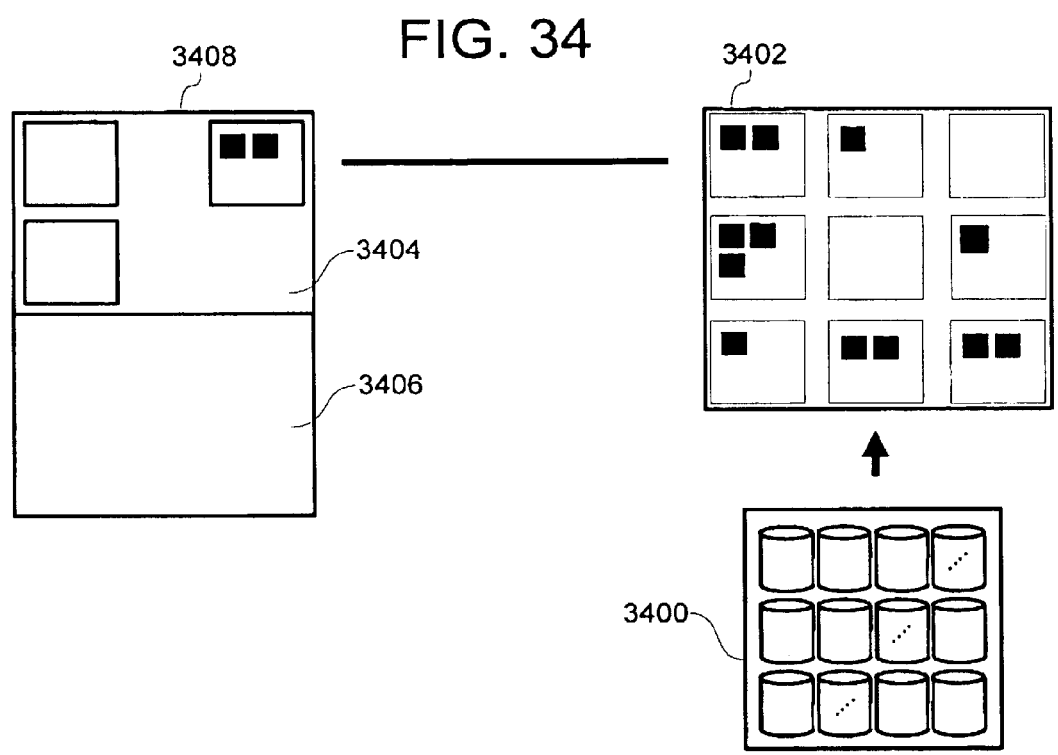
FIG. 34 depicts the operation of a compressed LRU cache.

As illustrated in FIG. 34, 3402 is a compressed LRU cache, which has read data blocks from an RNS 3400. Compressed cache blocks are transferred from the cache 3402 to requesting RAID hosts 3408 compressed, and decompression 3404 is performed at the SCI client 3406. There is little additional overhead to performing the decompression operation at the client since Fanno-Shannon trees are used to decompress and compress the data with Huffman encoding. File system read requests should copy file blocks into user space memory at least once, and it is during this copy operation that decompression is performed.

LRU Cache compression can increase system performance dramatically. By using this method, an RNS array can effectively multiply the available memory cache.

In a preferred embodiment of the invention, write and read request combining and disk ordering are performed in the LRU elevator. That RNS implements a disk elevator that orders incoming requests by device and LBA offset. Overlapping sector requests are coalesced at this layer. Elevator seeking improves disk read and write performance, and extends hard disk life by always moving the disk armature in a sweeping pattern across the disk surface, rather than moving it erratically across the platters randomly. That RNS elevator is implemented as an alternating A and B list of ordered disk requests. Single list elevators (like Linux) experience starvation problems since incoming I/O requests are continually getting inserted into an active list that is also being serviced by a flush daemon. In that RNS design, incoming requests are placed on the A list in order by disk:LBA pair, and if no B list is active in the driver, the A list moves itself to the 'B' list head, zeros the A list head, then allows incoming processes to place requests on the A list while the B list is being actively serviced by the asynchronous write process. With an alternating A and B list, starvation never occurs since any active I/O list of disk requests is atomically submitted to the asynchronous I/O subsystem. Incoming disk requests are ordered on a new A list while the previous list A is being serviced from the B list head.

Figure 35:
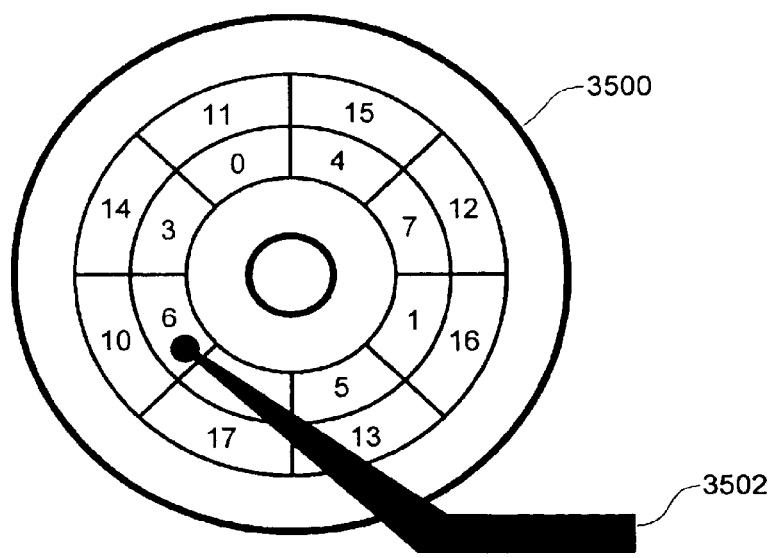
FIG. 35 illustrates basic physical components of a disk drive.

FIG. 35 illustrates a simple disk. A disk contains a platter 3500 containing concentric rings of sectors thereon. An armature 3502 includes a read/write head that is positionable over each ring whereby data may be read from and written to the sectors of the disk. Elevator seeking can increase disk performance dramatically for applications, such as RAID, that perform a large number of random access reads and writes. The principle of an elevator is simple. Incoming read and write requests are sorted by sector offset and disk number, then stored in an order list of I/O requests. This "chain" of I/O requests is then sent to the driver in a single "sweep" across the disk platter. Writes that are made to a device that does not have an elevator typically arrive out of order, for example 0, 17, 4, 11, 2, 13 and 7. With no elevator, this will result in additional seek time as the device armature ping pongs back and forth between tracks. With elevator seeking, ordered requests read and write in a single pass of the disk heads over the platter, eliminating wasted seek time used to move the head around the disk. The example is thereby changed to 0, 1, 4, 10, 11, 13 and 17. Using an ordered elevator that sorts sector offsets by device, and feeds disk requests in sorted order can improve disk access and throughput several magnitudes by avoiding "disk thrashing."

Figure 36:
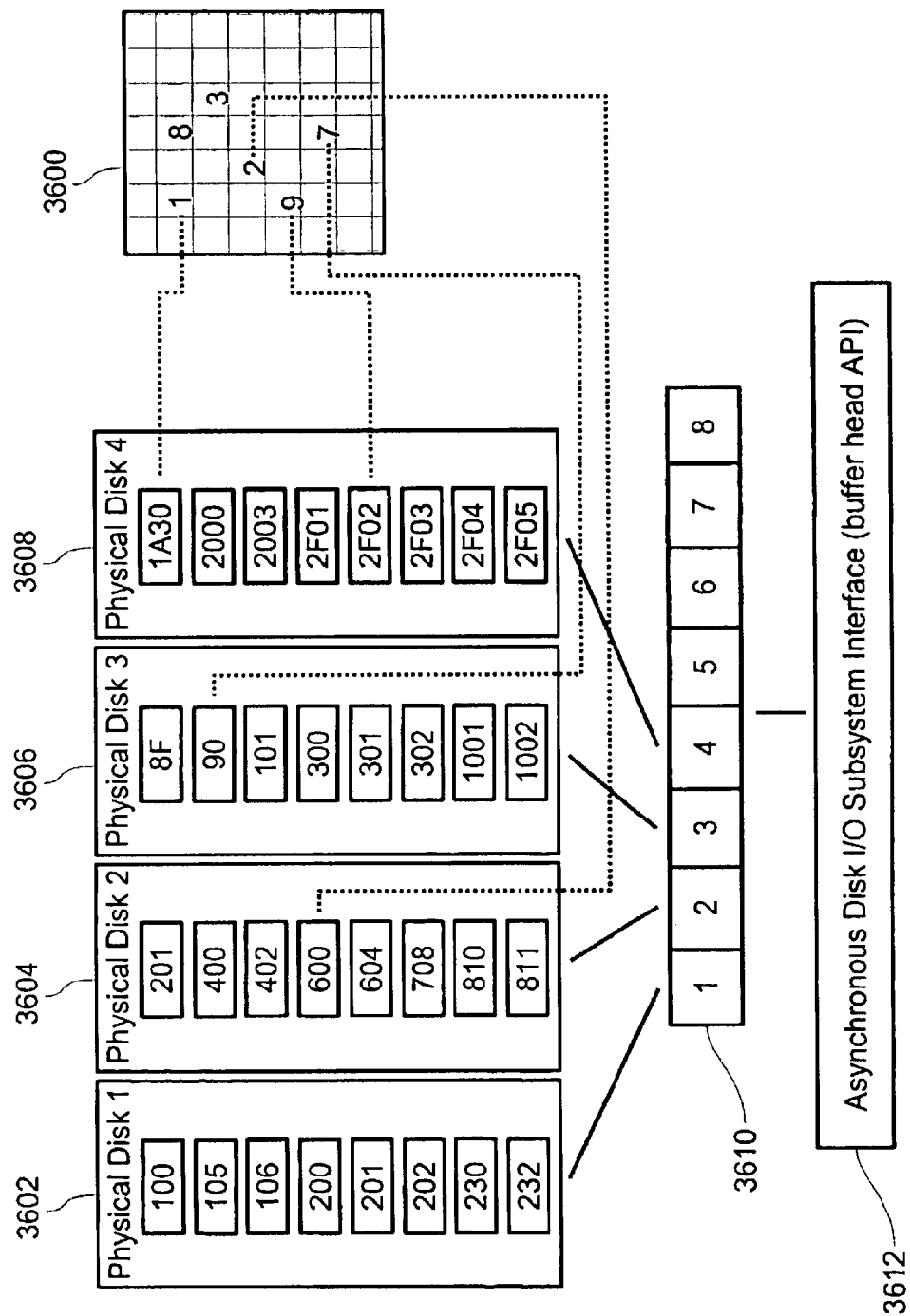
FIG. 36 depicts the operation of an extensible hash in a disk elevator.

In that embodiment, the mirroring elevator architecture of the RNS employs an extensible hash that allows very rapid insertion of incoming disk requests in-order. An extensible hash is in reality a specialized type of binary tree that combines bin hashing with tree organization, but that uses the faster hashing methods to calculate indexes into a hash chain rather than brute force search an entire binary tree. FIG. 36 illustrates one implementation of such a hashing method. An extensible hash 3600 maintains a pointer to a write block operation contained within list 3602 for disk 1, 3604 for disk 2, 3606 for disk 3, and 3608 for disk 4. Disk elevators map into 8 process slots 3610 that provide posting of asynchronous I/O requests to an asynchronous disk I/O subsystem 3612 based on disk number to the disk device drivers. Process slot number is calculated as:

bin_number=disk_number[% (modulo) ]8

Elevator chains are then submitted to a specific process queue based upon this calculation. This model allows the RNS to keep as many spindles busy as possible at one time on SMP systems without using too many processes or incurring excessive context switching overhead.

In one embodiment, the asynchronous disk I/O subsystem supports both interrupt time and process time (sleeping) callbacks. I/O retry operations are submitted and automatically performed by the AIO disk layer by setting specific flags that redirect interrupt time callbacks to a callback thread that can sleep. Hotfixing is by nature a serial operation, and during I/O retry must be able run on a sleep capable thread context since it may need to update bad bit block tables across several mirrored devices and block the calling process while these updates occur in a serial fashion.

Figure 37:
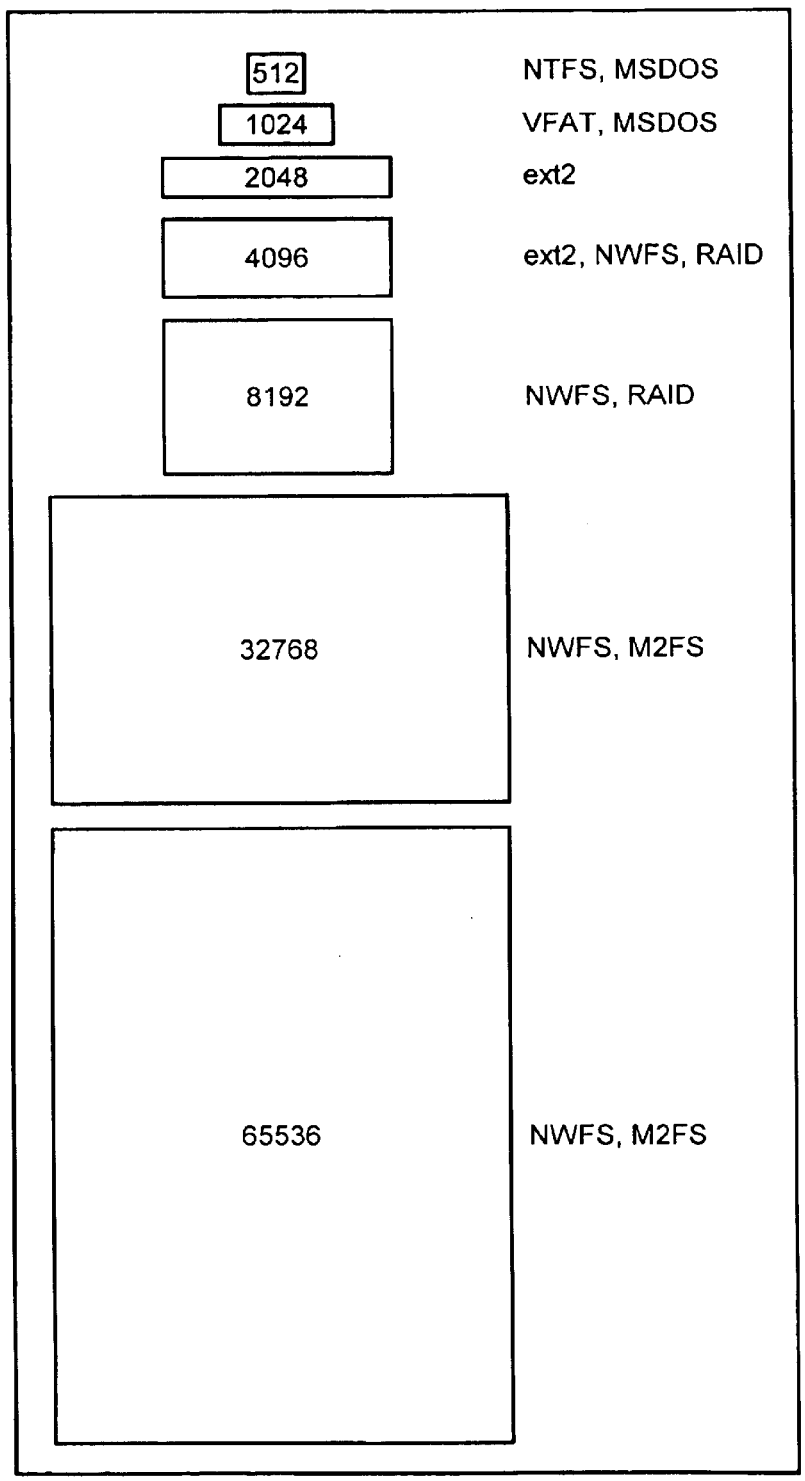
FIG. 37 illustrates some of supported block sizes for Linux for various filesystem types.

To properly understand read-ahead architecture requirements; it is necessary to first understand read-ahead behaviors of file systems that will use the RNS array. FIG. 37 illustrates some of the various file systems supported under Linux, and the different block sizes used by each. In one embodiment of an RNS, read-ahead is performed by the LRU when disk blocks are requested. Read-ahead window size is a configuration field in the segment description header for a particular segment. All segments belonging to a raid string must have the same read-ahead window size.

Most file systems in Linux are optimized for the 1024 byte block case. EXT2 uses 1024 blocks by default, however, closer examination of caching behavior and source code in Linux reveals that in fact, file system read ahead is actually almost always 4K. This is due to the design of the page cache in Linux. NTFS and the MSDOS file systems are hard coded to 512 byte block sizes, but the mmap (memory mapped subsystem) in Linux always performs read ahead through the page cache based upon the page size of the host operating system and processor environment. On i386 (Intel IA32) systems, this value is always 4K. On Alpha systems, the value is 8K, etc.

NetWare (NWFS) and M2FS file systems use much large block sizes than are supported by Linux native file systems, and employ a natural read-ahead capability due to their use of large block sizes of contiguous sectors.

MSDOS and VFAT based file systems on both Linux and W2K both work well with a read ahead size of 4K since directory clusters are usually allocated as contiguous groups of clusters and are laid out in a linear fashion, and neither file system supports sparse files. It is important to note that MSDOS and VFAT file systems do not support "holes" in files (sparse files), which means that a file that's 200 MB long but only has a single block written at the end of the file, it will occupy 200 MB of disk space. NTFS, EXT2, NWFS, and M2FS all support sparse files. A 200 MB file with a single block written to the end of the file will occupy (size of the (block +1)) disk space for NTFS, EXT2, NWFS, and M2FS.

Figure 38:
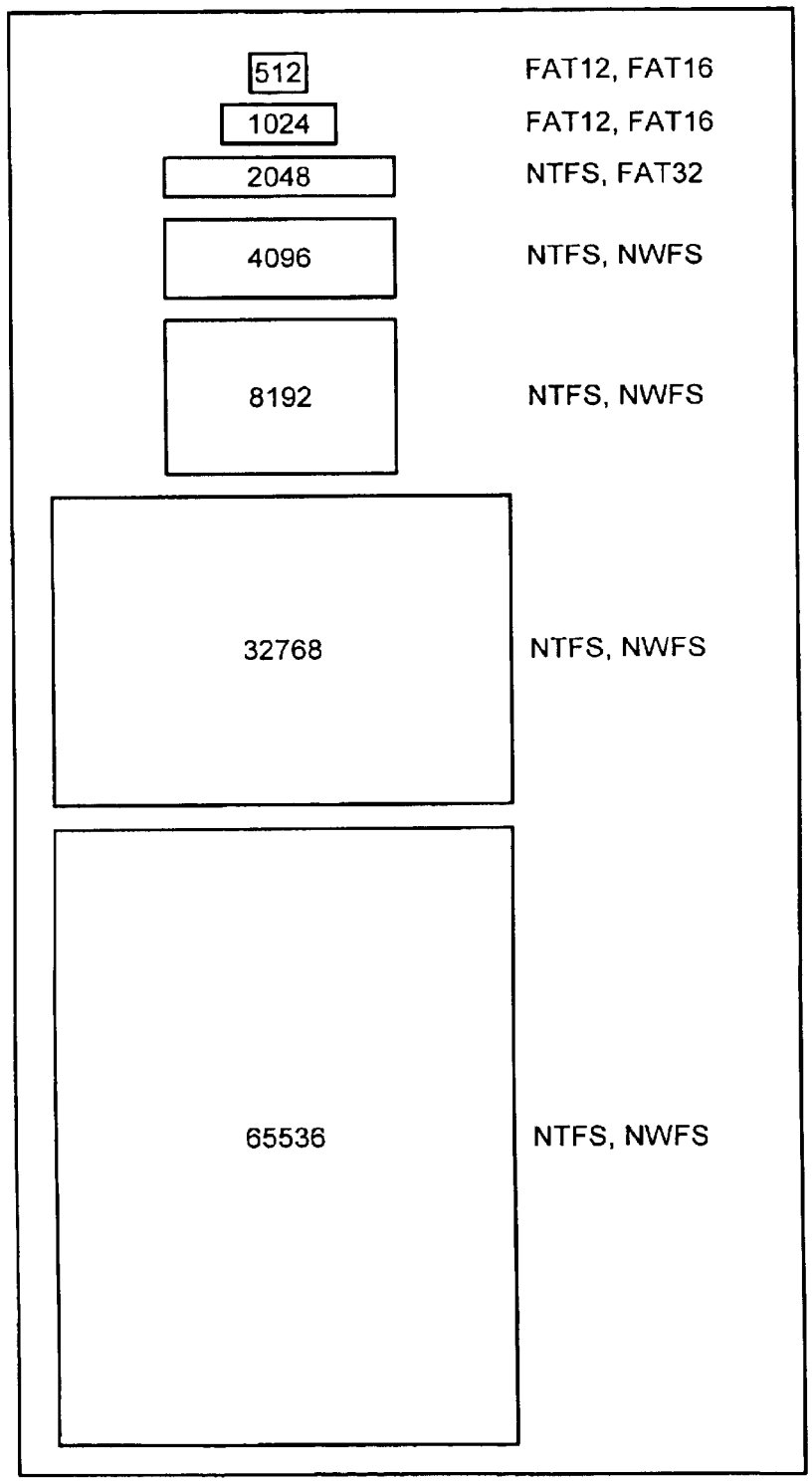
FIG. 38 illustrates some of supported cluster sizes for Windows NT and 2000 for various filesystem types.

Read-ahead support on Windows NT/2000 is more complex. This is due to the method employed by NTFS to store sector runs for files. NTFS does support the concept of a storage "cluster" (a region of contiguous sectors), however, in NTFS, this cluster size is configurable at the file system volume level when a volume is first created (2048–64K). NTFS creates file runs by scanning an internal bitmap of free sectors on a device, and mapping these runs into any available variable length sector runs located on the device. These allocated file runs can end up all over the disk and in all sorts of sizes and lengths, making it very difficult to know just where the next sector run for a file may reside. FIG. 38 illustrates the cluster sizes of various file systems for NT/W2K. Read-ahead on Unix file systems and NetWare file systems are relatively straightforward.

This is the reason NTFS volumes on very large storage arrays have severe performance and fragmentation problems when an NTFS volume reaches sizes above 1 TB. Files can become so fragmented, specialized repair tools are required to reorganize the file and sector runs and restore reasonable performance levels on a large NTFS volumes.

In native NTFS on W2K, the NTFS file system itself provides intelligent read-ahead capability via the Cache Manager. Logical sector runs for NTFS files are stored in MDL lists, and read-ahead is performed by looking at the address of the next logical sector run, and caching it in memory. To support NTFS well on an RNS array, read-ahead windowing should match the configured cluster size for any NTFS volume using the array. Always performing 4K aligned block read-ahead, even for NTFS, should provide noticeable performance improvement.

Figure 39:
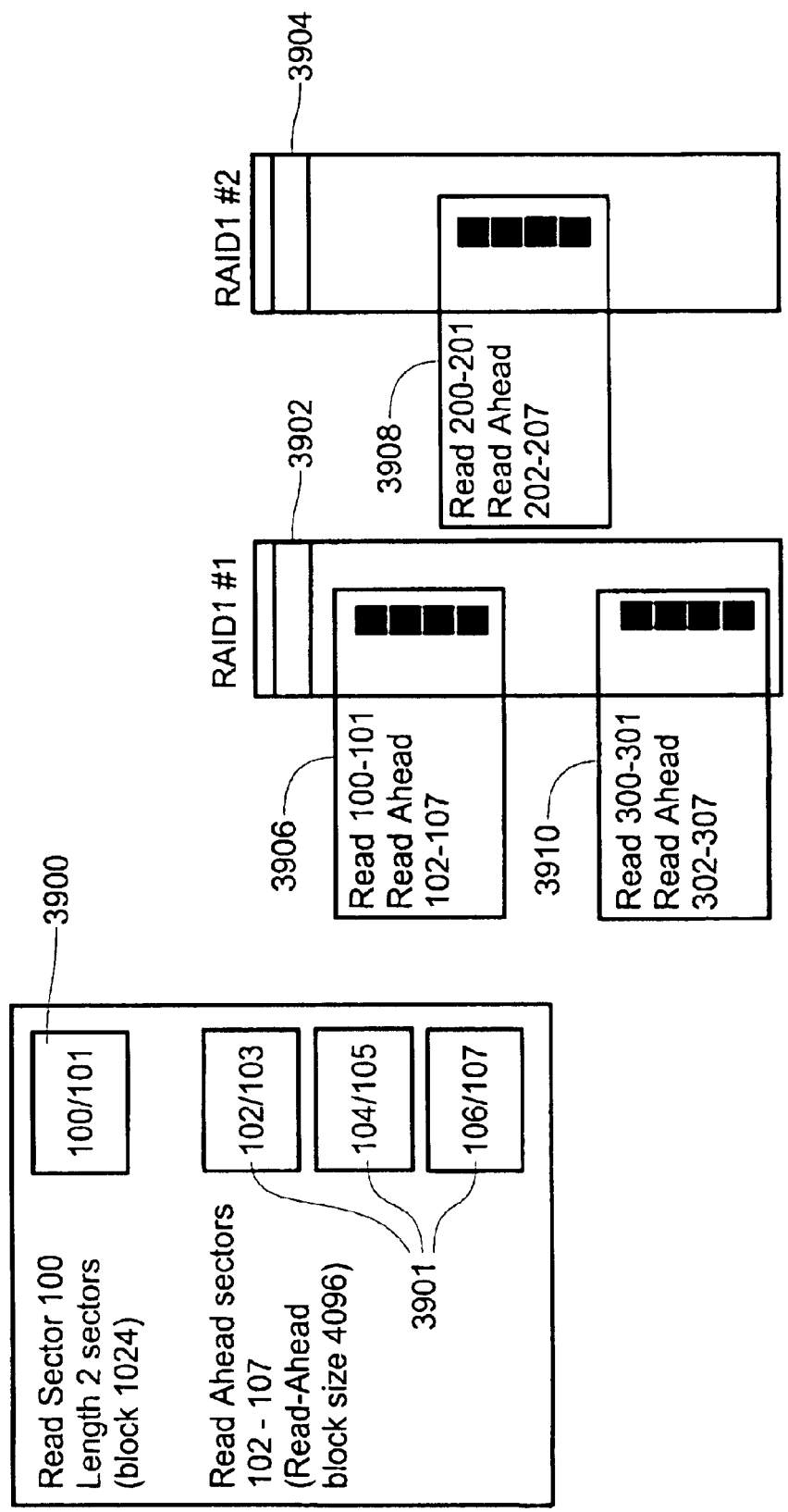
FIG. 39 depicts a method of performing read-ahead on a RAID 1 system.

FIG. 39 illustrates a method of performing read-ahead on a RAID 1 system. A read request 3900 is made to sector 100 with a length of 2 sectors. A read ahead window size is determined and a read ahead request 3901 is made to read sectors 102–107, making the total read operation 8 sectors. Read ahead window sizes can be determined dynamically based on the average length of sector runs requested by the host system. The default read ahead sizes might logically be 4K, 8K, 16K, 32K, and 64K bytes, the read ahead size being configured statically or dynamically. NTFS present some special handling, and can be configured as static based on the cluster size of the file system using the virtual disk. The NetWare file system also uses fixed cluster sizes, as does MSDOS and FAT12/16/32 file systems. RAID system 3904 is a RAID 1 mirror of 3902. When performing block read ahead with load balanced reads across RAID 1 mirrors, since it is always assumed that the read ahead window size will span data elements that are contiguous on disk, it is not necessary to interleave block reads between devices. Instead, round robin reads are always forced to use the read ahead window size configured for the device. Therefore the first combined read 3906 of 3900 and 3901 is made to RAID disk 1 3902, the second read 3908 is made to RAID disk 2 3904, the third read 3910 is made to RAID disk 1 3902, and so forth.

It is very critical to note that when combining round robin read mirroring with read-ahead caching, read-ahead window sizes should be assumed to match contiguous sectors runs on disks, and should not be interleaved when reading round robin from a mirror group. If a NetWare file system exists on the volume, and has been using 64K blocks, then it should be assumed that every block unit of storage on that device will be a 64K contiguous run of sectors. This means that an RNS should perform block read ahead in 64K windows between a pair of mirrored drives rather than interleaving 4K reads between each disk. If the sectors are contiguous, performance is better if we read these sectors as a "run" since the disk drivers in Linux will combine a contiguous range of sectors into a single I/O request to a disk device.

Figure 40B:
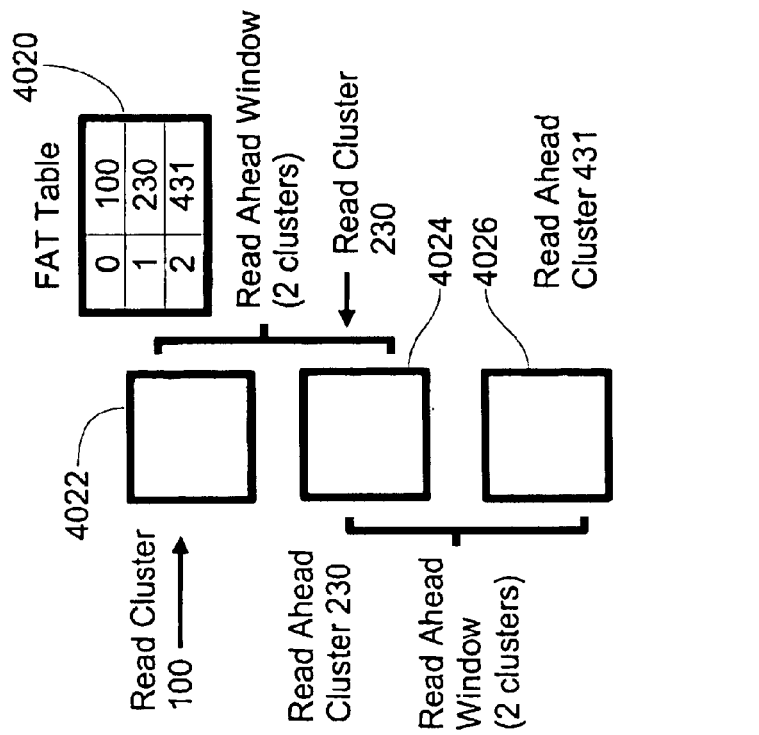
FIG. 40B depicts a read-ahead method using filesystem knowledge and read requests as input.
Figure 40A:
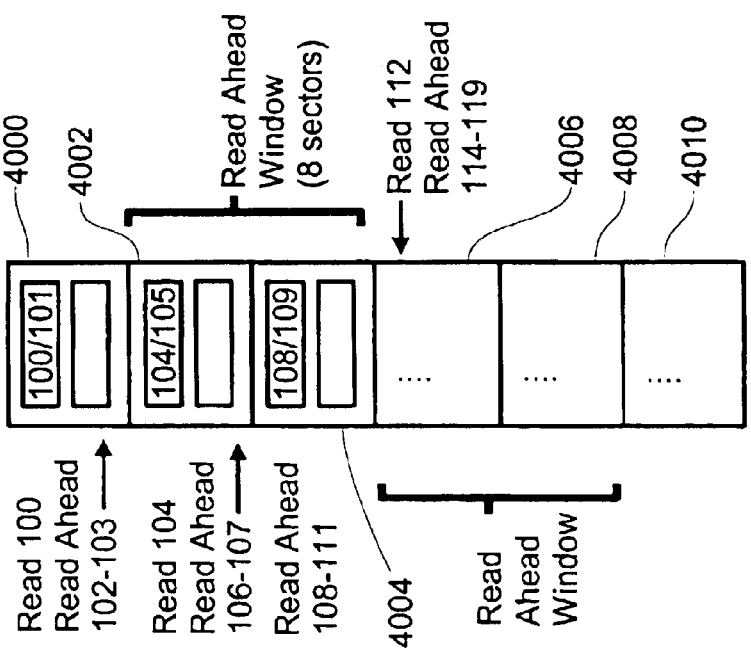
FIG. 40A depicts a read-ahead method using read requests as input.

FIG. 40A illustrates one read-ahead method. If the system software detects that subsequent read requests from a first read request are sequential relative to contiguous sector runs on disk, the read ahead subsystem may improve performance by extending the read ahead operation to precede the incoming read requests. For example, first request 4000 requests sectors 100 and 101, followed by read requests to sectors 102 and 103 that are fulfilled out of read ahead memory. A second requests 4002 likewise requests sectors 104–107, and a third requests 4004 requests sectors 108–111. The system then detects that sectors are being requested in sequential order, and proceeds without further request to read-ahead sectors 112 through 119, assuming a read ahead window of 8 sectors.

FIG. 40B illustrates another read-ahead method. File systems are able to use much smarter read-ahead since they know which contiguous cluster runs comprise a file. A table 4020 contains the ordered sectors to which a file is written to disk. A first read operation 4022 requests cluster 100, or cluster 0 of the file. The system begins read ahead of cluster 1 of the file, reading cluster 230 on disk. A read request is then received for cluster 230, which is returned from read-ahead memory. The system then performs a read-ahead for the next cluster 2 of the file, or 431 on disk. This operation is carried on so long as new sequential read requests are received and the end of file is not reached. Most file systems, such as NTFS and NWFS perform file level read ahead if they detect sequential access to a file.

In one embodiment, RNS read-ahead window sizes can be determined dynamically by averaging read sizes for sequential access as size N, and always reading the next run of sectors for a size of N+1 provided that the system is performing sequential access to the device. If a non-sequential I/O request is ever received then the N+1 read-ahead behavior defaults back to N until the next occurrence of sequential access is detected. File systems above the RNS will already be performing their own forms of read ahead caching.

Figure 41:
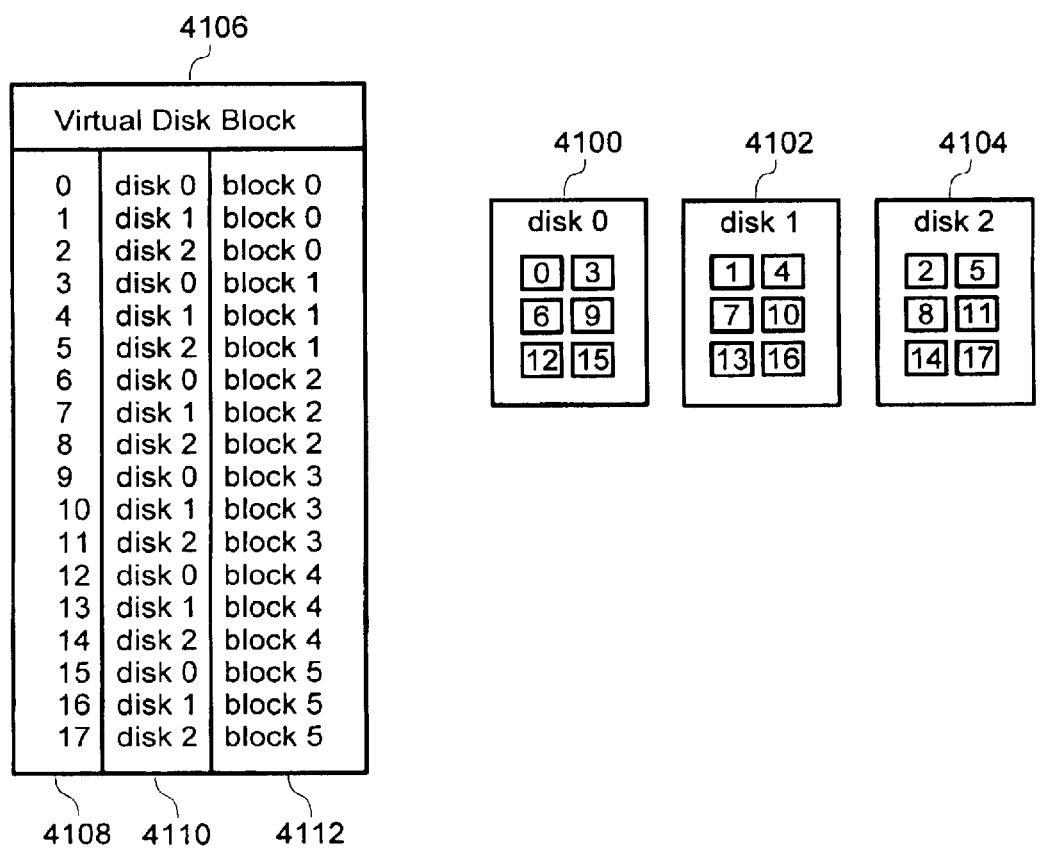
FIG. 41 depicts one method of dynamic block stripe allocation.

Dynamic Block Stripe Allocation, illustrated in FIG. 41, provides the ability to transparently re-map virtual disk blocks into striping layouts across RAID 1+0 and RAID 5 arrays. Arrays configured with Dynamic Block Stripe Allocation will naturally load balance reads and more evenly stripe file data across an array of disks as blocks are allocated and written to disk. RAID 0 stripe sets are a concatenated array of partitions that use linear block addressing.

In FIG. 41, dynamic block stripe allocation transparently remaps virtual disk block addresses and evenly stripes them across an array of RAID 0 devices. A RAID 0 system includes disks 4100, 4102 and 4104. A file table 4106 outlining the block-wise locations of the data of a file lists the file block number 4108, the disk location of that block 4110, and the block number on the disk of data residence 4112. A disk index value may be computed as virtual_block % number_of_disks, where % is the modulo operator. A disk block value may be computed as virtual_block/number_of_disks, where/is the integer division operator. A representative set of values is given in the illustrated table 4106. For performance reasons, block sizes are preferred to be set to windows of 4K, 8K, 16K, 32K and 64K bytes. LBA (Logical Block Addresses) sector addresses are mapped to a virtual block number by LBA/virtual block size to determine within which virtual block an LBA resides. This method round robins block allocations across a stripe set of RAID devices, providing improved load balancing. For obvious reasons it is preferred to use large virtual block sizes since interleaving reads to contiguous runs of sectors is not efficient.

This method provides the ability to load balance and stripe data transparently to upper level file systems. This capability is related to read-ahead window sizing, since interleaving contiguous sectors is probably a very bad idea with this method, and would negatively impact performance. Is recommended for performance reasons that large blocks sizes (64K) be used as stripe allocation "regions" across an array of disks. This will create a natural read-ahead behavior for host file systems since all sectors within each 64K block will be comprised of contiguous runs of sectors.

Figure 42:
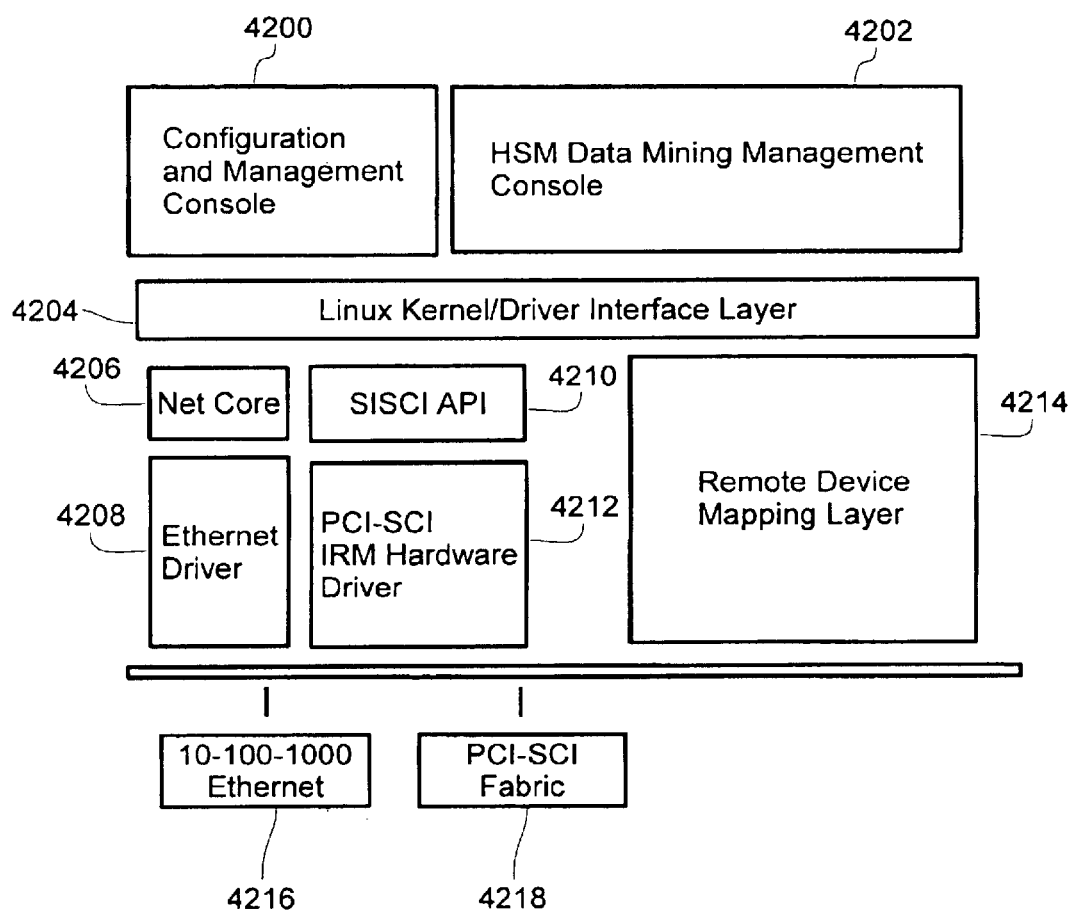
FIG. 42 depicts an RNS client system that includes the Linux operating system.

FIG. 42 illustrates a software architecture that may be used to fashion a client of an RNS using the Linux operating system. An Ethernet interface 4216 and an SCI interface 4218 are provided for communication with other RNS devices and devices that access virtual disks. A number of components are included in the Linux kernel, such as net core 4206, Ethernet driver 4208, an SISCI API 4210 to provide interaction between processes and the SCI drivers and hardware, a PCI-SCI IRM hardware driver 4212 for operation of a PCI-SCI adapter card, and a remote device mapping layer 4214. An interface layer 4204 is provided in the kernel for applications and daemons running on the client. Daemons and processes that may run on the client are a configuration and management console 4200, and an HSM data mining management console 4202.

Figure 43:
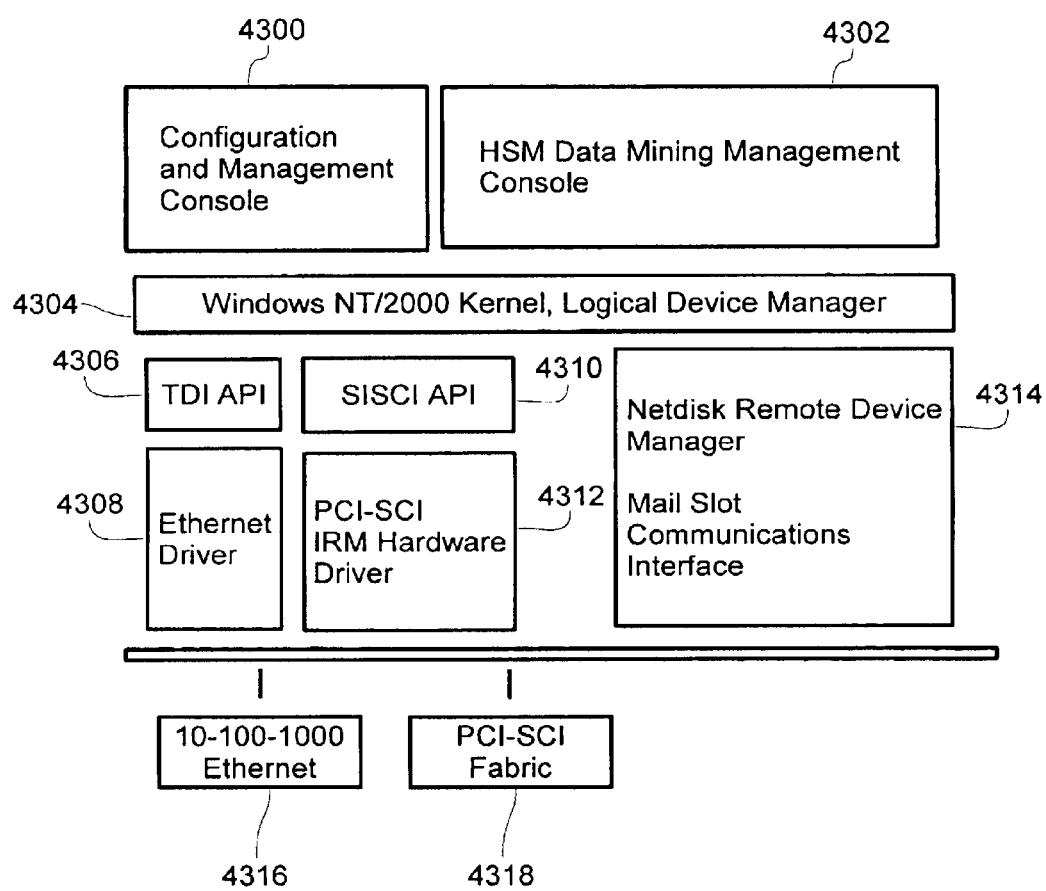
FIG. 43 depicts an RNS client system that includes the Windows NT or Windows 2000 operating systems.

FIG. 43 illustrates a software architecture that may be used to fashion a client of an RNS using the Windows NT or Windows 2000 operating systems. An Ethernet interface 4316 and an SCI interface 4318 are provided for communication with other RNS devices and devices that access virtual disks. A number of components are included in the NT/2000 kernel, such as TDI API 4306, Ethernet driver 4308, an SISCI API 4310 to provide interaction between processes and the SCI drivers and hardware, a PCI-SCI IRM hardware driver 4312 for operation of a PCI-SCI adapter card, and a netdisk remote device manager and mail slot communications interface 4314. An interface layer 4304 is provided in the kernel for applications and daemons running on the client. Daemons and processes that may run on the client are a configuration and management console 4300, and an HSM data mining management console 4302.

Figure 44:
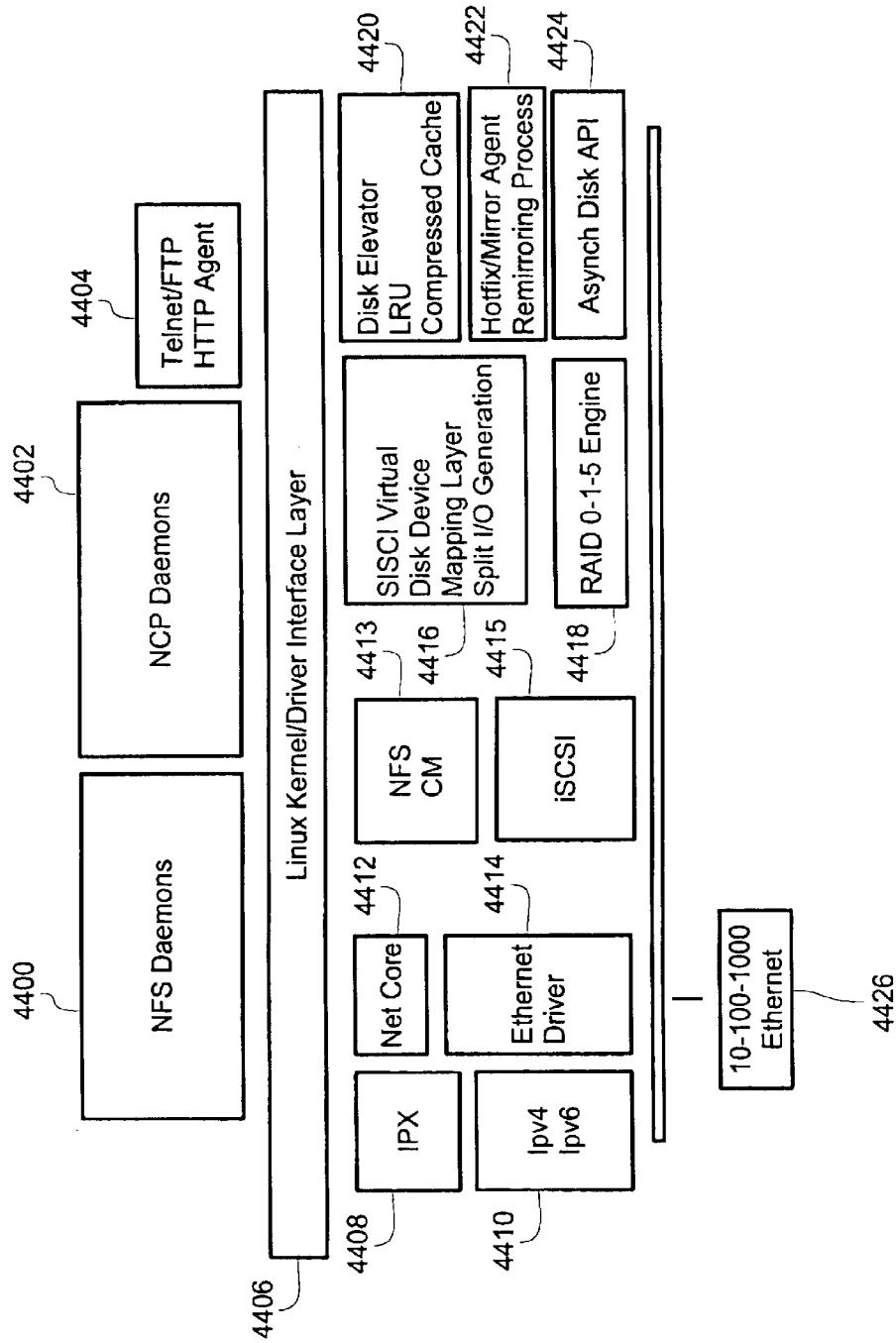
FIG. 44 depicts another RNS system that includes the Linux operating system.

FIG. 44 illustrates a software architecture that may be used to fashion an Ethernet-only RNS, without an SCI interface, using the Linux operating system. An Ethernet interface 4426 is provided for communication with other RNS devices and devices that access virtual disks. A number of components are included in the Linux kernel, such as net core 4412, Ethernet driver 4414, a SISCI virtual disk device mapping layer providing split I/O generation 4416, a RAID engine 4418 supporting at least RAID levels 0, 1 and 5, a disk elevator and LRU compressed cache module 4420, a hotfix and mirroring agent with remirroring processing 4422, an asynchronous disk API 4424, an IPX core 4408 and an IP core 4410 supporting IPv4 and IPv6, an NFS module 4413, and an iSCSI module 4415. An interface layer 406 is provided in the kernel for applications and daemons running on the RNS device. Daemons and processes running on the device are NFS daemons 4400, NCP daemons 4402, and telnet, FTP, and HTTP agents 4404.

While the present invention has been described and illustrated in conjunction with a number of specific embodiments, those skilled in the art will appreciate that variations and modifications may be made without departing from the principles of the invention as herein illustrated, described and claimed.

The present invention may be embodied in other specific forms without departing from their spirit or characteristics. The described embodiments are to be considered in all respects as only illustrative, and not restrictive. The scope of the invention is, therefore, indicated by the appended claims, rather than the foregoing description. All changes that come within the meaning and range of equivalency of the claims are to be embraced within their scope.

What is claimed is:

1. A computerized system for providing high speed fault-tolerant storage of information, the system comprising:

an array of computer storage devices, said computer storage devices being capable of storing computer-readable information, said array of computer storage devices including a plurality of computer storage devices, computer-readable information stored on said plurality of computer storage devices, said computer-readable information being stored on said plurality of computer storage devices in data redundant fashion, said array being configured to appear as a unitary block of computer-readable storage to applications programs, an adapter for accessing said array, said adapter including an array interface for performing desired operations on said array, such as read and write operations, said adapter including a network interface for interfacing with a computer network in order to permit users on a computer network to access said array, said network interface operating according to a scalable coherent interface (SCI) protocol, a computer network, said computer network being arranged in ring topology, said computer network utilizing a unidirectional interfaces in order to minimize latency, a plurality of client processors connectable to said computer network, said computer network supporting distributed processing of tasks across a plurality of processors connected to said computer network, a block of memory shared by a plurality of processors on said network; and wherein said array selects at least one feature selected from the group consisting of on-demand storage journaling capability, hotfix redirection, mirrored caching, annotated storage journaling, dynamic stripe block allocation, dynamically added stripe and mirror sets, break-away mirroring, and infinite HSM storage journaling.

2. A system as recited in claim 1 therein said computer network employs dual ring topology in order to permit continued operation of said computer network in the event of failure of a node of said computer network.

3. A system as recited in claim 1 wherein said array includes dual data parity information for use in data error correction.

4. A system as recited in claim 1 wherein said computer network includes a switch to provide continued operation of said network in case of failure of a node in said network.

5. A system as recited in claim 1 wherein said SCI interface incorporates a plurality of axes in said array forming a fault-tolerant interconnection fabric.

6. A computerized system for providing high speed fault-tolerant storage of information, the system comprising:

an array of computer storage devices, said computer storage devices being capable of storing computer-readable information, said array of computer storage devices including a plurality of computer storage devices, computer-readable information stored on said plurality of computer storage devices, said computer-readable information being stored on said plurality of computer storage devices in data redundant fashion, said array being configured to appear as a unitary block of computer-readable storage to applications programs, an adapter for accessing said array, said adapter including an array interface for performing desired operations on said array, such as read and write operations, said adapter including a network interface for interfacing with a computer network in order to permit users on a computer network to access said array, said network interface operating according to a scalable coherent interface (SCI) protocol, a computer network, said computer network being arranged in ring topology, said computer network utilizing a unidirectional interfaces in order to minimize latency, a plurality of client processors connectable to said computer network, said computer network supporting distributed processing of tasks across a plurality of processors connected to said computer network, a block of memory shared by a plurality of processors on said network; and wherein said array selects a plurality of features selected from the group consisting of on-demand storage journaling capability, hotfix redirection, mirrored caching, annotated storage journaling, dynamic stripe block allocation, dynamically added stripe and mirror sets, break-away mirroring, and infinite HSM storage journaling.

7. A system as recited in claim 6 wherein said computer network employs dual ring topology in order to permit continued operation of said computer network in the event of failure of a node of said computer network.

8. A system as recited in claim 6 wherein said array includes dual data parity information for use in data error correction.

9. A system as recited in claim 6 wherein said computer network includes a switch to provide continued operation of said network in case of failure of a node in said network.

10. A system as recited in claim 6 wherein said SCI interface incorporates a plurality of axes in said array forming a fault-tolerant interconnection fabric.

11. A computerized system for providing high speed fault-tolerant storage of information, the system comprising:

an array of computer storage devices, said computer storage devices being capable of storing computer-readable information, said array of computer storage devices including a plurality of computer storage devices, computer-readable information stored on said plurality of computer storage devices, said computer-readable information being stored on said plurality of computer storage devices in data redundant fashion, said array being configured to appear as a unitary block of computer-readable storage to applications programs, an adapter for accessing said array, said adapter including an array interface for performing desired operations on said array, such as read and write operations, said adapter including a network interface for interfacing with a computer network in order to permit users on a computer network to access said array, said network interface operating according to a scalable coherent interface (SCI) protocol, a computer network, said computer network being arranged in ring topology, said computer network utilizing a unidirectional interfaces in order to minimize latency, a plurality of client processors connectable to said computer network, said computer network supporting distributed processing of tasks across a plurality of processors connected to said computer network, a block of memory shared by a plurality of processors on said network; and wherein said array selects at least one feature selected from the group consisting of on-demand storage journaling capability, hotfix redirection, mirrored caching, and annotated storage journaling.

12. A system as recited in claim 11 wherein said computer network employs dual ring topology in order to permit continued operation of said computer network in the event of failure of a node of said computer network.

13. A system as recited in claim 11 wherein said array includes dual data parity information for use in data error correction.

14. A system as recited in claim 11 wherein said computer network includes a switch to provide continued operation of said network in case of failure of a node in said network.

15. A system as recited in claim 11 wherein said SCI interface incorporates a plurality of axes in said array forming a fault-tolerant interconnection fabric.

16. A computerized system for providing high speed fault-tolerant storage of information, the system comprising:

an array of computer storage devices, said computer storage devices being capable of storing computer-readable information, said array of computer storage devices including a plurality of computer storage devices, computer-readable information stored on said plurality of computer storage devices, said computer-readable information being stored on said plurality of computer storage devices in data redundant fashion, said array being configured to appear as a unitary block of computer-readable storage to applications programs, an adapter for accessing said array, said adapter including an array interface for performing desired operations on said array, such as read and write operations, said adapter including a network interface for interfacing with a computer network in order to permit users on a computer network to access said array, said network interface operating according to a scalable coherent interface (SCI) protocol, a computer network, said computer network being arranged in ring topology, said computer network utilizing a unidirectional interfaces in order to minimize latency, a plurality of client processors connectable to said computer network, said computer network supporting distributed processing of tasks across a plurality of processors connected to said computer network, a block of memory shared by a plurality of processors on said network; and wherein said array selects at least one feature selected from the group consisting of dynamic stripe block allocation, dynamically added stripe and mirror sets, break-away mirroring, and infinite HSM storage journaling.

17. A system as recited in claim 16 wherein said computer network employs dual ring topology in order to permit continued operation of said computer network in the event of failure of a node of said computer network.

18. A system as recited in claim 16 wherein said array includes dual data parity information for use in data error correction.

19. A system as recited in claim 16 wherein said computer network includes a switch to provide continued operation of said network in case of failure of a node in said network.

20. A system as recited in claim 16 wherein said SCI interface incorporates a plurality of axes in said array forming a fault-tolerant interconnection fabric.

21. A computerized system for providing high speed fault-tolerant storage of information, the system comprising:

an array of computer storage devices, said computer storage devices being capable of storing computer-readable information, said array of computer storage devices including a plurality of computer storage devices, computer-readable information stored on said plurality of computer storage devices, said computer-readable information being stored on said plurality of computer storage devices in data redundant fashion, said array being configured to appear as a unitary block of computer-readable storage to applications programs, an adapter for accessing said array, said adapter including an array interface for performing desired operations on said array, such as read and write operations, said adapter including a network interface for interfacing with a computer network in order to permit users on a computer network to access said array, said network interface operating according to a scalable coherent interface (SCI) protocol, a computer network, said computer network being arranged in ring topology, said computer network utilizing a unidirectional interfaces in order to minimize latency, a plurality of client processors connectable to said computer network, said computer network supporting distributed processing of tasks across a plurality of processors connected to said computer network, a block of memory shared by a plurality of processors on said network; and wherein said array selects at least one feature selected from the group consisting of on-demand storage journaling capability, mirrored caching, dynamic stripe block allocation, and break-away mirroring.

22. A system as recited in claim 21 wherein said computer network employs dual ring topology in order to permit continued operation of said computer network in the event of failure of a node of said computer network.

23. A system as recited in claim 21 wherein said array includes dual data parity information for use in data error correction.

24. A system as recited in claim 21 wherein said computer network includes a switch to provide continued operation of said network in case of failure of a node in said network.

25. A system as recited in claim 21 wherein said SCI interface incorporates a plurality of axes in said array forming a fault-tolerant interconnection fabric.

26. A computerized system for providing high speed fault-tolerant storage of information, the system comprising:

an array of computer storage devices, said computer storage devices being capable of storing computer-readable information, said array of computer storage devices including a plurality of computer storage devices, computer-readable information stored on said plurality of computer storage devices, said computer-readable information being stored on said plurality of computer storage devices in data redundant fashion, said array being configured to appear as a unitary block of computer-readable storage to applications programs, an adapter for accessing said array, said adapter including an array interface for performing desired operations on said array, such as read and write operations, said adapter including a network interface for interfacing with a computer network in order to permit users on a computer network to access said array, said network interface operating according to a scalable coherent interface (SCI) protocol, a computer network, said computer network being arranged in ring topology, said computer network utilizing a unidirectional interfaces in order to minimize latency, a plurality of client processors connectable to said computer network, said computer network supporting distributed processing of tasks across a plurality of processors connected to said computer network, a block of memory shared by a plurality of processors on said network; and wherein said array selects at least one feature selected from the group consisting of hotfix redirection, annotated storage journaling, dynamically added stripe and mirror sets, and infinite HSM storage journaling.

27. A system as recited in claim 16 wherein said computer network employs dual ring topology in order to permit continued operation of said computer network in the event of failure of a node of said computer network.

28. A system as recited in claim 17 wherein said array includes dual data parity information for use in data error correction.

29. A system as recited in claim 18 wherein said computer network includes a switch to provide continued operation of said network in case of failure of a node in said network.

30. A system as recited in claim 19 wherein said SCI interface incorporates a plurality of axes in said array forming a fault-tolerant interconnection fabric.

* * * * *